US012700401B2

(12) United States Patent
Li et al.

(10) Patent No.: US 12,700,401 B2
(45) Date of Patent: Aug. 4, 2026

(54) REMOTE DATA ACCESS AND SPEECH WAKEUP USING BONE CONDUCTION SIGNAL FUSION

(71) Applicant: Huawei Technologies Co., Ltd., Shenzhen (CN)

(72) Inventors: Xiaojian Li, Shenzhen (CN); Jinhui Sheng, Beijing (CN); Yue Lang, Shanghai (CN); Wei Jiang, Tokyo (JP)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 81 days.

(21) Appl. No.: 18/591,853

(22) Filed: Feb. 29, 2024

(65) Prior Publication Data

US 2024/0203408 A1     Jun. 20, 2024

Related U.S. Application Data

(63) Continuation of application No. PCT/CN2022/095443, filed on May 27, 2022.

(30) Foreign Application Priority Data

Aug. 30, 2021     (CN) .......................... 202111005443.6

(51) Int. Cl.
| | |
|---|---|
| *G10L 15/187* | (2013.01) |
| *G10L 15/02* | (2006.01) |
| *G10L 15/08* | (2006.01) |
| *G10L 15/22* | (2006.01) |
| *G10L 15/24* | (2013.01) |
| *G10L 25/78* | (2013.01) |

(52) U.S. Cl.
CPC ............ *G10L 15/187* (2013.01); *G10L 15/02* (2013.01); *G10L 15/22* (2013.01); *G10L 15/24* (2013.01); *G10L 25/78* (2013.01); *G10L*

*2015/025* (2013.01); *G10L 2015/088* (2013.01); *G10L 2015/223* (2013.01)

(58) Field of Classification Search
CPC ....... G10L 15/02; G10L 15/187; G10L 15/22; G10L 15/24; G10L 25/78; G10L 2015/025; G10L 2015/088
USPC ......................................... 704/233, 251, 255
See application file for complete search history.

(56) References Cited

U.S. PATENT DOCUMENTS

| | | | |
|---|---|---|---|
| 9,043,211 B2 | 5/2015 | Haiut et al. | |
| 9,135,915 B1 * | 9/2015 | Johnson | .................. G10L 21/16 |

(Continued)

FOREIGN PATENT DOCUMENTS

| | | |
|---|---|---|
| CN | 106098059 A | 11/2016 |
| CN | 205864669 U | 1/2017 |

(Continued)

OTHER PUBLICATIONS

Satoru Tsuge et al:"Speaker verification method using bone-conduction and air-conduction speech",2009 International Symposium on Intelligent Signal Processing and Communication Systems (ISPACS 2009) Dec. 7-9, 2009, total 4 pages.

*Primary Examiner* — James S Wozniak
(74) *Attorney, Agent, or Firm* — Conley Rose, P.C.

(57)     ABSTRACT

A speech wakeup method includes that a bone conduction microphone collects a bone conduction signal for speech detection, which includes information about a command word input by the sound source, and detects a wakeup word based on the bone conduction signal.

20 Claims, 26 Drawing Sheets

Diagram of a time
sequence of a signal                    Time

(56) References Cited

U.S. PATENT DOCUMENTS

| | | | | |
|---|---|---|---|---|
| 10,313,782 | B2 | 6/2019 | Dusan et al. | |
| 10,629,226 | B1 * | 4/2020 | Tong | G10L 15/08 |
| 11,308,939 | B1 * | 4/2022 | Gao | G10L 15/142 |
| 2011/0208520 | A1 * | 8/2011 | Lee | G10L 25/78 |
| | | | | 704/E15.039 |
| 2012/0209603 | A1 * | 8/2012 | Jing | G10L 25/78 |
| | | | | 704/E15.001 |
| 2018/0324518 | A1 * | 11/2018 | Dusan | G06F 3/167 |
| 2020/0160858 | A1 * | 5/2020 | Gomes | G06F 3/167 |
| 2020/0184966 | A1 * | 6/2020 | Yavagal | G10L 15/30 |
| 2020/0312318 | A1 * | 10/2020 | Olson | G10L 15/08 |
| 2021/0012773 | A1 * | 1/2021 | Liu | H04R 1/1016 |
| 2021/0065699 | A1 | 3/2021 | Kaushik et al. | |
| 2021/0118461 | A1 * | 4/2021 | Boeen | G10L 21/007 |
| 2021/0125609 | A1 | 4/2021 | Dusan et al. | |
| 2021/0256979 | A1 | 8/2021 | Zhang et al. | |
| 2021/0287674 | A1 * | 9/2021 | Unruh | H04R 3/04 |
| 2022/0270593 | A1 * | 8/2022 | Rivolta | G06N 5/01 |
| 2022/0301574 | A1 * | 9/2022 | Zheng | G10L 21/0216 |
| 2022/0358924 | A1 * | 11/2022 | Ganong, III | G06F 3/167 |
| 2023/0022800 | A1 * | 1/2023 | Wu | G10L 15/285 |
| 2023/0049919 | A1 * | 2/2023 | Du | G01H 1/00 |
| 2023/0260502 | A1 * | 8/2023 | Gabrys | G10L 19/16 |
| | | | | 704/260 |
| 2023/0315176 | A1 * | 10/2023 | Li | G10L 25/21 |
| | | | | 713/300 |
| 2023/0317092 | A1 * | 10/2023 | Qi | H04R 3/005 |
| | | | | 704/226 |

FOREIGN PATENT DOCUMENTS

| | | |
|---|---|---|
| CN | 109036412 A | 12/2018 |
| CN | 110931031 A | 3/2020 |
| CN | 112017696 A | 12/2020 |
| CN | 112216277 A | 1/2021 |
| CN | 112399297 A | 2/2021 |
| CN | 113053371 A | 6/2021 |
| CN | 113259793 A | 8/2021 |
| CN | 112334977 B | 5/2024 |
| EP | 2801974 A2 | 11/2014 |
| JP | H0588692 A | 4/1993 |
| JP | 2003264883 A | 9/2003 |
| JP | 2004128651 A | 4/2004 |
| JP | 2019168674 A | 10/2019 |
| JP | 2020118906 A | 8/2020 |
| JP | 2021510427 A | 4/2021 |

* cited by examiner

Diagram of a time
sequence of a signal

Time

REMOTE DATA ACCESS AND SPEECH WAKEUP USING BONE CONDUCTION SIGNAL FUSION

CROSS-REFERENCE TO RELATED APPLICATIONS

This is a continuation of International Patent Application No. PCT/CN2022/095443 filed on May 27, 2022, which claims priority to Chinese Patent Application No. 202111005443.6 filed on Aug. 30, 2021. The disclosures of the aforementioned applications are hereby incorporated by reference in their entireties.

FIELD

Embodiments of this disclosure relate to the field of speech recognition technologies, and in particular, to a speech wakeup method and apparatus, a device, a storage medium, and a program product.

BACKGROUND

Currently, more smart devices complete tasks through speech control. Usually, the smart device needs to be woken up by inputting a wakeup word through user speech, to receive an instruction to complete a task. In addition, with development of bone conduction devices, a large quantity of bone conduction microphones is used in wearable devices, and the wearable device wakes up the smart device. The wearable device may be a wireless headset, smart glasses, a smart watch, or the like. A sensor in the bone conduction microphone is a non-acoustic sensor. The sensor collects a vibration signal of a vocal cord generated when a user speaks, and converts the vibration signal into an electrical signal, where the electrical signal is referred to as a bone conduction signal.

In a conventional technology, a bone conduction microphone and an air microphone are installed in the wearable device. To implement low power consumption of the wearable device, before the smart device is woken up, the air microphone is in a sleep state. Because power consumption of the bone conduction microphone is low, the bone conduction microphone may be configured to collect a bone conduction signal, and speech detection (for example, voice activity detection (VAD)) is performed based on the bone conduction signal, to control a switch of the air microphone to reduce power consumption. When it is determined, through speech detection, that currently there is a speech input, the air microphone is turned on, and an air conduction signal is collected by using the air microphone, and a wakeup word is recognized based on the air conduction signal, that is, speech wakeup is performed.

However, because there is an algorithm delay in speech detection, a speech header of an input command word may be truncated, that is, the collected air conduction signal may lose the header, and does not include complete information of the command word input by a sound source. Consequently, recognition accuracy of a wakeup word is low, and accuracy of speech wakeup is low.

SUMMARY

Embodiments of this disclosure provide a speech wakeup method and apparatus, a device, a storage medium, and a program product, to improve accuracy of speech wakeup. The technical solutions are as follows.

According to a first aspect, a speech wakeup method is provided, and the method includes: performing speech detection based on a bone conduction signal collected by a bone conduction microphone, where the bone conduction signal includes information about a command word input by a sound source; when a speech input is detected, detecting a wakeup word based on the bone conduction signal; and when it is detected that the command word includes the wakeup word, performing speech wakeup on a to-be-woken-up device.

In this embodiment of this disclosure, the bone conduction microphone collects the bone conduction signal for speech detection, to ensure low power consumption. In addition, it is considered that a delay of speech detection may cause losing of a header of a collected air conduction signal, and consequently, complete information of the command word input by the sound source is not included. However, the bone conduction signal collected by the bone conduction microphone includes the information about the command word input by the sound source, that is, the bone conduction signal does not lose a header. Therefore, this solution detects the wakeup word based on the bone conduction signal. In this way, recognition accuracy of the wakeup word is high, and accuracy of speech wakeup is high.

Optionally, the detecting a wakeup word based on the bone conduction signal includes: determining a fusion signal based on the bone conduction signal; and performing wakeup word detection on the fusion signal. It should be noted that the fusion signal determined based on the bone conduction signal also includes the information about the command word input by the sound source.

Optionally, before the determining a fusion signal based on the bone conduction signal, the method further includes: turning on an air microphone, and collecting an air conduction signal by using the air microphone. The determining a fusion signal based on the bone conduction signal includes: fusing a start part of the bone conduction signal and the air conduction signal, to obtain the fusion signal, where the start part of the bone conduction signal is determined based on a detection delay of the speech detection; generating an enhancement start signal based on a start part of the bone conduction signal, and fusing the enhancement start signal and the air conduction signal, to obtain the fusion signal, where the start part of the bone conduction signal is determined based on a detection delay of the speech detection; or directly fusing the bone conduction signal and the air conduction signal, to obtain the fusion signal. In other words, this embodiment of this disclosure provides three methods for performing header loss compensation on the air conduction signal based on the bone conduction signal, that is, directly performing header loss compensation on the air conduction signal through explicit signal fusion. Optionally, signal fusion is performed through signal concatenation.

Optionally, the determining a fusion signal based on the bone conduction signal includes: determining the bone conduction signal as the fusion signal. In other words, in this embodiment of this disclosure, the wakeup word may be directly detected based on the bone conduction signal.

Optionally, the performing wakeup word detection on the fusion signal includes: inputting a plurality of audio frames included in the fusion signal to a first acoustic model, to obtain a plurality of posterior probability vectors output by the first acoustic model, where the plurality of posterior probability vectors one-to-one correspond to the plurality of audio frames, and a first posterior probability vector in the plurality of posterior probability vectors indicates a probability that a phoneme of a first audio frame in the plurality of audio frames belongs to a plurality of specified phonemes; and detecting the wakeup word based on the plurality of posterior probability vectors. In other words, the fusion signal is first processed by using the first acoustic model, to obtain the plurality of posterior probability vectors respectively corresponding to the plurality of audio frames included in the fusion signal. Then, the wakeup word is detected based on the plurality of posterior probability vectors, for example, the plurality of posterior probability vectors are decoded, to detect the wakeup word.

Optionally, before the detecting a wakeup word based on the bone conduction signal, the method further includes: turning on an air microphone, and collecting an air conduction signal by using the air microphone. The detecting a wakeup word based on the bone conduction signal includes: determining a plurality of posterior probability vectors based on the bone conduction signal and the air conduction signal, where the plurality of posterior probability vectors one-to-one correspond to a plurality of audio frames included in the bone conduction signal and the air conduction signal, and a first posterior probability vector in the plurality of posterior probability vectors indicates a probability that a phoneme of a first audio frame in the plurality of audio frames belongs to a plurality of specified phonemes; and detecting the wakeup word based on the plurality of posterior probability vectors. In other words, in this embodiment of this disclosure, signal fusion may not be performed, but a posterior probability vector corresponding to each audio frame is directly determined based on the bone conduction signal and the air conduction signal, so that the plurality of obtained posterior probability vectors implicitly include, in a phoneme probability manner, the information about the command word input by the sound source, that is, the bone conduction signal is implicitly used to perform header loss compensation on the air conduction signal.

Optionally, the determining a plurality of posterior probability vectors based on the bone conduction signal and the air conduction signal includes: inputting a start part of the bone conduction signal and the air conduction signal to a second acoustic model, to obtain a first quantity of bone conduction posterior probability vectors and a second quantity of air conduction posterior probability vectors that are output by the second acoustic model, where the start part of the bone conduction signal is determined based on a detection delay of the speech detection, the first quantity of bone conduction posterior probability vectors one-to-one corresponds to an audio frame included in the start part of the bone conduction signal, and the second quantity of air conduction posterior probability vectors one-to-one corresponds to an audio frame included in the air conduction signal; and fusing a first bone conduction posterior probability vector and a first air conduction posterior probability vector, to obtain a second posterior probability vector, where the first bone conduction posterior probability vector corresponds to a last audio frame of the start part of the bone conduction signal, duration of the last audio frame is less than frame duration, the first air conduction posterior probability vector corresponds to a $1^{st}$ audio frame of the air conduction signal, duration of the $1^{st}$ audio frame is less than the frame duration, and the plurality of posterior probability vectors include the second posterior probability vector, a vector in the first quantity of bone conduction posterior probability vectors other than the first bone conduction posterior probability vector, and a vector in the second quantity of air conduction posterior probability vectors other than the first air conduction posterior probability vector. In other words, in this embodiment of this disclosure, the start part of the bone conduction signal and the air conduction signal may be separately processed by using the second acoustic model, to obtain the corresponding bone conduction posterior probability vector and air conduction posterior probability vector. Then, the first bone conduction posterior probability vector and the first air conduction posterior probability vector are fused, to implicitly perform header loss compensation on the air conduction signal based on the bone conduction signal.

Optionally, the determining a plurality of posterior probability vectors based on the bone conduction signal and the air conduction signal includes: inputting a start part of the bone conduction signal and the air conduction signal to a third acoustic model, to obtain the plurality of posterior probability vectors output by the third acoustic model, where the start part of the bone conduction signal is determined based on a detection delay of the speech detection; or inputting the bone conduction signal and the air conduction signal to a third acoustic model, to obtain the plurality of posterior probability vectors output by the third acoustic model. In other words, in this embodiment of this disclosure, the start part of the bone conduction signal and the air conduction signal may be separately input to the third acoustic model, to directly obtain the plurality of posterior probability vectors by using the third acoustic model. In other words, in a process of processing the start part of the bone conduction signal and the air conduction signal by using the third acoustic model, the two parts of signals are implicitly fused, that is, header loss compensation is implicitly performed on the air conduction signal based on the bone conduction signal.

Optionally, the detecting the wakeup word based on the plurality of posterior probability vectors includes: determining, based on the plurality of posterior probability vectors and a phoneme sequence corresponding to the wakeup word, a confidence that a phoneme sequence corresponding to the command word includes the phoneme sequence corresponding to the wakeup word; and when the confidence exceeds a confidence threshold, determining that it is detected that the command word includes the wakeup word. For example, the plurality of posterior probability vectors are decoded, to obtain the confidence. Then, whether the command word includes the wakeup word is determined based on the confidence threshold, that is, when a confidence condition is met, it is determined that it is detected that the command word includes the wakeup word.

Optionally, the detecting the wakeup word based on the plurality of posterior probability vectors includes: determining, based on the plurality of posterior probability vectors and a phoneme sequence corresponding to the wakeup word, a confidence that a phoneme sequence corresponding to the command word includes the phoneme sequence corresponding to the wakeup word; and when the confidence exceeds a confidence threshold, and the plurality of posterior probability vectors and a plurality of template vectors meet a distance condition, determining that it is detected that the command word includes the wakeup word, where the plurality of template vectors indicate a probability that a phoneme of a speech signal including complete information of the wakeup word belongs to the plurality of specified phonemes. In other words, when the confidence condition is met and templates match, it is determined that it is detected that the command word includes the wakeup word, to avoid false wakeup as much as possible.

Optionally, when the plurality of posterior probability vectors one-to-one correspond to the plurality of template vectors, the distance condition includes: a mean of distances between the plurality of posterior probability vectors and the corresponding template vectors is less than a distance threshold. In other words, whether templates match may be determined based on an average distance between vectors.

Optionally, the method further includes: obtaining a bone conduction registration signal, where the bone conduction registration signal includes the complete information of the wakeup word; and determining the confidence threshold and the plurality of template vectors based on the bone conduction registration signal and the phoneme sequence corresponding to the wakeup word. In other words, in this embodiment of this disclosure, in a wakeup word registration process, the confidence threshold and the plurality of template vectors may further be determined based on the bone conduction registration signal including the complete information of the wakeup word, and in a subsequent speech wakeup process, the wakeup word is detected based on the obtained confidence threshold and the plurality of obtained template vectors. This can improve accuracy of wakeup word detection, and further reduce false wakeup.

Optionally, the determining the confidence threshold and the plurality of template vectors based on the bone conduction registration signal and the phoneme sequence corresponding to the wakeup word includes: determining a fusion registration signal based on the bone conduction registration signal; and determining the confidence threshold and the plurality of template vectors based on the fusion registration signal and the phoneme sequence corresponding to the wakeup word. In other words, in a process of wakeup word registration, the fusion registration signal may be first obtained through signal fusion, where the obtained fusion registration signal includes the information about the command word input by the sound source. Further, the confidence threshold and the plurality of template vectors are determined based on the fusion registration signal.

Optionally, the determining the confidence threshold and the plurality of template vectors based on the fusion registration signal and the phoneme sequence corresponding to the wakeup word includes: inputting a plurality of registration audio frames included in the fusion registration signal to the first acoustic model, to obtain a plurality of registration posterior probability vectors output by the first acoustic model, where the plurality of registration posterior probability vectors one-to-one correspond to the plurality of registration audio frames, and a first registration posterior probability vector in the plurality of registration posterior probability vectors indicates a probability that a phoneme of a first registration audio frame in the plurality of registration audio frames belongs to the plurality of specified phonemes; determining the plurality of registration posterior probability vectors as the plurality of template vectors; and determining the confidence threshold based on the plurality of registration posterior probability vectors and the phoneme sequence corresponding to the wakeup word. In other words, processing of the fusion registration signal in the process of wakeup word registration is similar to processing of the fusion signal in the speech wakeup process. The fusion registration signal is also first processed by using the first acoustic model, to obtain the plurality of registration posterior probability vectors respectively corresponding to the plurality of registration audio frames included in the fusion registration signal. Then, the confidence threshold is determined based on the plurality of posterior probability vectors and the phoneme sequence corresponding to the wakeup word. For example, the plurality of registration posterior probability vectors are decoded to determine the confidence threshold.

In addition, the plurality of registration posterior probability vectors may alternatively be determined as the plurality of template vectors.

Optionally, before the determining the confidence threshold based on the bone conduction registration signal and the phoneme sequence corresponding to the wakeup word, the method further includes: obtaining an air conduction registration signal. The determining the confidence threshold based on the bone conduction registration signal and the phoneme sequence corresponding to the wakeup word includes: determining a plurality of registration posterior probability vectors based on the bone conduction registration signal and the air conduction registration signal, where the plurality of registration posterior probability vectors one-to-one correspond to a plurality of registration audio frames included in the bone conduction registration signal and the air conduction registration signal, and a first registration posterior probability vector in the plurality of registration posterior probability vectors indicates a probability that a phoneme of a first registration audio frame in the plurality of registration audio frames belongs to the plurality of specified phonemes; and determining the confidence threshold based on the plurality of registration posterior probability vectors and the phoneme sequence corresponding to the wakeup word. In other words, in the process of wakeup word registration, signal fusion may not be performed first, and a registration posterior probability vector separately corresponding to each registration audio frame is directly determined based on the bone conduction registration signal and the air conduction registration signal.

According to a second aspect, a speech wakeup apparatus is provided, and the speech wakeup apparatus has a function of implementing the speech wakeup method in the first aspect. The speech wakeup apparatus includes one or more modules, and the one or more modules are configured to implement the speech wakeup method in the first aspect.

In other words, a speech wakeup apparatus is provided, and the apparatus includes: a speech detection module, configured to perform speech detection based on a bone conduction signal collected by a bone conduction microphone, where the bone conduction signal includes information about a command word input by a sound source; a wakeup word detection module, configured to: when a speech input is detected, detect a wakeup word based on the bone conduction signal; and a speech wakeup module, configured to: when it is detected that the command word includes the wakeup word, perform speech wakeup on a to-be-woken-up device.

Optionally, the wakeup word detection module includes: a first determining submodule, configured to determine a fusion signal based on the bone conduction signal; and a wakeup word detection submodule, configured to perform wakeup word detection on the fusion signal.

Optionally, the apparatus further includes: a processing module, configured to turn on an air microphone, and collect an air conduction signal by using the air microphone.

The first determining submodule is configured to: fuse a start part of the bone conduction signal and the air conduction signal, to obtain the fusion signal, where the start part of the bone conduction signal is determined based on a detection delay of the speech detection; generate an enhancement start signal based on a start part of the bone conduction signal, and fuse the enhancement start signal and the air conduction signal, to obtain the fusion signal, where the start part of the bone conduction signal is determined based on a detection delay of the speech detection; or directly fuse the bone conduction signal and the air conduction signal, to obtain the fusion signal.

Optionally, the wakeup word detection submodule is configured to: input a plurality of audio frames included in the fusion signal to a first acoustic model, to obtain a plurality of posterior probability vectors output by the first acoustic model, where the plurality of posterior probability vectors one-to-one correspond to the plurality of audio frames, and a first posterior probability vector in the plurality of posterior probability vectors indicates a probability that a phoneme of a first audio frame in the plurality of audio frames belongs to a plurality of specified phonemes; and detect the wakeup word based on the plurality of posterior probability vectors.

Optionally, the apparatus further includes: a processing module, configured to turn on an air microphone, and collect an air conduction signal by using the air microphone.

The wakeup word detection module includes: a second determining submodule, configured to determine a plurality of posterior probability vectors based on the bone conduction signal and the air conduction signal, where the plurality of posterior probability vectors one-to-one correspond to a plurality of audio frames included in the bone conduction signal and the air conduction signal, and a first posterior probability vector in the plurality of posterior probability vectors indicates a probability that a phoneme of a first audio frame in the plurality of audio frames belongs to a plurality of specified phonemes; and a wakeup word detection submodule, configured to detect the wakeup word based on the plurality of posterior probability vectors.

Optionally, the second determining submodule is configured to: input a start part of the bone conduction signal and the air conduction signal to a second acoustic model, to obtain a first quantity of bone conduction posterior probability vectors and a second quantity of air conduction posterior probability vectors that are output by the second acoustic model, where the start part of the bone conduction signal is determined based on a detection delay of the speech detection, the first quantity of bone conduction posterior probability vectors one-to-one corresponds to an audio frame included in the start part of the bone conduction signal, and the second quantity of air conduction posterior probability vectors one-to-one corresponds to an audio frame included in the air conduction signal; and fuse a first bone conduction posterior probability vector and a first air conduction posterior probability vector, to obtain a second posterior probability vector, where the first bone conduction posterior probability vector corresponds to a last audio frame of the start part of the bone conduction signal, duration of the last audio frame is less than frame duration, the first air conduction posterior probability vector corresponds to a $1^{st}$ audio frame of the air conduction signal, duration of the $1^{st}$ audio frame is less than the frame duration, and the plurality of posterior probability vectors include the second posterior probability vector, a vector in the first quantity of bone conduction posterior probability vectors other than the first bone conduction posterior probability vector, and a vector in the second quantity of air conduction posterior probability vectors other than the first air conduction posterior probability vector.

Optionally, the second determining submodule is configured to: input a start part of the bone conduction signal and the air conduction signal to a third acoustic model, to obtain the plurality of posterior probability vectors output by the third acoustic model, where the start part of the bone conduction signal is determined based on a detection delay of the speech detection; or input the bone conduction signal and the air conduction signal to a third acoustic model, to obtain the plurality of posterior probability vectors output by the third acoustic model.

Optionally, the wakeup word detection submodule is configured to: determine, based on the plurality of posterior probability vectors and a phoneme sequence corresponding to the wakeup word, a confidence that a phoneme sequence corresponding to the command word includes the phoneme sequence corresponding to the wakeup word; and when the confidence exceeds a confidence threshold, determine that it is detected that the command word includes the wakeup word.

Optionally, the wakeup word detection submodule is configured to: determine, based on the plurality of posterior probability vectors and a phoneme sequence corresponding to the wakeup word, a confidence that a phoneme sequence corresponding to the command word includes the phoneme sequence corresponding to the wakeup word; and when the confidence exceeds a confidence threshold, and the plurality of posterior probability vectors and a plurality of template vectors meet a distance condition, determine that it is detected that the command word includes the wakeup word, where the plurality of template vectors indicate a probability that a phoneme of a speech signal including complete information of the wakeup word belongs to the plurality of specified phonemes.

Optionally, when the plurality of posterior probability vectors one-to-one correspond to the plurality of template vectors, the distance condition includes: a mean of distances between the plurality of posterior probability vectors and the corresponding template vectors is less than a distance threshold.

Optionally, the apparatus further includes: an obtaining module, configured to obtain a bone conduction registration signal, where the bone conduction registration signal includes the complete information of the wakeup word; and a determining module, configured to determine the confidence threshold and the plurality of template vectors based on the bone conduction registration signal and the phoneme sequence corresponding to the wakeup word.

Optionally, the determining module includes: a third determining submodule, configured to determine a fusion registration signal based on the bone conduction registration signal; and a fourth determining submodule, configured to determine the confidence threshold and the plurality of template vectors based on the fusion registration signal and the phoneme sequence corresponding to the wakeup word.

Optionally, the fourth determining submodule is configured to: input a plurality of registration audio frames included in the fusion registration signal to the first acoustic model, to obtain a plurality of registration posterior probability vectors output by the first acoustic model, where the plurality of registration posterior probability vectors one-to-one correspond to the plurality of registration audio frames, and a first registration posterior probability vector in the plurality of registration posterior probability vectors indicates a probability that a phoneme of a first registration audio frame in the plurality of registration audio frames belongs to the plurality of specified phonemes; determine the plurality of registration posterior probability vectors as the plurality of template vectors; and determine the confidence threshold based on the plurality of registration posterior probability vectors and the phoneme sequence corresponding to the wakeup word.

Optionally, the apparatus further includes: an obtaining module, configured to obtain an air conduction registration signal.

The determining module includes: a fifth determining submodule, configured to determine a plurality of registration posterior probability vectors based on the bone conduction registration signal and the air conduction registration signal, where the plurality of registration posterior probability vectors one-to-one correspond to a plurality of registration audio frames included in the bone conduction registration signal and the air conduction registration signal, and a first registration posterior probability vector in the plurality of registration posterior probability vectors indicates a probability that a phoneme of a first registration audio frame in the plurality of registration audio frames belongs to the plurality of specified phonemes; and a sixth determining submodule, configured to determine the confidence threshold based on the plurality of registration posterior probability vectors and the phoneme sequence corresponding to the wakeup word.

According to a third aspect, an electronic device is provided. The electronic device includes a processor and a memory. The memory is configured to store a program for performing the speech wakeup method in the first aspect, and store data used to implement the speech wakeup method in the first aspect. The processor is configured to execute the program stored in the memory. An operation apparatus of the electronic device may further include a communication bus, and the communication bus is used to establish a connection between the processor and the memory.

According to a fourth aspect, a computer-readable storage medium is provided. The computer-readable storage medium stores instructions, and when the instructions are run on a computer, the computer is enabled to perform the speech wakeup method in the first aspect.

According to a fifth aspect, a computer program product including instructions is provided. When the computer program product is run on a computer, the computer is enabled to perform the speech wakeup method in the first aspect.

Technical effects achieved in the second aspect, the third aspect, the fourth aspect, and the fifth aspect are similar to those achieved by corresponding technical means in the first aspect. Details are not described again herein.

The technical solutions provided in embodiments of this disclosure can bring at least the following beneficial effects:

In embodiments of this disclosure, the bone conduction microphone collects the bone conduction signal for speech detection, to ensure low power consumption. In addition, it is considered that a delay of speech detection may cause losing of a header of a collected air conduction signal, and consequently, complete information of the command word input by the sound source is not included. However, the bone conduction signal collected by the bone conduction microphone includes the information about the command word input by the sound source, that is, the bone conduction signal does not lose a header. Therefore, this solution detects the wakeup word based on the bone conduction signal. In this way, recognition accuracy of the wakeup word is high, and accuracy of speech wakeup is high.

DETAILED DESCRIPTION

Figure 1:
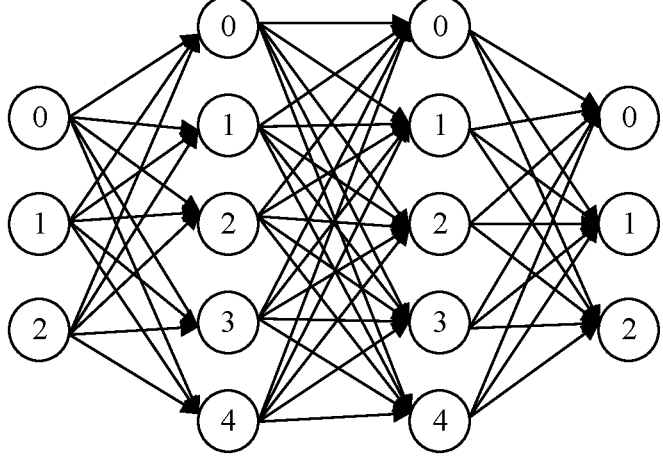
FIG. 1 is a schematic diagram of a structure of an acoustic model according to an embodiment of this disclosure.

To make the objectives, technical solutions, and advantages of embodiments of this disclosure clearer, the following further describes implementations of this disclosure in detail with reference to the accompanying drawings.

For ease of understanding, some names or terms in embodiments of this disclosure are first described.

Speech recognition is also referred to as automatic speech recognition (ASR). The speech recognition is recognizing vocabulary content included in a speech signal by using a computer.

Speech wakeup is also referred to as keyword spotting (KWS), wakeup word detection, wakeup word recognition, and the like. The speech wakeup is detecting a wakeup word in a continuous speech stream in real time, and waking up a smart device when detecting that a noun input by a sound source is the wakeup word.

Deep learning (DL) is a learning algorithm based on data representation in machine learning.

The following describes knowledge related to speech recognition in embodiments of this disclosure.

VAD:

The VAD is used to determine when there is a speech input and when it is a mute state, and is further used to capture a valid segment from the speech input. Subsequent operations of speech recognition are all performed on the valid segment captured through VAD, to reduce a noise recognition error rate and system power consumption of a speech recognition system. In a near field environment, due to limited attenuation of a speech signal, a signal-to-noise ratio (SNR) is high, and only a simple manner (for example, a zero-crossing rate and signal energy) is required to perform VAD. However, in a far field environment, because a transmission distance of a speech signal is long and attenuation is serious, an SNR of data collected by a microphone is low. In this case, effect of a simple VAD method is poor. VAD by using a deep neural network is a common method in the speech recognition system based on deep learning. The VAD is an implementation of speech detection. In embodiments of this disclosure, an example in which speech detection is performed through VAD is used for description. In another embodiment, speech detection may alternatively be performed in another manner.

Speech Recognition

For the speech recognition system, a first step is to detect whether there is a speech input, namely, VAD. In a low-power consumption design, the VAD operates in an always on mechanism compared with another part of speech recognition. When a speech input is detected through VAD, a subsequent recognition system is woken up through VAD. The recognition system mainly includes feature extraction, recognition modeling, and decoding to obtain a recognition result. Model training includes acoustic model training, language model training, and the like. Speech recognition is essentially a process of converting an audio sequence into a text sequence, that is, searching for a text sequence with a maximum probability under the given speech input. According to the Bayesian principle, speech recognition may be divided into a conditional probability that speech appears in a given text sequence and a prior probability that the text sequence appears. A model obtained by modeling the conditional probability is an acoustic model, and a model obtained by modeling the prior probability that the text sequence appears is a language model.

It should be noted that, to analyze and recognize a speech signal, frame division needs to be performed on the speech signal, that is, the speech signal is divided into a plurality of segments, and each segment is referred to as one frame. The frame division operation is usually not simply division, but is implemented by using a window function. After frame division, adjacent frames usually overlap. An audio frame in embodiments of this disclosure is an audio frame obtained through frame division, and frame division is used to enable an acoustic model to analyze a sound signal. For example, frame division is performed on the speech signal by using the window function. It is assumed that the window function indicates that frame division is performed by using a frame length of 25 milliseconds (ms) and a frame shift of 10 ms, a length of each audio frame after frame division is 25 ms, and there is an overlap of 25−10=15 ms between two adjacent frames.

The following describes two concepts. A phoneme forms pronunciation of a word, and is a pronunciation unit. An English phoneme set (namely, a pronunciation dictionary) is, for example, a phoneme set including 39 phonemes of Carnegie Mellon University. A Chinese phoneme set is, for example, a phoneme set directly using all initials and finals. Alternatively, if there are tones and no tones, a phoneme set includes more phonemes. For example, in embodiments of this disclosure, the phoneme set includes 100 phonemes. A state may be considered as a phonetic unit that is more detailed than a phoneme. A phoneme is usually divided into three states. In embodiments of this disclosure, one audio frame corresponds to one phoneme, and several phonemes form one word (character). Therefore, as long as a phoneme corresponding to each audio frame is learned of, a result of speech recognition is obtained. In some embodiments, several audio frames correspond to one state, every three states are combined into one phoneme, and several phonemes are combined into one word. Therefore, as long as a state corresponding to each audio frame is learned of, a result of speech recognition is obtained.

Acoustic Model, Decoding, and Speech Wakeup

In speech recognition, for example, one audio frame corresponds to one phoneme. A probability that a phoneme corresponding to each audio frame is a phoneme in a phoneme set can be learned of by using an acoustic model. In other words, the probability is a posterior probability vector corresponding to an audio. Commonly, the acoustic model has a large quantity of parameters, and a posterior probability vector corresponding to each audio frame can be learned of based on the parameters. The parameters can be obtained by training the acoustic model, and training of the acoustic model requires a large amount of speech data. After the posterior probability vector corresponding to each audio frame is obtained by using the acoustic model, a decoding graph (which may also be referred to as a state network, search space, or the like) is constructed by using a language model and according to a pronunciation dictionary, and the like, and posterior probability vectors corresponding to a plurality of consecutive audio frames output by the acoustic model are used as an input of the decoding graph. An optimal path is searched for in the decoding graph, and a probability that the corresponding phoneme of speech is on this path is the largest. After the optimal path is found, the phoneme corresponding to each audio frame can be learned of, that is, an optimal word string obtained through speech recognition is obtained. A process of searching the state network for the optimal path to obtain the word string may be considered as decoding, and decoding is to determine a word string corresponding to a speech signal.

However, in speech wakeup decoding in embodiments of this disclosure, a probability of each phoneme on the decoding path is searched for in the decoding graph, and a probability of each found phoneme is added, to obtain a path score. The decoding path is a phoneme sequence corresponding to the wakeup word. If the path score is large, it is detected that the command word includes the wakeup word. In other words, decoding in embodiments of this disclosure is to determine, based on the decoding graph, whether a word string corresponding to the speech signal is the wakeup word.

To describe embodiments of this disclosure, the following first describes the acoustic model in embodiments of this disclosure. The acoustic model is a model that can recognize a single phoneme, and can be modeled by using a hidden Markov model (HMM). The acoustic model is a trained model, and may be trained by using an acoustic feature of a sound signal and a corresponding label. Corresponding probability distribution between an acoustic signal and a modeling unit is established in the acoustic model. The modeling unit is, for example, an HMM state, a phoneme, a syllable, and a character, and may also be referred to as a pronunciation unit. A structure of the acoustic model is, for example, a GMM-HMM, a DNN-HMM, or DNN-CTC. A GMM indicates a Gaussian mixture model, a DNN indicates a deep neural network, and connectionist temporal classification (CTC) indicates time sequence classification based on a neural network. In embodiment of this disclosure, an example in which the modeling unit is a phoneme and the acoustic model is a DNN-HMM model is used for description. It should be noted that, in embodiments of this disclosure, the acoustic model may perform audio processing frame by frame, and output a probability that a phoneme of each audio frame belongs to a plurality of specified phonemes. The plurality of specified phonemes may be determined according to the pronunciation dictionary. For example, the pronunciation dictionary includes 100 phonemes, and the plurality of specified phonemes are the 100 phonemes.

FIG. 1 is a schematic diagram of a structure of an acoustic model according to an embodiment of this disclosure. The acoustic model is a DNN-HMM model. A dimension of an input layer of the acoustic model is 3, a dimension of two hidden layers is 5, and a dimension of an output layer is 3. The dimension of the input layer indicates a feature dimension of an input signal, the dimension of the output layer indicates three state dimensions, and each state dimension includes probabilities corresponding to the plurality of specified phonemes.

Then, decoding is further described. Decoding in speech recognition can be divided into dynamic decoding and static decoding. During dynamic decoding, a language score is dynamically searched for in a language model with a dictionary tree as a center. Static decoding means that the language model is statically encoded into the decoding graph in advance, and some column optimization operations such as determinization, weight forward, and minimization are used, to improve decoding efficiency. For example, in embodiments of this disclosure, static decoding, for example, a weighted finite state transducer (WFST), is used to eliminate redundant information based on an HCLG network. In embodiments of this disclosure, for generating the HCLG network, the language model, the pronunciation dictionary, and the acoustic model need to be represented in a corresponding FST format, and then compiled into a large decoding graph by performing operations such as combination, determinization, and minimization. A process of constructing the HCLG network is as follows: HCLG=ASL(min (RDS(det(H'o min(det(C o min(det(Lo G))))))). ASL indicates adding a self-loop, min indicates minimization, RDS indicates removing a symbol, det indicates determinization, H' indicates an HMM without a self-loop, and o indicates combination.

During decoding, the Viterbi algorithm is used to search the decoding graph for the optimal path, and two identical paths do not exist in the decoding graph. During decoding, cumulative beam pruning is used, that is, a beam value is subtracted from a path score with a maximum current probability as a threshold, and a path less than the threshold is pruned. In addition, a frame synchronization decoding algorithm is used to: search for a start node of the decoding graph; create a token of the corresponding node; extend an empty edge (that is, an input does not correspond to a real modeling unit) from a token corresponding to the start node, where each reachable node is bound to a corresponding token; and perform pruning, and retain an active token. Each time an audio frame is input, a token is extracted from a current active token, a subsequent non-empty edge (that is, an input corresponds to a real physical modeling unit) starts to be extended from a corresponding node, all active tokens are traversed, pruning is performed, and the active token of the current frame is retained. The steps are repeated until all audio frames are extended, that is, a token with a maximum score is found, and a final recognition result is obtained through backtracking.

Network Model

In embodiments of this disclosure, the network model is the foregoing acoustic model. A speech signal is recognized by using the network model, for example, an HMM, a GMM, a DNN, a deep belief network-hidden Markov model (DBN-HMM), a recurrent neural network (RNN), a long short-term memory (LSTM) network, or a convolutional neural network (CNN). In embodiments of this disclosure, a CNN and an HMM are used.

The HMM is a statistical model, and is widely used in the field of speech signal processing. In the model, whether one state in a Markov chain is transferred to another state depends on a state transition probability, and an observation value generated by a state depends on a state generation probability. During speech recognition, the HMM first establishes an acoustic model for each recognition unit, and obtains a state transition probability matrix and an output probability matrix through long-time training. During recognition, the HMM makes a decision based on a maximum probability in a state transition process.

A basic structure of the CNN includes two parts. One part is a feature extraction layer. An input of each neural unit is connected to a local receptive field at a previous layer, to extract a feature of the local receptive field. The other part is a feature mapping layer. Each computing layer of the network includes a plurality of feature mappings, each feature mapping is a plane, and all neurons of the plane have equal weights. A feature mapping structure uses a function (for example, sigmoid) with a small impact range as an activation function of the convolutional network, so that the feature mapping has shift invariance. In addition, neurons of a map plane share weights, to reduce a quantity of free parameters of the network. Each convolutional layer in the CNN can be followed by a computing layer for local averaging and quadratic extraction. This unique structure in which feature extraction is performed for two times reduces feature resolution.

A loss function is an iterative basis of network model training. The loss function is used to evaluate a difference between a predicted value and an actual value of the network model. Selection of the loss function affects performance of the network model. Different network models usually use different loss functions. The loss function can be classified into an empirical risk loss function and a structure risk loss function. The empirical risk loss function means a difference between a predicted result and an actual result. The structure risk loss function means the empirical risk loss function to which a regular term is added. In embodiments of this disclosure, a cross-entropy (CE) loss function is used. The CE loss function is essentially a log-likelihood function, and may be used in binary and multi-class tasks. When sigmoid is used as an activation function, a CR loss function instead of a mean square error loss function is commonly used. Because the CE loss function can perfectly resolve excessively slow weight update of a square loss function, and has good performance of fast weight update when an error is large and slow weight update when an error is small.

In the network model, backpropagation is performed on an error, the loss function is used, and a gradient descent method is used, to adjust a network parameter. The gradient descent method is an optimization algorithm. A central idea is to update a parameter value in a gradient direction of an objective function, to achieve a minimum (or maximum) objective function. The gradient descent method is a common optimization algorithm in deep learning. Gradient descent is for the loss function, and is intended to find a weight and an offset corresponding to a minimum value of the loss function as soon as possible. A core of a backpropagation algorithm is to define a special variable of a neuron error. Backpropagation is performed on the neuron error layer by layer from the output layer. Then, partial derivatives of the weight and the offset are calculated according to a formula and the neuron error. Gradient descent is a manner to resolve a minimum value, and backpropagation is a manner to resolve gradient calculation.

Figure 2:
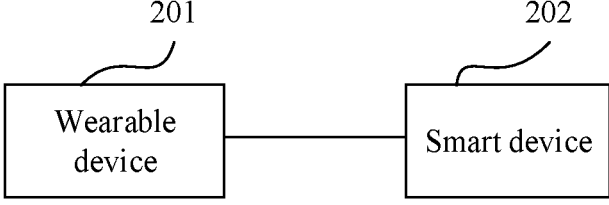
FIG. 2 is a diagram of a system architecture related to a speech wakeup method according to an embodiment of this disclosure.

FIG. 2 is a diagram of a system architecture related to a speech wakeup method according to an embodiment of this disclosure. Refer to FIG. 2. The system architecture may include a wearable device 201 and a smart device 202. The wearable device 201 is connected to the smart device 202 in a wired or wireless manner to perform communication. The smart device 202 is a to-be-woken-up device in this embodiment of this disclosure.

In this embodiment of this disclosure, the wearable device 201 is configured to receive a speech signal, and send an instruction to the smart device 202 based on the received speech signal. The smart device 202 is configured to receive the instruction sent by the wearable device 201, and perform a corresponding operation based on the received instruction. For example, the wearable device 201 is configured to: collect the speech signal, detect a command word included in the collected speech signal, and if it is detected that the command word includes a wakeup word, send a wakeup instruction to the smart device 202, to wake up the smart device 202. The smart device 202 is configured to receive the wakeup instruction, and then enter a working state from a sleep state.

A bone conduction microphone is installed in the wearable device 201. Due to low power consumption of the bone conduction microphone, the bone conduction microphone may constantly be in a working state. The bone conduction microphone is configured to collect a bone conduction signal in the working state. A processor in the wearable device 201 performs VAD based on the bone conduction signal, to detect whether there is a speech input. When a speech input is detected, the processor detects the wakeup word based on the bone conduction signal, to detect whether the command word input by a sound source includes the wakeup word. When it is detected that the command word includes the wakeup word, speech wakeup is performed, that is, the wearable device 201 sends the wakeup instruction to the smart device 202.

In this embodiment of this disclosure, the wearable device 201 is, for example, a wireless headset, smart glasses, a smartwatch, or a smart band. The smart device 202 (namely, the to-be-woken-up device) is, for example, a smart speaker, a smart appliance, a smart toy, or a smart robot. Optionally, in some embodiments, the wearable device 201 and the smart device 202 are a same device.

It should be noted that the system architecture and the service scenario described in embodiments of this disclosure are intended to describe the technical solutions in embodiments of this disclosure more clearly, and do not constitute a limitation on the technical solutions provided in embodiments of this disclosure. A person of ordinary skill in the art may know that: With the evolution of the system architecture and the emergence of new service scenarios, the technical solutions provided in embodiments of this disclosure are also applicable to similar technical problems.

Figure 3:
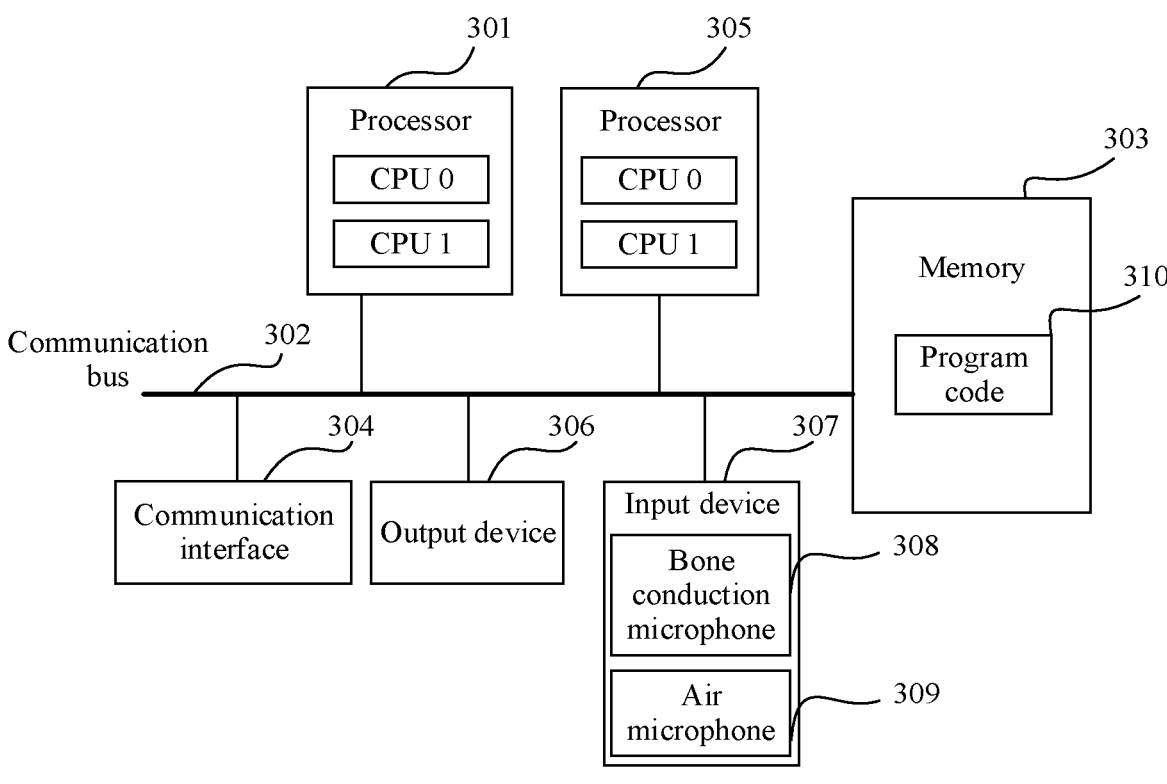
FIG. 3 is a schematic diagram of a structure of an electronic device according to an embodiment of this disclosure.

FIG. 3 is a schematic diagram of a structure of an electronic device according to an embodiment of this disclosure. Optionally, the electronic device is the wearable device 201 shown in FIG. 2. The electronic device includes one or more processors 301, a communication bus 302, a memory 303, one or more communication interfaces 304, a bone conduction microphone 308, and an air microphone 309.

The processor 301 is a general-purpose central processing unit (CPU), a network processor (NP), a microprocessor, or one or more integrated circuits configured to implement the solutions of this disclosure, for example, an application-specific integrated circuit (ASIC), a programmable logic device (PLD), or a combination thereof. Optionally, the PLD is a complex programmable logic device (CPLD), a field programmable gate array (FPGA), a generic array logic (GAL), or any combination thereof.

The communication bus 302 is configured to transmit information between the foregoing components. Optionally, the communication bus 302 is classified into an address bus, a data bus, a control bus, or the like. For ease of representation, only one thick line is used to represent the bus in the figure, but this does not mean that there is only one bus or only one type of bus.

Optionally, the memory 303 is a read-only memory (ROM), a random access memory (RAM), an electrically erasable programmable read-only memory (EEPROM), an optical disc (including a compact disc read-only memory (CD-ROM), a compact disc, a laser disc, a digital versatile disc, a Blu-ray disc, or the like), a magnetic disk storage medium or another magnetic storage device, or any other medium that can be used to carry or store expected program code in a form of instructions or a data structure and that can be accessed by a computer. However, this is not limited hereto. The memory 303 exists independently, and is connected to the processor 301 through the communication bus 302, or the memory 303 is integrated with the processor 301.

The communication interface 304 is configured to communicate with another device or a communication network by using any transceiver-type apparatus. The communication interface 304 includes a wired communication interface, or may optionally include a wireless communication interface. The wired communication interface is, for example, an Ethernet interface. Optionally, the Ethernet interface is an optical interface, an electrical interface, or a combination thereof. The wireless communication interface is a wireless local area network (WLAN) interface, a cellular network communication interface, a combination thereof, or the like.

Optionally, in some embodiments, the electronic device includes a plurality of processors, for example, the processor 301 and a processor 305 shown in FIG. 3. Each of the processors is a single-core processor, or is a multi-core processor. Optionally, the processor herein is one or more devices, circuits, and/or processing cores for processing data (such as computer program instructions).

In some embodiments, the electronic device further includes an output device 306 and an input device 307. The output device 306 communicates with the processor 301, and may display information in a plurality of manners. For example, the output device 306 is a liquid crystal display (LCD), a light emitting diode (LED) display device, a cathode ray tube (CRT) display device, or a projector. The input device 307 communicates with the processor 301, and may receive an input from a user in a plurality of manners. For example, the input device 307 includes one or more of a mouse, a keyboard, a touchscreen device, a sensor, or the like.

In this embodiment of this disclosure, the input device 307 includes the bone conduction microphone 308 and the air microphone 309. The bone conduction microphone 308 and the air microphone 309 are respectively configured to collect a bone conduction signal and an air conduction signal. The processor 301 is configured to wake up the smart device based on the bone conduction signal or based on the bone conduction signal and the air conduction signal by using a speech wakeup method provided in embodiments of this disclosure. Optionally, after waking up the smart device, the processor 301 is further configured to control, based on the bone conduction signal, the air conduction signal, or the bone conduction signal and the air conduction signal, the smart device to execute a task.

In some embodiments, the memory 303 is configured to store program code 310 for executing the solutions of this disclosure, and the processor 301 may execute the program code 310 stored in the memory 303. The program code 310 includes one or more software modules, and the electronic device can implement, by using the processor 301 and the program code 310 in the memory 303, the speech wakeup method provided in the following embodiment in FIG. 4.

Figure 4:
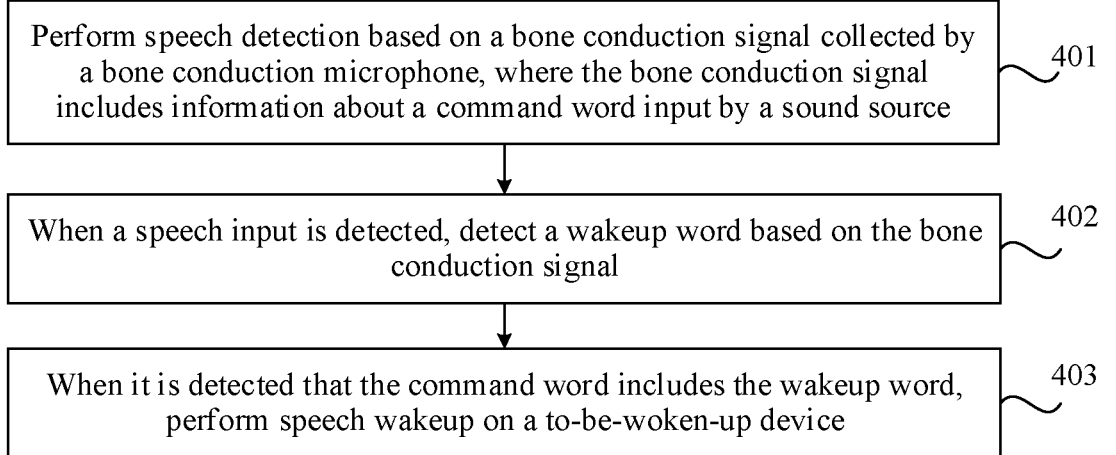
FIG. 4 is a flowchart of a speech wakeup method according to an embodiment of this disclosure.

FIG. 4 is a flowchart of a speech wakeup method according to an embodiment of this disclosure. The method is applied to a wearable device. Refer to FIG. 4. The method includes the following steps.

Step 401: Perform speech detection based on a bone conduction signal collected by a bone conduction microphone, where the bone conduction signal includes information about a command word input by a sound source.

It can be learned from the foregoing that, to implement low power consumption of the wearable device, before a smart device (namely, a to-be-woken-up device) is woken up, due to low power consumption of the bone conduction microphone, the bone conduction microphone may be configured to collect the bone conduction signal, and speech detection (for example, VAD) is performed based on the bone conduction signal, to detect whether there is a speech input. When no speech input is detected, a component of the wearable device other than the bone conduction microphone may be in a sleep state, to reduce power consumption. When a speech input is detected, another component of the wearable device is controlled to be turned on. For example, when an air microphone is further installed in the wearable device, because the air microphone is a device with high power consumption, for a portable wearable device, to reduce power consumption, the air microphone is controlled to be turned on and off. When a speech input is detected (for example, a user is speaking), the air microphone is turned on to perform a sound pickup operation (namely, collecting an air conduction signal), to reduce power consumption of the wearable device. In other words, before the smart device is woken up, the air microphone is in a sleep state to reduce low power consumption, and the air microphone is turned on when a speech input is detected.

There may be a plurality of implementations in which the wearable device performs VAD based on the bone conduction signal collected by the bone conduction microphone. This is not limited in this embodiment of this disclosure. The following describes some implementations of VAD by using examples. It should be noted that VAD is used to detect whether a speech signal of a person exists in a current input signal. VAD is used to determine an input signal, to distinguish a speech segment from a non-speech segment (for example, a segment with only various background noise signals), so that different processing methods can be performed on segments of the signal.

Optionally, VAD is used to detect whether there is a speech input by extracting a feature of an input signal. For example, whether there is a speech input is detected by extracting features of short time energy (STE) and a short time zero-crossing rate (ZCR) of each frame of input signal, that is, VAD is performed based on the features of the energy. The STE is energy of a frame of signal, and the ZCR is a quantity of times that a frame of time domain signal passes through 0 (time axis). For another example, some VAD methods with high precision are used to extract a plurality of features such as an energy-based feature, a frequency domain feature, a cepstrum feature, a harmonic feature, and a long time feature for comprehensive detection. Optionally, in addition to feature extraction, whether a frame of input signal is a speech signal or a non-speech signal may further be determined with reference to threshold comparison, a statistical method, or a machine learning method. The following briefly describes the features such as the energy-based feature, the frequency domain feature, the cepstrum feature, the harmonic feature, and the long time feature.

Energy-based feature: VAD is performed based on the features of the STE and the ZCR. When an SNR is large, for a speech segment, STE is large and a ZCR is small, and for a non-speech segment, STE is small and a ZCR is large. A speech signal of a person usually has large energy, and a large amount of energy is included in a low frequency band, and a noise signal usually has small energy and includes much information of a high frequency band. Therefore, the speech signal and the non-speech signal may be distinguished by extracting the two features of the input signal. A method for calculating the STE may be calculating a sum of squares of energy of each frame of input signal by using a spectrum. A method for calculating the short time ZCR may be calculating a quantity of zero-crossings corresponding to each frame of input signal in time domain. For example, all sampling points in the frame are translated leftward or rightward by one point in time domain, and amplitude values of the sampling points after translation and amplitude values of the sampling points before translation are multiplied at a corresponding point. If a symbol of an obtained product of two corresponding sampling points is negative, it indicates that the corresponding sampling point is a zero-crossing, and the short time ZCR is obtained by calculating a quantity of negative products in the frame.

Frequency domain feature: A time domain signal of the input signal is converted into a frequency domain signal by using short-time Fourier transform or another time-frequency transform method, to obtain a spectrum, and the frequency domain feature is obtained based on the spectrum. For example, an envelope feature of a frequency band is extracted based on the spectrum. In some experiments, when the SNR is 0 dB, long time envelopes of some frequency bands may be used to distinguish between a speech segment and a noise segment.

Cepstrum feature: The cepstrum feature includes, for example, an energy cepstrum peak. For VAD, the energy cepstrum peak determines a fundamental frequency (pitch) of the speech signal. In some embodiments, a Mel-frequency cepstrum coefficient (MFCC) is used as a cepstrum feature.

Feature based on a harmonic wave: An obvious feature of the speech signal is that the speech signal includes a fundamental frequency and a plurality of harmonic frequencies. Even in a strong noise scenario, the harmonic feature exists. The fundamental frequency of the speech signal may be found by using an autocorrelation method.

Long time feature: The speech signal is a non-steady signal. Usually, 10 to 15 phonemes are emitted per second at a common speech speed. Spectral distribution between phonemes is different. Consequently, a speech statistical feature varies with time. Most noise is steady, namely, change slowly, for example, white noise. In view of this, the long time feature may be extracted, to determine whether the input signal is a speech signal or a non-speech signal.

It should be noted that, in this embodiment of this disclosure, the input signal used for VAD is the bone conduction signal collected by the bone conduction microphone, and VAD is performed on each frame of the received bone conduction signal, to detect whether there is a speech input. Because the bone conduction microphone is constantly in a working state, bone conduction signals continuously collected by the bone conduction microphone include complete information of the command word input by the sound source, that is, the bone conduction signal does not lose a header.

Optionally, a sampling rate of the bone conduction signal is 32 kilohertz (kHz), 48 kHz, or the like. This is not limited in this embodiment of this disclosure. A sensor of the bone conduction microphone is a non-acoustic sensor, and can shield effect of noise in a surrounding environment and has strong anti-noise performance.

Step 402: When a speech input is detected, detect a wakeup word based on the bone conduction signal.

In this embodiment of this disclosure, when a speech input is detected, the wearable device detects the wakeup word based on the bone conduction signal, to detect whether the command word includes the wakeup word. It should be noted that there are a plurality of implementations in which the wearable device detects the wakeup word based on the bone conduction signal. The following describes two implementations.

First Implementation

In this embodiment of this disclosure, an implementation in which the wearable device detects the wakeup word based on the bone conduction signal is: determining a fusion signal based on the bone conduction signal; and performing wakeup word detection on the fusion signal.

First, an implementation in which the wearable device determines the fusion signal based on the bone conduction signal is described. It should be noted that there are a plurality of manners in which the wearable device determines the fusion signal based on the bone conduction signal. The following describes four manners.

Manner 1 of determining the fusion signal based on the bone conduction signal: Before the fusion signal is determined based on the bone conduction signal, an air microphone is turned on, and an air conduction signal is collected by using the air microphone. For example, when it is detected that there is a speech input, the air microphone is turned on, and the air conduction signal is collected by using the air microphone. The wearable device fuses a start part of the bone conduction signal and the air conduction signal, to obtain the fusion signal. The start part of the bone conduction signal is determined based on a detection delay of the speech detection (for example, VAD). In other words, the wearable device collects the bone conduction signal and the air conduction signal, and performs header loss compensation on the air conduction signal based on the start part of the bone conduction signal, so that the obtained fusion signal also includes the information about the command word input by the sound source. In addition, a length of the fusion signal is small, and a data processing amount can be reduced to some extent. Optionally, in this embodiment of this disclosure, signal fusion is performed through signal concatenation. In some embodiments, signal fusion may alternatively be performed in a manner such as signal superposition. In the following embodiments, an example in which signal fusion is performed through signal concatenation is used for description.

Figure 5:
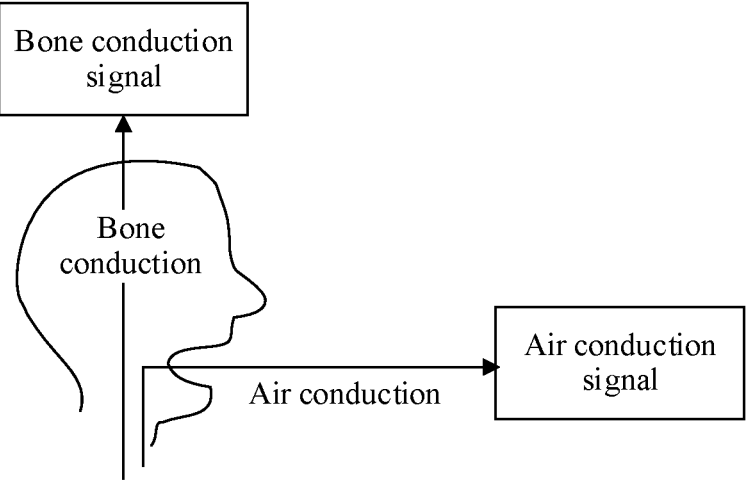
FIG. 5 is a schematic diagram of a principle of generating a bone conduction signal and an air conduction signal according to an embodiment of this disclosure.

It should be noted that the bone conduction signal and the air conduction signal are signals generated by the same sound source, and transmission paths of the bone conduction signal and the air conduction signal are different. As shown in FIG. 5, the bone conduction signal is a signal formed by transmitting a vibration signal (an excitation signal) through a path such as a bone and a tissue inside a human body, and the air conduction signal is a signal formed by transmitting a sound wave through air.

Figure 6:
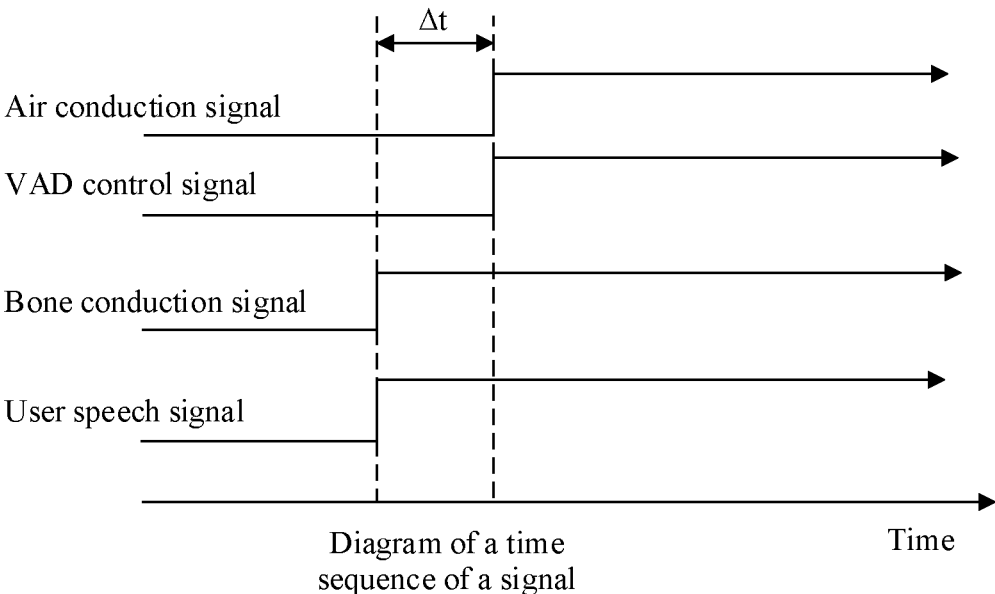
FIG. 6 is a diagram of a time sequence of a signal according to an embodiment of this disclosure.

FIG. 6 is a diagram of a time sequence of a signal according to an embodiment of this disclosure. The diagram of the time sequence of the signal shows a time sequence relationship between the bone conduction signal, the air conduction signal, a VAD control signal, and a user speech signal. When the sound source sends the speech signal, the bone conduction signal immediately changes to a high-level signal. After $\Delta t$ time, VAD is used to determine that there is a speech input, and the VAD control signal is generated. The VAD control signal controls the air microphone to be turned on and collects the air conduction signal, that is, the air conduction signal changes to a high-level signal. It can be learned that the bone conduction signal and the user speech signal change synchronously, and the air conduction signal has a delay of $\Delta t$ time compared with the bone conduction signal. The delay is caused by a detection delay of the VAD. $\Delta t$ indicates the detection delay of the VAD, that is, a time difference between a moment at which the speech input is detected and an actual moment at which a user inputs speech.

It should be noted that, in this embodiment of this disclosure, VAD can be used to detect a speech segment and a non-speech segment in the bone conduction signal, and endpoint detection can detect a speech segment and a non-speech segment in the air conduction signal. Before fusing the start part of the bone conduction signal and the air conduction signal, the wearable device captures the speech segment from the bone conduction signal based on a detection result of the VAD, captures the speech segment from the air conduction signal based on a detection result of the endpoint detection, and fuses a start part of the captured speech segment in the bone conduction signal and the captured speech segment in the air conduction signal, to obtain the fusion signal. FIG. 5 is used as an example. A time range of the speech segment captured from the bone conduction signal is [0, t], a time range of the start part (namely, the start part of the captured speech segment) of the bone conduction signal is [0, t], a time range of the speech segment captured from the air conduction signal is [Δt, t], and duration of the obtained fusion signal is t. Δt indicates the detection delay of the VAD, and t indicates total duration of the actual speech input.

Figure 7:
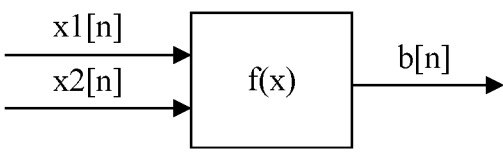
FIG. 7 is a schematic diagram of a signal concatenation method according to an embodiment of this disclosure.

FIG. 7 is a schematic diagram of a signal fusion method according to an embodiment of this disclosure. For example, signal fusion is performed through signal concatenation. Refer to FIG. 7. x1[n] indicates the start part of the bone conduction signal, x2[n] indicates the air conduction signal, f(x) indicates a concatenation function, f(x): $b[n]_{0, t}$=concat $[x][n]_{0, \Delta t}+x2[n]_{0, \Delta t}, x2[n]_{\Delta t, t}]$, where $x2[n]_{0, \Delta t}$ is 0. In other words, the start part (namely, speech segments from 0 to Δt) of the bone conduction signal and the air conduction signal (namely, speech segments from Δt to t) are concatenated according to f(x), to obtain the fusion signal b[n].

Optionally, before the start part of the bone conduction signal and the air conduction signal are fused, the wearable device preprocesses the air conduction signal, and preprocessing includes front-end enhancement. The front-end enhancement can eliminate some noise and affect caused by different sound sources, so that an air conduction signal obtained through front-end enhancement can better reflect an essential feature of the speech, to improve accuracy of speech wakeup. It should be noted that there are a plurality of methods for performing front-end enhancement on the air conduction signal, for example, endpoint detection and speech enhancement. The speech enhancement includes, for example, echo cancellation, a beamforming algorithm, noise cancellation, automatic gain control, and dereverberation. The endpoint detection can be used to distinguish the speech segment of the air conduction signal from the non-speech segment, that is, accurately determine the start point of the speech segment. After the endpoint detection, only the speech segment of the air conduction signal may be processed subsequently, to improve accuracy and a recall rate of speech recognition. The speech enhancement is used to eliminate impact of environmental noise on the speech segment. For example, the echo cancellation is to suppress interference of a remote signal by using an effective echo cancellation algorithm, and mainly includes double-talk detection and delay estimation. For example, a current talk mode (for example, a near-talk mode, a far-talk mode, or a double-talk mode) is determined, a corresponding policy is used to adjust a filter based on the current talk mode, and remote interference in an air conduction signal is filtered out by using the filter, and interference of residual noise is eliminated by using a post-filtering algorithm. For another example, the automatic gain algorithm is used to quickly perform gain adjustment on a signal, to reach a proper volume. In this solution, all sampling points of the air conduction signal may be multiplied by corresponding gain factors through simple gain processing, and the corresponding gain factor is multiplied at each frequency in frequency domain. A frequency of the air conduction signal may be weighted based on an equal-loudness contour, and a loudness gain factor is mapped to the equal-loudness contour, to determine the gain factor of each frequency.

Optionally, before the start part of the bone conduction signal and the air conduction signal are fused, the wearable device preprocesses the bone conduction signal, and preprocessing includes downsampling and/or gain adjustment. The downsampling can be used to reduce a data amount of the bone conduction signal, and improve data processing efficiency. The gain adjustment is used to increase energy of the adjusted bone conduction signal. For example, average energy of the bone conduction signal is consistent with average energy of the air conduction signal through gain adjustment. It should be noted that there are a plurality of methods for performing downsampling and/or gain adjustment on the bone conduction signal. This is not limited in this embodiment of this disclosure. The downsampling is to reduce a sampling frequency (which is also referred to as a sampling rate) of a signal, and is a manner of resampling a signal. The sampling frequency is a quantity of times of extracting a sample of sound wave amplitude per second after a waveform of analog sound is digitized. In a process of downsampling the air conduction signal x[n] whose sampling frequency is Fs and that includes N sampling points, one sampling point is extracted every M−1 sampling points, to obtain an air conduction signal y[m] that includes M sampling points. According to the Nyquist sampling theorem, downsampling may cause spectrum confounding of a signal. Therefore, before downsampling, a low-pass deconfounding filter may be used to process the air conduction signal, that is, perform anti-aliasing filtering, to reduce spectrum confounding caused by subsequent downsampling. The gain adjustment is to adjust an amplitude value of the sampling point of the bone conduction signal by using the gain factor, or adjust an energy value of the frequency of the bone conduction signal. The gain factor may be determined according to a gain function, or may be determined based on statistical information of the air conduction signal and the bone conduction signal. This is not limited in this embodiment of this disclosure.

Figure 8:
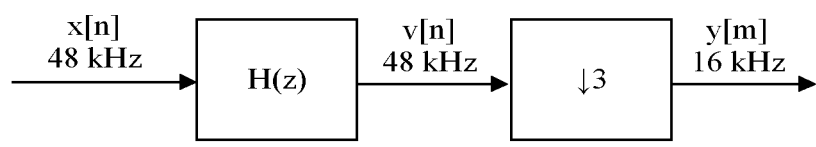
FIG. 8 is a schematic diagram of performing downsampling on a bone conduction signal according to an embodiment of this disclosure.

FIG. 8 is a schematic diagram of performing downsampling on a bone conduction signal according to an embodiment of this disclosure. Refer to FIG. 8. It is assumed that a sampling rate of the bone conduction signal is 48 kHz. The collected bone conduction signal x[n] is first sent to an anti-aliasing filter H(z), to prevent signal aliasing. v[n] indicates a bone conduction signal obtained through anti-aliasing filtering, and the sampling rate remains unchanged. Three-time downsampling is performed on v[n], to obtain a bone conduction signal y[m] obtained through the three-time downsampling, and the sampling rate is decreased to 16 kHz.

Figure 9:
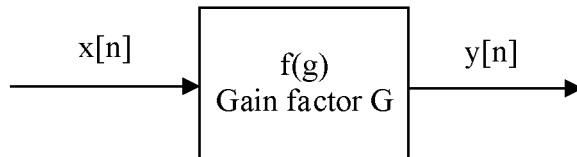
FIG. 9 is a schematic diagram of performing gain adjustment on a bone conduction signal according to an embodiment of this disclosure.

FIG. 9 is a schematic diagram of performing gain adjustment on a bone conduction signal according to an embodiment of this disclosure. Refer to FIG. 9. x[n] indicates the bone conduction signal, f(g) indicates the gain function, and f(g): y[n]=G*x[n]. In other words, gain adjustment is performed on x[n] by using the gain factor G determined according to f(g), to obtain the bone conduction signal y[n] obtained through gain adjustment.

Manner 2 of determining the fusion signal based on the bone conduction signal: Before the fusion signal is determined based on the bone conduction signal, an air microphone is turned on, and an air conduction signal is collected by using the air microphone. The wearable device generates an enhancement start signal based on a start part of the bone conduction signal, and fuses the enhancement start signal and the air conduction signal, to obtain the fusion signal. The start part of the bone conduction signal is determined based on a detection delay of the speech detection. In other words, the wearable device generates the enhancement start signal based on the start part of the bone conduction signal, and performs header loss compensation on the collected air conduction signal based on the enhancement start signal, so that the obtained fusion signal also includes the information about the command word input by the sound source. In addition, a length of the fusion signal is small, and a data processing amount can be reduced to some extent.

It should be noted that, a difference between the manner 1 of determining the fusion signal based on the bone conduction signal and the manner 2 is that in the manner 2 of determining the fusion signal based on the bone conduction signal, the enhancement start signal is generated based on the start part of the bone conduction signal, and instead of the start part of the bone conduction signal and the air conduction signal, the enhancement start signal and the air conduction signal are fused. In addition, other content described in the manner 1 is applicable to the manner 2. Details are not described again in the manner 2. For example, in the manner 2, speech segment detection may also be performed on the bone conduction signal and the air conduction signal, to capture a speech segment, and signal concatenation is performed based on the captured speech segment, to reduce a data processing amount. The wearable device may further preprocess the bone conduction signal and the air conduction signal, for example, perform down-sampling and/or gain adjustment on the bone conduction signal, and perform speech enhancement on the air conduction signal.

In this embodiment of this disclosure, the wearable device may input the start part of the bone conduction signal to a generation network model, to obtain the enhancement start signal output by the generation network model. The generation network model is a model obtained through training according to a deep learning algorithm. The generation network model may be considered as a signal generator, and can generate, based on an input signal, a speech signal that includes information about the input signal and that is close to real speech. In this embodiment of this disclosure, the enhancement start signal includes signal information of the start part of the bone conduction signal, and the enhancement start signal is close to a real speech signal. It should be noted that a network structure, a training manner, a training device, and the like of the generation network model are not limited in this embodiment of this disclosure. The following describes a training method of the generation network model by using an example.

In this embodiment of this disclosure, for example, a computer device performs training, to obtain the generation network model. The computer device obtains a first training data set, where the first training data set includes a plurality of first sample signal pairs. The computer device inputs a start part of a bone conduction sample signal in the plurality of first sample signal pairs to an initial generation network model, to obtain a plurality of enhancement start sample signals output by the initial generation network model. The computer device inputs, to an initial decision network model, the plurality of enhancement start sample signals and a start part of an air conduction sample signal in the plurality of first sample signal pairs, to obtain a decision result output by the initial decision network model. The computer device adjusts a network parameter of the initial generation network model based on the decision result, to obtain a trained generation network model. One first sample signal pair includes a start part of one bone conduction sample signal and a start part of one air conduction sample signal, one first sample signal pair corresponds to one command word, and the bone conduction sample signal and the air conduction sample signal include complete information of a corresponding command word.

Optionally, the first sample signal pair obtained by the computer device includes the bone conduction sample signal and the air conduction sample signal. The computer device captures the start part of the bone conduction sample signal and the start part of the air conduction sample signal, to obtain input data of the initial generation network model and the initial decision network model. In other words, the computer device first obtains a complete speech signal, and then captures the start part, to obtain the training data. Alternatively, the first sample signal pair obtained by the computer device includes only the start part of the bone conduction sample signal and the start part of the air conduction sample signal.

Optionally, the first training data set includes directly collected speech data, public speech data, and/or speech data purchased from a third party. Optionally, before training, the computer device may preprocess the obtained first training data set, to obtain a preprocessed first training data set. The preprocessed first training data set can be used to simulate distribution of real speech data, so that the speech data is closer to speech in a real scenario. This increases diversity of training samples. For example, the first training data set is backed up, that is, an additional piece of data is added, and backup data is preprocessed. Optionally, the backup data is divided into a plurality of pieces, and preprocessing is performed on each piece of data. Preprocessing performed on each piece of data may be different. This can double total training data, ensure data integrity, achieve a balance between performance and training overheads, and improve accuracy and robustness of speech recognition to some extent. A method for preprocessing each piece of data may include one or more of noise addition, volume enhancement, reverberation addition (add reverb), time shifting, pitch shifting, time stretching, and the like.

For example, the noise addition is to mix one or more types of background noise into the speech signal, so that the training data can cover more types of noise, for example, background noise in an office, a canteen, and on a street. Noise of different SNRs may further be mixed. For example, the SNR may be selected in a normal distribution manner, so that a mean of the SNRs is good. The mean may be 10 dB, 20 dB, or the like, and the SNR may range from 10 dB to 30 dB or the like. The computer device may calculate noise energy N based on signal energy S and the SNR according to a formula $SNR=10*\log_{10}(S^2/N^2)$. The volume enhancement is to enhance and weaken a volume of the speech signal based on a volume change coefficient, where a value range of the volume change coefficient may be 0.5 to 1.5, or another value range. The reverberation addition is to process adding reverberation to the speech signal, and the reverberation is generated due to reflection of a sound signal in a space environment. The pitch shifting, for example, treble correction, is to change pitch of the speech signal without affecting a sound speed. The time stretching is to change a speed or duration, that is, change a speech speed, of the speech signal without affecting the pitch, so that training data can cover different speech speeds, where a change range of the speech speed may be between 0.9 and 1.1 or within another range.

Figure 10:
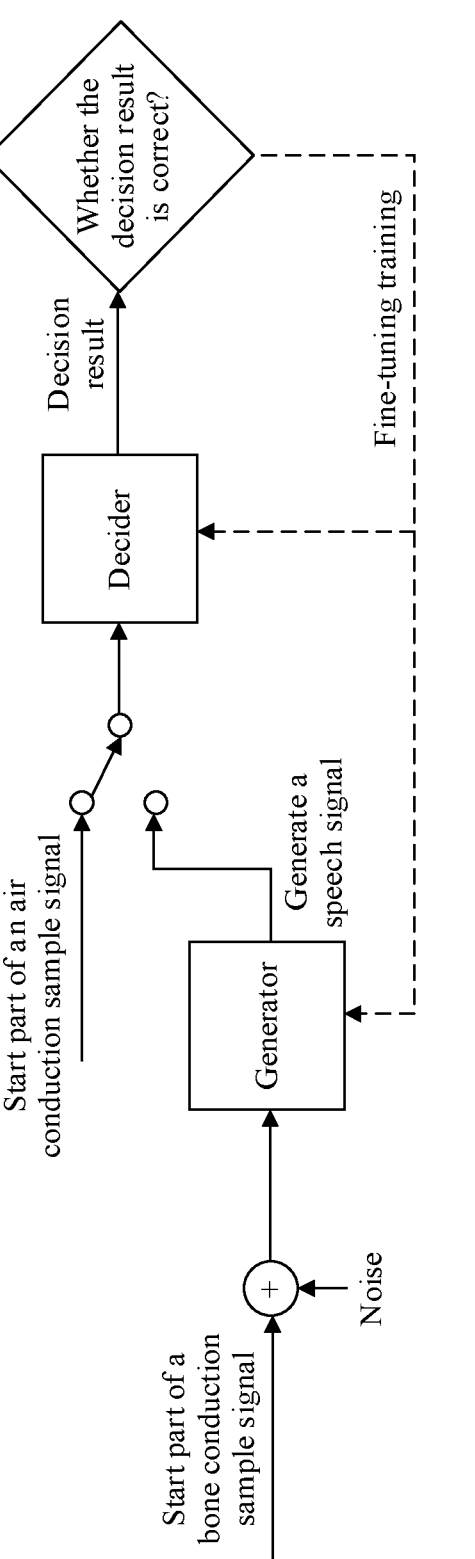
FIG. 10 is a schematic diagram of a generation network model training method according to an embodiment of this disclosure.

FIG. 10 is a schematic diagram of a generation network model training method according to an embodiment of this disclosure. A generator (namely, an initial generation network model) is a network for generating a speech signal. The start part of the bone conduction sample signal in the first training data set is input to the generator. Optionally, before the start part is input to the generator, random noise is superimposed on the bone conduction sample signal. The input bone conduction sample signal is processed by the generator, to generate an enhancement start sample signal. A decider (namely, an initial decision network model) is a decision network, and is configured to determine whether an input signal is a real speech signal. A decision result output by the decider indicates whether the input signal is a real speech signal. If the output decision result is 1, it indicates that the decider determines that the input signal is a real speech signal. If the output decision result is 0, it indicates that the decider determines that the input signal is not a real speech signal. Parameters of the generator and the decider are adjusted by determining whether the decision result is accurate, to train the generator and the decider. In a training process, a target of the generator is to generate a forged speech signal to deceive the decider, and a target of the decider is to distinguish whether an input signal is real or generated. It can be learned that the generator and the decider essentially perform a game based on the training data. In a gaming process, capabilities of the generator and the decider are improved. In an ideal case, accuracy of the trained decider is close to 0.5.

After training is completed, a generation network model obtained through training is deployed in the wearable device, and the wearable device inputs the start part of the collected bone conduction signal to the generation network model, to obtain the enhancement start signal output by the generation network model. It should be noted that, in addition to the method for generating the enhancement start signal, the computer device may alternatively generate the enhancement start signal based on the start part the bone conduction signal by using another method. This is not limited in this embodiment of this disclosure.

Manner 3 of determining the fusion signal based on the bone conduction signal: Before the fusion signal is determined based on the bone conduction signal, an air microphone is turned on, and an air conduction signal is collected by using the air microphone. The wearable device directly fuses the bone conduction signal and the air conduction signal, to obtain the fusion signal. In this way, the obtained fusion signal also includes the information about the command word input by the sound source. In addition, the fusion signal includes both the complete speech information of the bone conduction signal and the complete speech information of the air conduction signal, so that the fusion signal includes more speech features. This improves accuracy of speech recognition to some extent.

It should be noted that, a difference between the manner 1 of determining the fusion signal based on the bone conduction signal and the manner 3 is that in the manner 3 of determining the fusion signal based on the bone conduction signal, the wearable device directly fuses the bone conduction signal and the air conduction signal. In addition, other content described in the manner 1 is applicable to the manner 3. Details are not described again in the manner 3. For example, in the manner 3, speech segment detection may also be performed on the bone conduction signal and the air conduction signal, to capture speech segments, and the captured speech segments are fused, to reduce a data processing amount. The bone conduction signal and the air conduction signal may further be preprocessed, for example, downsampling and/or gain adjustment are/is performed on the bone conduction signal, and endpoint detection and speech enhancement are performed on the air conduction signal.

For example, it is assumed that signal fusion is performed through signal concatenation. For example, x1 [n] indicates the bone conduction signal, x2[n] indicates the air conduction signal, f(x) indicates a concatenation function. It is assumed that f(x): $b[n]_{0, 2t}$=concat[x][n]$_{0, t}$, x2[n]$_{0, t}$], where x2[n]$_{0, \Delta t}$ st is 0. In other words, the bone conduction signal (speech segments from 0 to t) and the air conduction signal (signal segments from 0 to t) are concatenated according to f(x), to obtain the fusion signal b[n]. Alternatively, f(x): $b[n]_{0, 2t+\Delta t}$=concat[x][n]$_{0-t}$, x2[n]$_{\Delta t-t}$]. In other words, the bone conduction signal (speech segments from 0 to t) and the air conduction signal (signal segments from $\Delta t$ to t) are concatenated according to f(x), to obtain the fusion signal b[n].

Manner 4 of determining the fusion signal based on the bone conduction signal: The wearable device determines the bone conduction signal as the fusion signal. In other words, the wakeup word may be detected based on only the bone conduction signal.

It should be noted that, a difference between the manner 1 of determining the fusion signal based on the bone conduction signal and the manner 4 is that in the manner 4 of determining the fusion signal based on the bone conduction signal, the bone conduction signal is directly used as the fusion signal. In addition, other content described in the manner 1 is applicable to the manner 4. Details are not described again in the manner 4. For example, in the manner 4, speech segment detection may also be performed on the bone conduction signal, to capture a speech segment, and the captured speech segment is used as the fusion signal, to reduce a data processing amount. The bone conduction signal may further be preprocessed, for example, downsampling and/or gain adjustment are/is performed on the bone conduction signal.

The following describes an implementation in which the wearable device recognizes the fusion signal, to detect the wakeup word.

In this embodiment of this disclosure, the wearable device inputs a plurality of audio frames included in the fusion signal to a first acoustic model, to obtain a plurality of posterior probability vectors output by the first acoustic model. The wearable device detects the wakeup word based on the plurality of posterior probability vectors. The plurality of posterior probability vectors one-to-one correspond to the plurality of audio frames included in the fusion signal, that is, one posterior probability vector corresponds to one audio frame included in the fusion signal, and a first posterior probability vector in the plurality of posterior probability vectors indicates a probability that a phoneme of a first audio frame in the plurality of audio frames belongs to a plurality of specified phonemes, that is, one posterior probability vector indicates a probability that a phoneme of one corresponding audio frame belongs to the plurality of specified phonemes. In other words, the wearable device processes the fusion signal by using the first acoustic model, to obtain the information about the phoneme included in the fusion signal, so as to detect the wakeup word based on the information about the phoneme. Optionally, in this embodiment of this disclosure, the first acoustic model may be the network model described above, or a model of another structure. After inputting the fusion signal to the first acoustic model, the wearable device processes, by using the first acoustic model, each audio frame included in the fusion signal, to obtain a posterior probability vector, output by the first acoustic model, corresponding to each audio frame.

In this embodiment of this disclosure, after obtaining the plurality of posterior probability vectors output by the first acoustic model, the wearable device determines, based on the plurality of posterior probability vectors and a phoneme sequence corresponding to the wakeup word, a confidence that a phoneme sequence corresponding to the command word input by the sound source includes the phoneme sequence corresponding to the wakeup word. When the confidence exceeds a confidence threshold, it is determined that it is detected that the command word includes the wakeup word. In other words, the wearable device decodes the plurality of posterior probability vectors, to determine the confidence threshold. The phoneme sequence corresponding to the wakeup word is referred to as a decoding path, the determined confidence may be referred to as a path score, and the confidence threshold may be referred to as a wakeup threshold.

For example, in this embodiment of this disclosure, after the posterior probability vector corresponding to each audio frame is obtained by using the first acoustic model, the plurality of posterior probability vectors corresponding to the plurality of consecutive audio frames are input to a decoding graph (which is also referred to as a state network) that is constructed based on a language model and a pronunciation dictionary. A probability of each phoneme on the decoding path is searched for in the decoding graph, and a probability of each found phoneme is added, to obtain a confidence. The decoding path is a phoneme sequence corresponding to the wakeup word. If the confidence is greater than the confidence threshold, it is determined that it is detected that the command word includes the wakeup word.

Optionally, to reduce a false wakeup rate, when the confidence exceeds the confidence threshold, and the plurality of posterior probability vectors and a plurality of template vectors meet a distance condition, the wearable device determines that it is detected that the command word input by the sound source includes the wakeup word. The plurality of template vectors indicate a probability that a phoneme of a speech signal including complete information of the wakeup word belongs to the plurality of specified phonemes. In other words, the current input speech not only needs to meet the confidence condition, but also needs to match a template. In this embodiment of this disclosure, the confidence threshold may be preset, for example, may be set based on experience, or may be determined based on a bone conduction registration signal and/or an air conduction registration signal that include/includes the complete information of the wakeup word during wakeup word registration. A specific implementation is described in the following. The plurality of template vectors are registration posterior probability vectors determined based on the bone conduction registration signal and/or the air conduction registration signal. A specific implementation is described in the following.

Optionally, when the plurality of posterior probability vectors one-to-one correspond to the plurality of template vectors, the distance condition includes: a mean of distances between the plurality of posterior probability vectors and the corresponding template vectors is less than a distance threshold. It should be noted that if the plurality of posterior probability vectors one-to-one correspond to the plurality of template vectors, the wearable device may directly calculate the distances between the plurality of posterior probability vectors and the corresponding template vectors, and calculate the mean. For example, when duration of the speech input by the current sound source is consistent with duration of the speech input by the user during wakeup word registration, the plurality of posterior probability vectors may one-to-one correspond to the plurality of template vectors. However, if the duration of the speech input by the current sound source is not consistent with the duration of the speech input by the user during wakeup word registration, the plurality of posterior probability vectors may not one-to-one correspond to the plurality of template vectors. In this case, the wearable device may establish a mapping relationship between the plurality of posterior probability vectors and the plurality of template vectors by using a dynamic time warping (DTW) method, to calculate distances between the plurality of posterior probability vectors and the corresponding template vectors. In other words, the wearable device may resolve a template matching problem through DTW when data lengths are different.

The foregoing describes a first implementation in which the wearable device detects the wakeup word based on the bone conduction signal. In the first implementation, the wearable device first determines the fusion signal based on the bone conduction signal (including four manners), and then processes the fusion signal by using the acoustic model, to obtain the posterior probability vectors. Then, the wearable device decodes the obtained posterior probability vectors based on the decoding path corresponding to the wakeup word, to obtain the confidence corresponding to the command word currently input by the sound source. When the confidence is greater than the confidence threshold, the wearable device determines that it is detected that the command word includes the wakeup word. Alternatively, when the confidence is greater than the confidence threshold, and the plurality of obtained posterior probability vectors match the template vectors, the wearable device determines that it is detected that the command word includes the wakeup word. The following describes a second implementation in which the wearable device detects the wakeup word based on the bone conduction signal.

Second Implementation

In this embodiment of this disclosure, before detecting the wakeup word based on the bone conduction signal, the wearable device turns on the air microphone, and the air conduction signal is collected by using the air microphone. For example, when it is detected that there is a speech input, the air microphone is turned on, and the air conduction signal is collected by using the air microphone. The wearable device determines a plurality of posterior probability vectors based on the bone conduction signal and the air conduction signal, and detects the wakeup word based on the plurality of posterior probability vectors. The plurality of posterior probability vectors one-to-one correspond to a plurality of audio frames included in the bone conduction signal and the air conduction signal, and a first posterior probability vector in the plurality of posterior probability vectors indicates a probability that a phoneme of a first audio frame in the plurality of audio frames belongs to a plurality of specified phonemes. It should be noted that the plurality of audio frames include an audio frame included in the bone conduction signal and an audio frame included in the air conduction signal. In other words, each of the plurality of posterior probability vectors corresponds to one audio frame included in the bone conduction signal or the air conduction signal, and one posterior probability vector indicates a probability that a phoneme of one corresponding audio frame belongs to the plurality of specified phonemes.

It should be noted that, for related descriptions of the bone conduction signal and the air conduction signal, refer to content in the first implementation that includes generation principles of the bone conduction signal and the air conduction signal, preprocessing of the bone conduction signal and the air conduction signal, and the like. Details are not described herein again.

First, the following describes an implementation in which the wearable device determines the plurality of posterior probability vectors based on the bone conduction signal and the air conduction signal. It should be noted that there are a plurality of manners in which the wearable device determines the plurality of posterior probability vectors based on the bone conduction signal and the air conduction signal. The following describes three manners.

Manner 1 of determining the plurality of posterior probability vectors based on the bone conduction signal and the air conduction signal: The wearable device inputs a start part of the bone conduction signal and the air conduction signal to a second acoustic model, to obtain a first quantity of bone conduction posterior probability vectors and a second quantity of air conduction posterior probability vectors that are output by the second acoustic model. The start part of the bone conduction signal is determined based on a detection delay of the speech detection, the first quantity of bone conduction posterior probability vectors one-to-one corresponds to an audio frame included in the start part of the bone conduction signal, and the second quantity of air conduction posterior probability vectors one-to-one corresponds to an audio frame included in the air conduction signal. The wearable device fuses a first bone conduction posterior probability vector and a first air conduction posterior probability vector, to obtain a second posterior probability vector. The first bone conduction posterior probability vector corresponds to a last audio frame of the start part of the bone conduction signal, duration of the last audio frame is less than frame duration, the first air conduction posterior probability vector corresponds to a $1^{st}$ audio frame of the air conduction signal, and duration of the $1^{st}$ audio frame is less than the frame duration. The plurality of posterior probability vectors that are finally determined by the wearable device include the second posterior probability vector, a vector in the first quantity of bone conduction posterior probability vectors other than the first bone conduction posterior probability vector, and a vector in the second quantity of air conduction posterior probability vectors other than the first air conduction posterior probability vector. The first quantity and the second quantity may be the same or different.

It should be noted that, for related descriptions of the start part of the bone conduction signal, refer to content in the first implementation. Details are not described herein again. In this embodiment of this disclosure, the last audio frame of the start part of the bone conduction signal may not be a complete audio frame, that is, the duration of the last audio frame is less than the frame duration. For example, the start part of the bone conduction signal includes an audio frame with half frame duration. Because the air conduction signal loses a header, the $1^{st}$ audio frame of the air conduction signal may not be a complete audio frame, that is, the duration of the $1^{st}$ audio frame is less than the frame duration. For example, the $1^{st}$ audio frame of the air conduction signal includes an audio frame with half frame duration. In addition, a sum of the duration of the last audio frame of the start part of the bone conduction signal and the duration of the $1^{st}$ audio frame of the air conduction signal may be equal to the frame duration. In short, due to incomplete first frames, caused by speech detection (for example, VAD), of the start part of the bone conduction signal and the air conduction signal, the first frames of the start part of the bone conduction signal and the air conduction signal together indicate information about a complete audio frame. It should be noted that the complete audio frame is a potential audio frame instead of an actual frame. Optionally, the wearable device adds the first bone conduction posterior probability vector to the first air conduction posterior probability vector, to obtain the second posterior probability vector. The second posterior probability vector obtained by the wearable device indicates a probability that a phoneme of the complete audio frame belongs to a plurality of specified phonemes.

In other words, if the detection delay of the speech detection is not an integer multiple of the frame duration, the duration of the last audio frame of the start part of the bone conduction signal is less than the frame duration, and the duration of the $1^{st}$ audio frame of the air conduction signal is less than the frame duration. The wearable device needs to fuse (for example, add) a second bone conduction posterior probability vector and a second air conduction posterior probability vector, to obtain the plurality of posterior probability vectors. Optionally, if the detection delay of the speech detection is an integer multiple of the frame duration, the duration of the last audio frame of the start part of the bone conduction signal is equal to the frame duration, and the duration of the $1^{st}$ audio frame of the air conduction signal is equal to the frame duration. The wearable device uses the obtained first quantity of bone conduction posterior probability vectors and the second quantity of air conduction posterior probability vectors as the plurality of posterior probability vectors, and performs subsequent processing.

Figure 11:
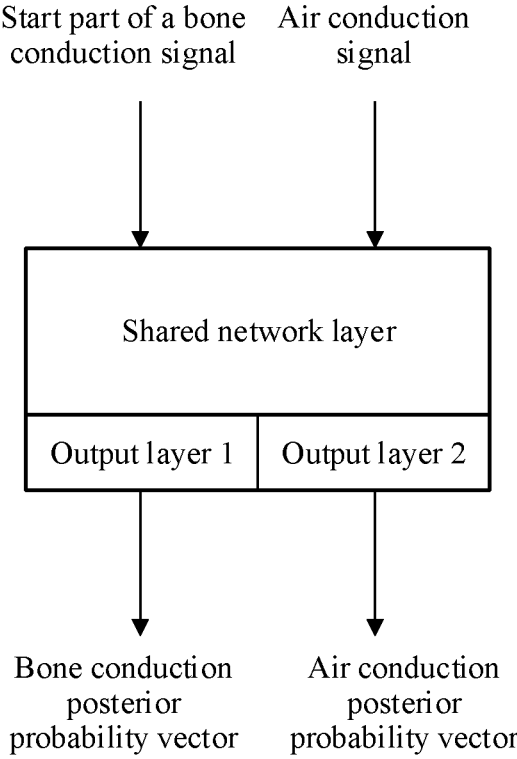
FIG. 11 is a schematic diagram of a structure of another acoustic model according to an embodiment of this disclosure.

FIG. 11 is a schematic diagram of a structure of another acoustic model according to an embodiment of this disclosure. The acoustic model shown in FIG. 11 is the second acoustic model in this embodiment of this disclosure. It can be learned that the second acoustic model in this embodiment of this disclosure includes two input layers (which are not shown), one shared network layer, and two output layers. The two input layers are used to separately input the start part of the bone conduction signal and the air conduction signal. The shared network layer is used to separately process input data at the two input layers, to separately extract features of the start part of the bone conduction signal and the air conduction signal. The two output layers are used to separately receive two pieces of output data at the shared network layer, and separately process the two pieces of output data, to output the first quantity of bone conduction posterior probability vectors corresponding to the start part of the bone conduction signal and the second quantity of air conduction posterior probability vectors corresponding to the air conduction signal. In other words, the wearable device separately processes, by using the second acoustic model, two parts of signals: the start part of the bone conduction signal and the air conduction signal, to obtain two groups of posterior probability vectors corresponding to the two parts of signals. Because the shared network layer exists in the acoustic model, the two parts of signals share some network parameters.

In this embodiment of this disclosure, the wearable device fuses the obtained first bone conduction posterior probability vector and the first air conduction posterior probability vector, to obtain the second posterior probability vector, so that the plurality of bone conduction posterior probability vectors and the plurality of air conduction posterior probability vectors are fused, to obtain the plurality of posterior probability vectors. In other words, the wearable device fuses the posterior probabilities vectors of the two parts of signals, so that the plurality of obtained posterior probability vectors include the information about the command word input by the sound source. This may also be considered as a method for performing header loss compensation on the air conduction signal based on the bone conduction signal, except that compensation is not performed by directly fusing (for example, concatenating) signals. In addition, the solution of processing the start part of the bone conduction signal and the air conduction signal by using the second acoustic model may be considered as a multi-task solution. In other words, the start part of the bone conduction signal and the air conduction signal are used as two tasks, and corresponding posterior probability vectors are separately determined by using a method of sharing a network parameter, to implicitly fuse the start part of the bone conduction signal and the air conduction signal.

Manner 2 of determining the plurality of posterior probability vectors based on the bone conduction signal and the air conduction signal: The wearable device inputs a start part of the bone conduction signal and the air conduction signal to a third acoustic model, to obtain a plurality of posterior probability vectors output by the third acoustic model. The start part of the bone conduction signal is determined based on a detection delay of the speech detection. It should be noted that, for related descriptions of the start part of the bone conduction signal, refer to content in the first implementation. Details are not described herein again.

Figure 12:
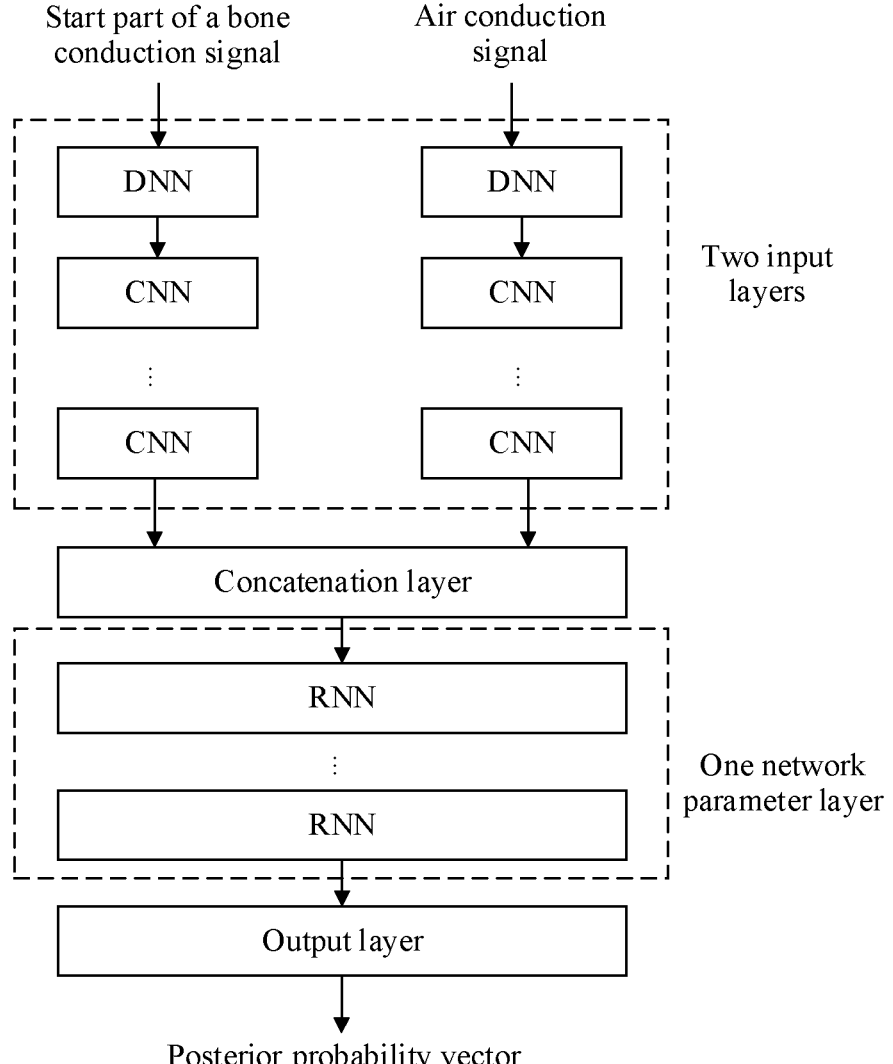
FIG. 12 is a schematic diagram of a structure of still another acoustic model according to an embodiment of this disclosure.

In this embodiment of this disclosure, as shown in FIG. 12, the third acoustic model includes two input layers (for example, one input layer includes layers such as a DNN and a CNN), one concatenation layer (concat layer), one network parameter layer (for example, including a layer such as an RNN), and one output layer (for example, including a layer such as a softmax layer). The two input layers are used to separately input the bone conduction signal and the air conduction signal, the concatenation layer is used to concatenate output data at the two input layers, the network parameter layer is used to process output data at the concatenation layer, and the output layer is used to output a group of posterior probability vectors. In other words, the wearable device inputs the start part of the bone conduction signal and the air conduction signal to the third acoustic model at the same time, and implicitly fuses the start part of the bone conduction signal and the air conduction signal by using the concatenation layer in the third acoustic model, to obtain a group of posterior probability vectors, so that the plurality of obtained posterior probability vectors include the information about the command word input by the sound source. This may also be considered as a method for performing header loss compensation on the air conduction signal based on the bone conduction signal, except that compensation is not performed by directly fusing signals.

Manner 3 of determining the plurality of posterior probability vectors based on the bone conduction signal and the air conduction signal: The wearable device inputs the bone conduction signal and the air conduction signal to a third acoustic model, to obtain a plurality of posterior probability vectors output by the third acoustic model. In other words, the wearable device directly inputs the bone conduction signal and the air conduction signal to the third acoustic model at the same time, and outputs a group of posterior probability vectors by using the third acoustic model, so that the plurality of obtained posterior probability vectors include the information about the command word input by the sound source. This may also be considered as a method for performing header loss compensation on the air conduction signal based on the bone conduction signal, except that compensation is not performed by directly fusing signals.

The following describes an implementation in which the wearable device detects the wakeup word based on the plurality of posterior probability vectors.

In this embodiment of this disclosure, the wearable device determines, based on the plurality of posterior probability vectors and a phoneme sequence corresponding to the wakeup word, a confidence that a phoneme sequence corresponding to the command word input by the sound source includes the phoneme sequence corresponding to the wakeup word. When the confidence exceeds a confidence threshold, it is determined that the wakeup word is detected. For a specific implementation, refer to related descriptions in the first implementation. Details are not described herein again.

Optionally, to reduce a false wakeup rate, when the confidence exceeds the confidence threshold, and the plurality of posterior probability vectors and a plurality of template vectors meet a distance condition, the wearable device determines that it is detected that the command word includes the wakeup word. Optionally, when the plurality of posterior probability vectors one-to-one correspond to the plurality of template vectors, the distance condition includes: a mean of distances between the plurality of posterior probability vectors and the corresponding template vectors is less than a distance threshold. For a specific implementation, refer to related descriptions in the first implementation. Details are not described herein again.

Step 403: When it is detected that the command word includes the wakeup word, perform speech wakeup on the to-be-woken-up device.

In this embodiment of this disclosure, when it is detected that the command word input by the sound source includes the wakeup word, the wearable device performs speech wakeup. For example, the wearable device sends a wakeup instruction to the smart device (namely, the to-be-woken-up device), to wake up the smart device. Alternatively, when the wearable device is a smart device, the wearable device wakes up another component or module other than a bone conduction microphone, so that the entire wearable device can enter a working state.

It can be learned from the foregoing that the speech wakeup method provided in this embodiment of this disclosure has a plurality of implementations, for example, the first implementation and the second implementation described above. The two implementations further include a plurality of specific implementations. The following describes several specific implementations described above again with reference to FIG. 13 to FIG. 18.

Figure 13:
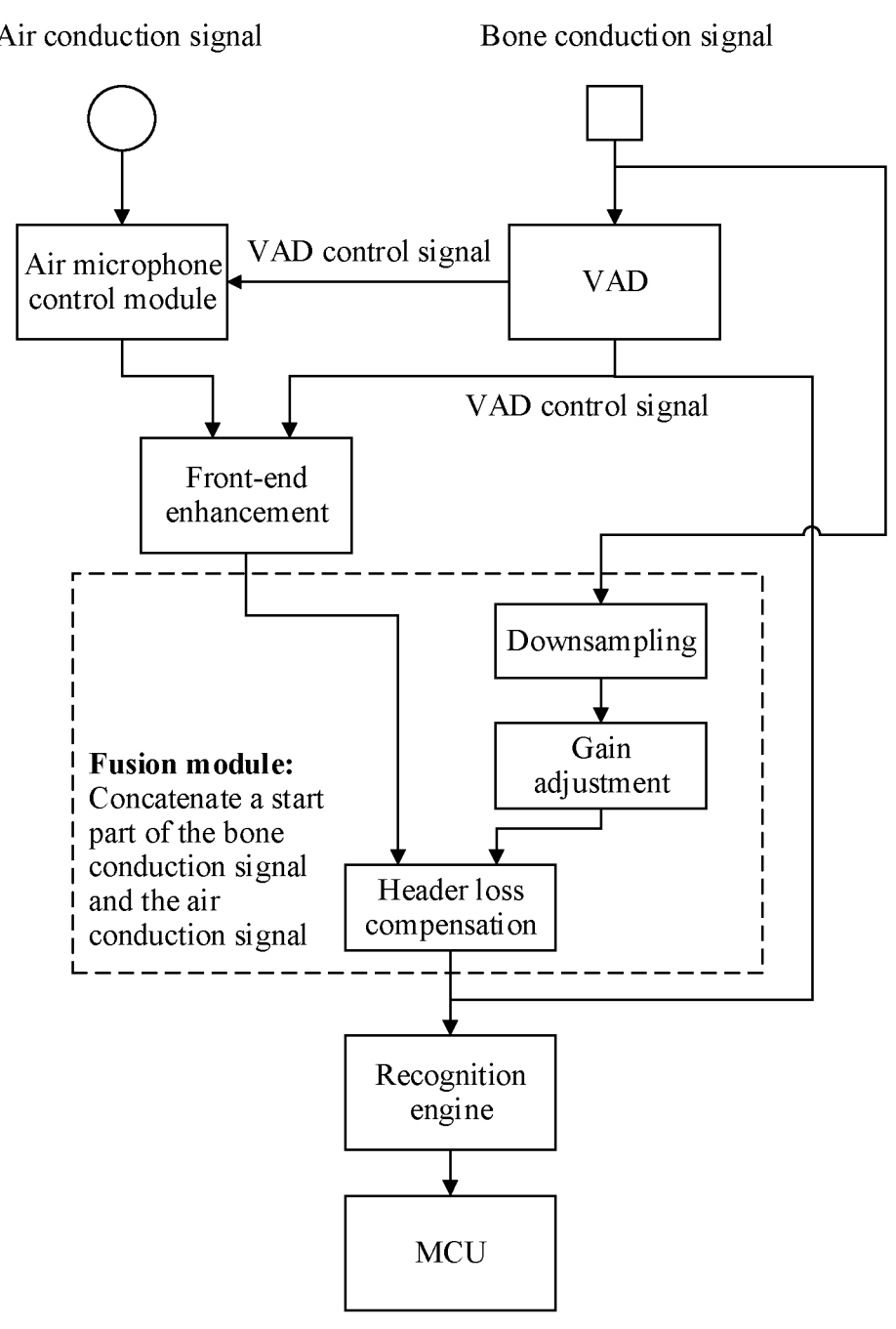
FIG. 13 is a flowchart of another speech wakeup method according to an embodiment of this disclosure.

FIG. 13 is a flowchart of another speech wakeup method according to an embodiment of this disclosure. FIG. 13 corresponds to the manner 1 in the first implementation. For example, speech wakeup is performed by using a plurality of modules in the wearable device. The wearable device collects the bone conduction signal by using the bone conduction microphone, and performs VAD on the bone conduction signal by using a VAD control module. When a speech input is detected, the VAD control module outputs a high-level VAD control signal. When no speech input is detected, the VAD control module outputs a low-level VAD control signal. The VAD control module sends the VAD control signal to an air microphone control module, a front-end enhancement module, and a recognition engine respectively.

The VAD control signal is used to control switches of the air microphone control module, the front-end enhancement module, and the recognition engine. When the VAD control signal is at a high level, the air microphone control module controls the air microphone to be turned on, to collect the air conduction signal, the front-end enhancement module is turned on to perform front-end enhancement on the air conduction signal, and the recognition engine is turned on to detect the wakeup word based on the bone conduction signal and the air conduction signal. A fusion module performs preprocessing such as downsampling and/or gain adjustment on the bone conduction signal, and performs header loss compensation, based on a start part of a preprocessed bone conduction signal, on an air conduction signal obtained through front-end enhancement, to obtain the fusion signal. The fusion module sends the fusion signal to the recognition engine, and the recognition engine recognizes the fusion signal by using the first acoustic model, to obtain a detection result of the wakeup word. The recognition engine sends the obtained detection result to a processor (for example, a micro-controller unit (MCU) shown in the figure), and the processor determines, based on the detection result, whether to wake up the smart device. If the detection result indicates that the command word input by the sound source includes the wakeup word, the processor performs speech wakeup on the smart device. If the detection result indicates that no wakeup word is detected, the processor does not wake up the smart device.

Figure 14:
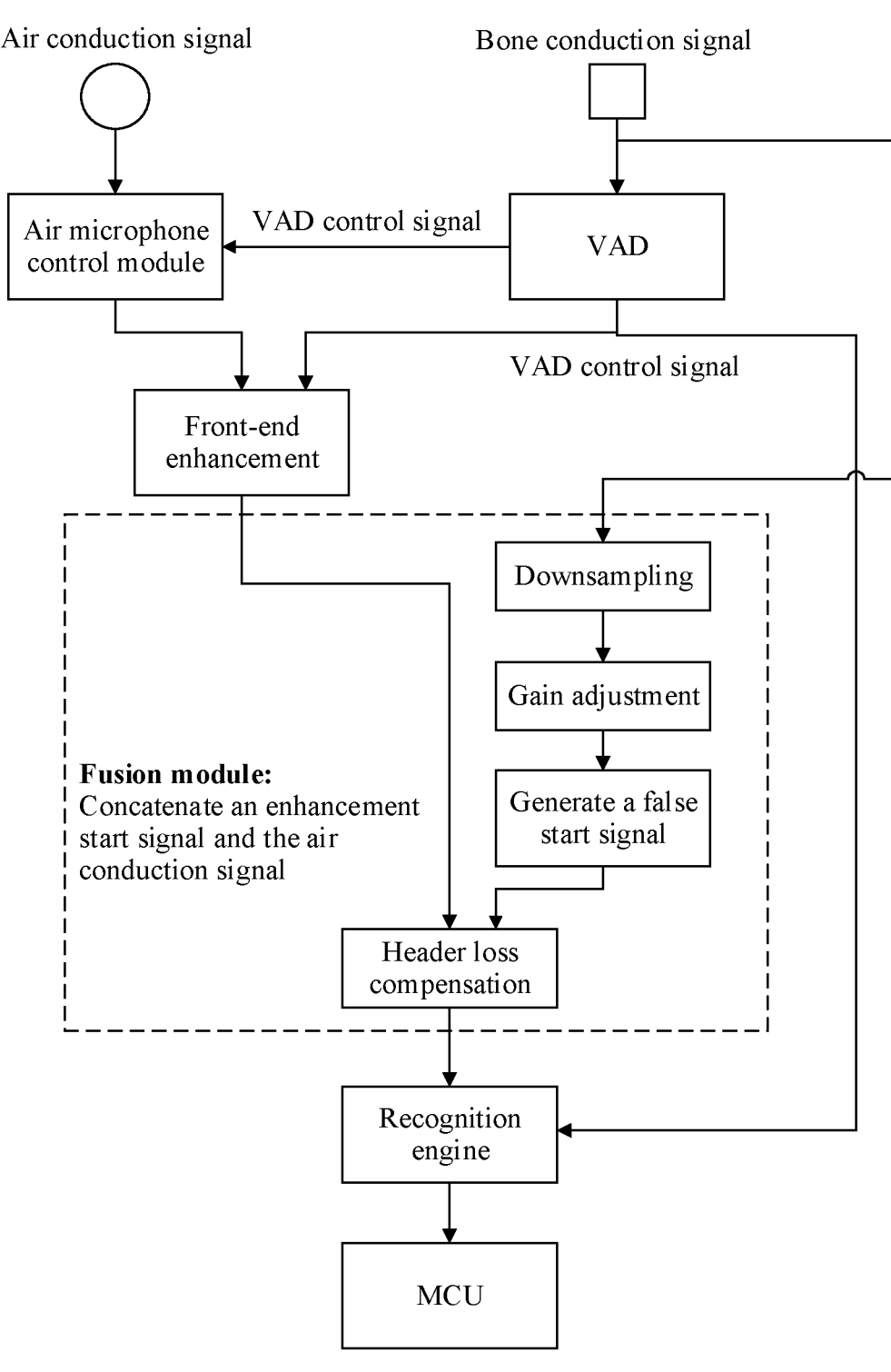
FIG. 14 is a flowchart of still another speech wakeup method according to an embodiment of this disclosure.
Figure 15:
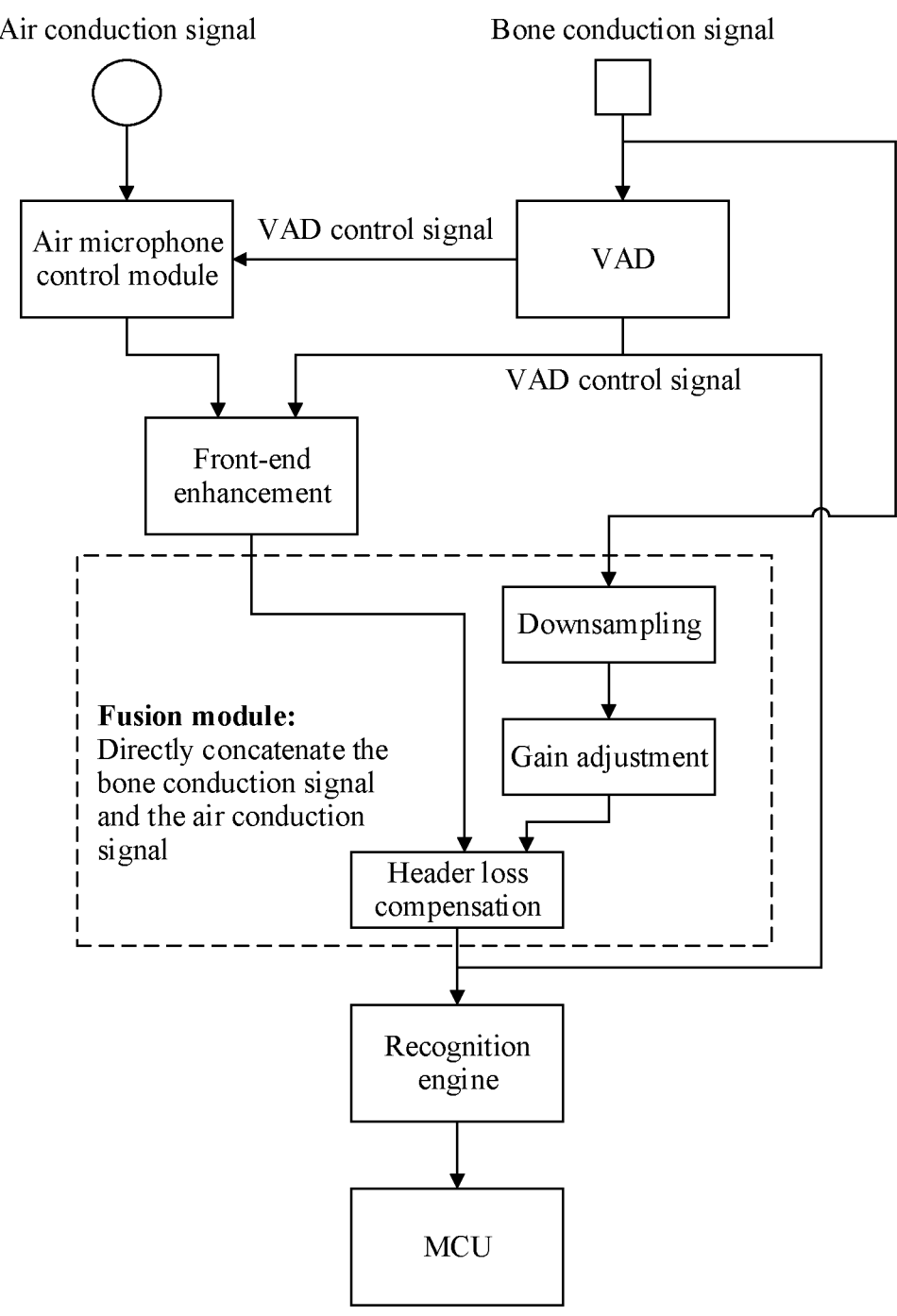
FIG. 15 is a flowchart of still another speech wakeup method according to an embodiment of this disclosure.
Figure 16:
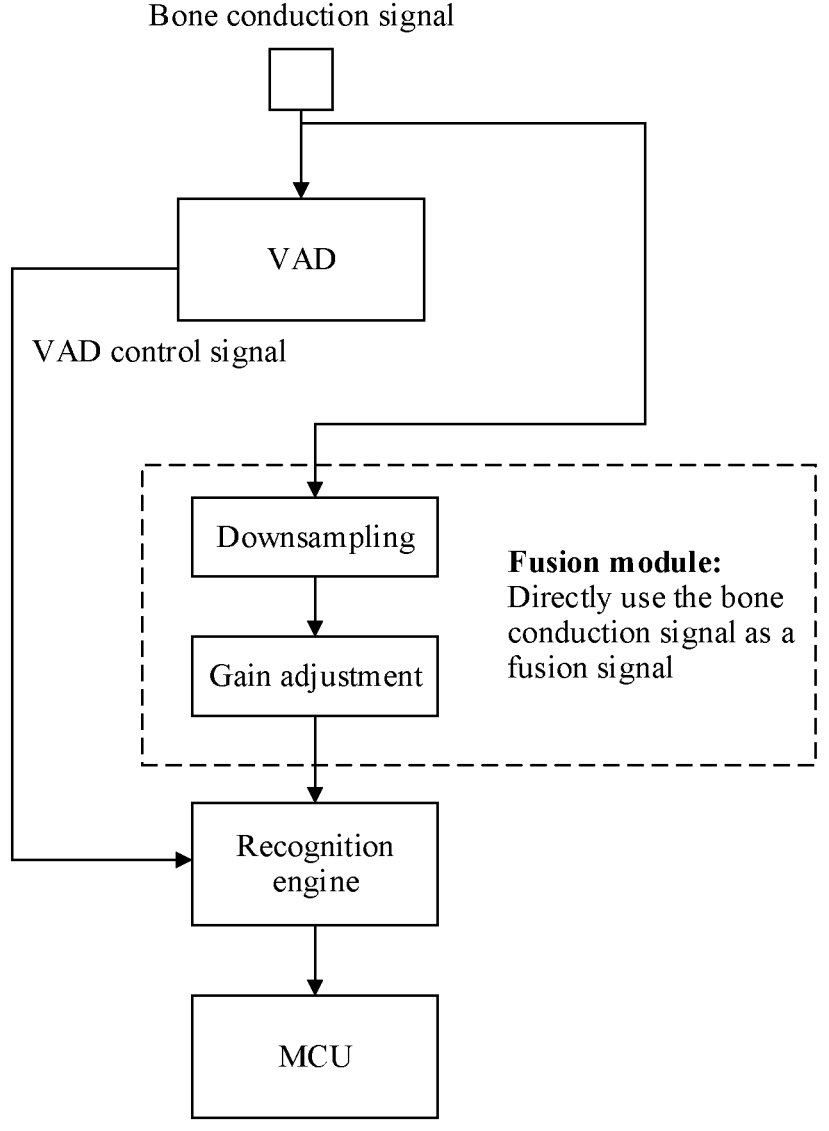
FIG. 16 is a flowchart of still another speech wakeup method according to an embodiment of this disclosure.

FIG. 14 to FIG. 16 are flowcharts of three other speech wakeup methods according to embodiments of this disclosure. Separate differences between FIG. 14, FIG. 15, and FIG. 16 and FIG. 13 lie in that, in the method shown in FIG. 14, a fusion module generates an enhancement start signal based on a start part of a preprocessed bone conduction signal, and performs header loss compensation, based on the enhancement start signal, on an air conduction signal obtained through front-end enhancement, to obtain a fusion signal. In the method shown in FIG. 15, a fusion module directly concatenates a preprocessed bone conduction signal and an air conduction signal obtained through front-end enhancement, to perform header loss compensation on an air conduction signal, so as to obtain a fusion signal. In the method shown in FIG. 16, a VAD control signal does not need to be sent to an air microphone control module, and therefore an air conduction signal does not need to be collected. In addition, a recognition engine directly determines a preprocessed bone conduction signal as a fusion signal.

Figure 17:
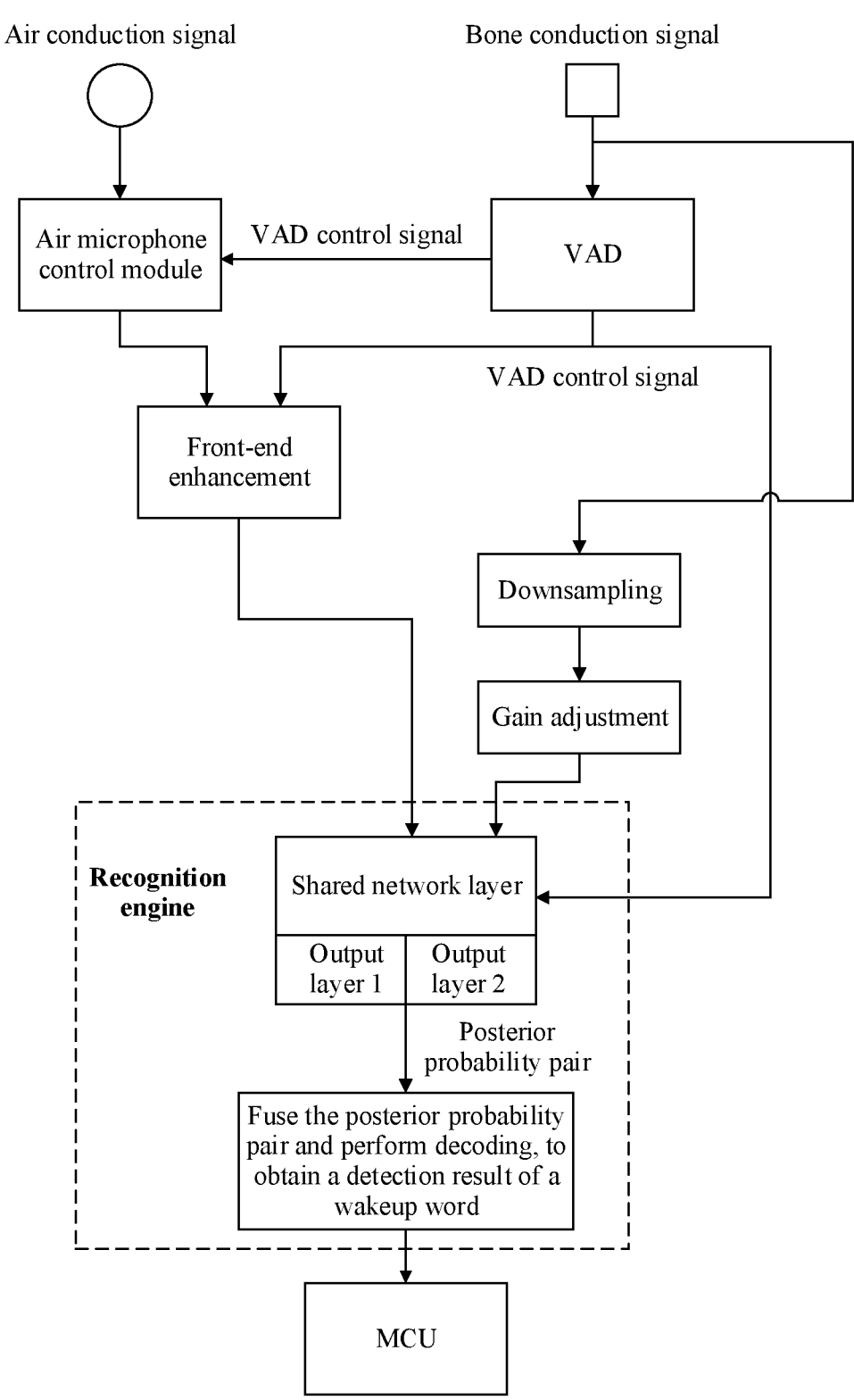
FIG. 17 is a flowchart of still another speech wakeup method according to an embodiment of this disclosure.

FIG. 17 is a flowchart of still another speech wakeup method according to an embodiment of this disclosure. A difference between FIG. 17 and FIG. 13 lies in that, in the method shown in FIG. 17, a recognition engine separately inputs a start part of a preprocessed bone conduction signal and an air conduction signal obtained through front-end enhancement to a second acoustic model, to obtain a bone conduction posterior probability vector and an air conduction posterior probability vector that are respectively output by two output layers of the second acoustic model, to obtain a posterior probability pair. The recognition engine fuses the bone conduction posterior probability vector and the air conduction posterior probability vector, to obtain a plurality of posterior probability vectors, and decodes the plurality of posterior probability vectors, to obtain a detection result of a wakeup word.

Figure 18:
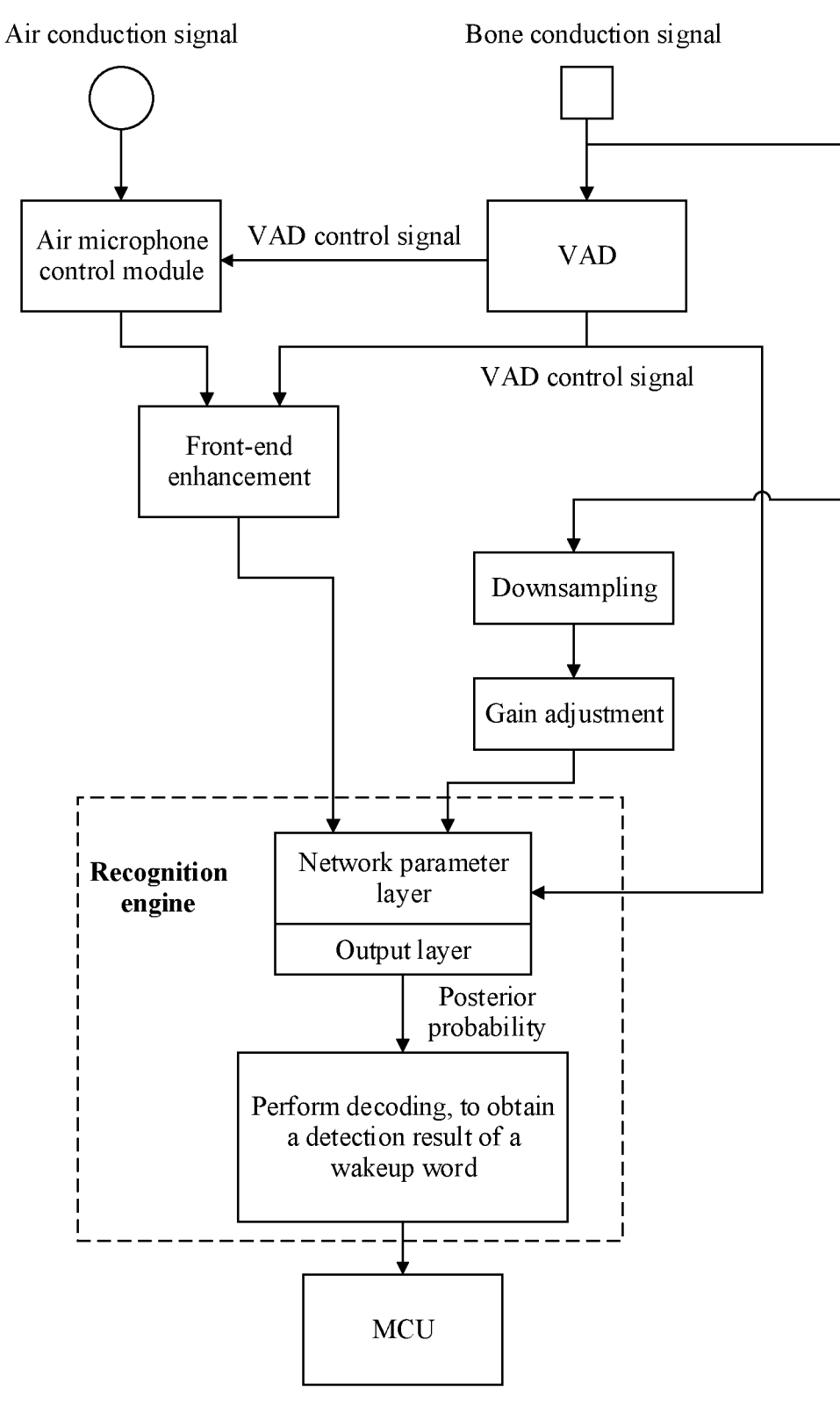
FIG. 18 is a flowchart of still another speech wakeup method according to an embodiment of this disclosure.

FIG. 18 is a flowchart of still another speech wakeup method according to an embodiment of this disclosure. A difference between FIG. 18 and FIG. 17 lies in that, in the method shown in FIG. 18, a recognition engine separately inputs a start part of a preprocessed bone conduction signal and an air conduction signal obtained through front-end enhancement to a third acoustic model, or separately inputs a preprocessed bone conduction signal and an air conduction signal obtained through front-end enhancement to a third acoustic model, to obtain a plurality of posterior probability vectors separately output by one output layer of the third acoustic model.

It can be learned that, in this embodiment of this disclosure, a bone conduction microphone collects a bone conduction signal for speech detection, to ensure low power consumption. When the low power consumption is ensured, it is considered that a delay of speech detection may cause losing of a header of a collected air conduction signal, and consequently, complete information of a command word input by a sound source is not included. However, the bone conduction signal collected by the bone conduction microphone includes the information about the command word input by the sound source, that is, the bone conduction signal does not lose a header. Therefore, this solution detects a wakeup word based on the bone conduction signal. In this way, recognition accuracy of the wakeup word is high, and precision of speech wakeup is high. During specific implementation, header loss compensation may be directly or implicitly performed on the air conduction signal based on the bone conduction signal, or the wakeup word may be directly detected based on the bone conduction signal.

The foregoing describes the implementation in which the wearable device performs speech wakeup based on the bone conduction signal. In this embodiment of this disclosure, the wakeup word may further be registered in the wearable device. Optionally, the confidence threshold in the foregoing embodiment may further be determined when the wakeup word is registered, and the plurality of template vectors in the foregoing embodiment may further be determined. The following describes a process of registering a wakeup word.

In this embodiment of this disclosure, a wearable device first determines a phoneme sequence corresponding to a wakeup word. Then, the wearable device obtains a bone conduction registration signal, where the bone conduction registration signal includes complete information of the wakeup word. The wearable device determines a confidence threshold based on the bone conduction registration signal and the phoneme sequence corresponding to the wakeup word. Optionally, the wearable device may further determine a plurality of template vectors based on the bone conduction signal.

Optionally, the wearable device obtains the input wakeup word, and determines, according to a pronunciation dictionary, the phoneme sequence corresponding to the wakeup word. For example, a user inputs a wakeup word text to the wearable device. The wearable device obtains the wakeup word text input by the user, and determines, according to the pronunciation dictionary, the phoneme sequence corresponding to the wakeup word. Optionally, during wakeup word registration, after the user inputs the wakeup word text, the wearable device may further detect whether the input wakeup word text meets a text registration condition. When the text registration condition is met, the wearable device determines, according to the pronunciation dictionary, the phoneme sequence corresponding to the wakeup word text.

For example, the text registration condition includes a text input quantity requirement, a character requirement, and the like. For example, the text input quantity requirement is that the user needs to input the wakeup word text for one or more times. Each time the wearable device detects a wakeup word text input by the user, the wearable device performs text verification and analysis on the input wakeup word text, to verify whether the currently input wakeup word text meets the character requirement. If the wakeup word text input by the user does not meet the character requirement, the wearable device prompts, by using a text or sound, the user with a reason why the wakeup word text does not meet the requirement, and requires re-inputting. If the wakeup word text input by the user for one or more times meets the character requirement and is the same, the wearable device determines, according to the pronunciation dictionary, the phoneme sequence corresponding to the wakeup word text.

Optionally, the wearable device detects, through text verification, whether the currently input wakeup word text meets the character requirement. For example, the character requirement includes one or more of the following requirements: Chinese is required (a non-Chinese text indicates that the character requirement is not met), four to six characters are required (a text with less than four characters or more than six characters indicates that the character requirement is not met), there is no modal particle (when there is a modal particle, the character requirement is not met), there is no more than three repeated characters with same pronunciation (when there are more than three repeated characters with same pronunciation, the character requirement is not met), a text is different from all existing command words (when a text is the same as any existing command word, the character requirement is not met), a proportion of phonemes overlapping with phonemes of an existing command word does not exceed 70% (when a proportion of phonemes overlapping with phonemes of an existing command word exceeds 70%, the character requirement is not met, to prevent false recognition), and a corresponding phoneme belongs to a phoneme in the pronunciation dictionary (when a corresponding phoneme does not belong to a phoneme in the pronunciation dictionary, the character requirement is not met, which is an abnormal case).

The foregoing is a text registration process, and text registration can be used to determine the phoneme sequence corresponding to the wakeup word. After determining the phoneme sequence corresponding to the wakeup word, the wearable device may subsequently use the phoneme sequence as a decoding path of the wakeup word, and the decoding path is used to detect the wakeup word during speech wakeup.

In addition to text registration, speech registration is further required. In this embodiment of this disclosure, after completing the text registration, the wearable device further needs to obtain the bone conduction registration signal, where the bone conduction registration signal includes the complete information of the wakeup word. Optionally, the wearable device further obtains an air conduction registration signal when obtaining the bone conduction registration signal. Optionally, during speech registration, for example, the wearable device obtains the bone conduction registration signal and the air conduction registration signal that are input by the user. After obtaining the input bone conduction registration signal and the input air conduction registration signal, the wearable device verifies whether the bone conduction registration signal and the air conduction registration signal meet a speech registration condition. When the speech registration condition is met, the wearable device performs subsequent processing, to determine the confidence threshold.

For example, the speech registration condition includes a speech input quantity requirement, an SNR requirement, a path score requirement, and the like. For example, the speech input quantity requirement is that the user needs to input wakeup word speech (including the bone conduction registration signal and the air conduction registration signal) for three times. Each time the wearable device detects the wakeup word speech input by the user, the wearable device performs pronunciation verification and analysis on the input wakeup word speech, to verify whether the currently input wakeup word speech meets the SNR requirement and the path score requirement. If the wakeup word text input by the user does not meet the SNR requirement and the path score requirement, the wearable device prompts, by using a text or sound, the user with a reason why the wakeup word text does not meet the requirement, and requires re-inputting. If the wakeup word speech input by the user for three times meets the SNR requirement and the path score requirement, the wearable device determines that the wakeup word speech input by the user meets the speech registration condition, and performs subsequent processing.

Optionally, the wearable device may first detect whether the input wakeup word speech meets the SNR requirement, and after determining that the input wakeup word speech meets the SNR requirement, detect whether the input wakeup word speech meets the path score requirement. For example, the SNR requirement includes that an SNR is not less than an SNR threshold (if an SNR is less than an SNR threshold, the SNR requirement is not met). For example, an SNR of the bone conduction registration signal needs to be not less than a first SNR threshold, and/or an SNR of the air conduction registration signal needs to be not less than a second SNR threshold. Optionally, the first SNR threshold is greater than the second SNR threshold. If the wakeup word speech input by the user does not meet the SNR requirement, the wearable device prompts the user that current environment noise is large and is not suitable for registration, and the user needs to find a quiet environment to re-input the wakeup word speech. The path score requirement includes that a path score obtained based on wakeup word speech input each time is not less than a calibration threshold, a mean of three path scores obtained based on wakeup word speech input for three times is not less than the calibration threshold, and a difference between two path scores obtained based on wakeup word speech input for any two times is not greater than 100 points (or another value). An implementation process of obtaining the path score based on the wakeup word speech is described in the following, and is essentially similar to a process of obtaining the confidence based on the bone conduction signal in the speech wakeup.

The following describes an implementation in which the wearable device determines the confidence threshold based on the bone conduction registration signal and the phoneme sequence corresponding to the wakeup word. The implementation is similar to the implementation of obtaining the confidence based on the bone conduction signal in the speech wakeup. The wearable device may determine the confidence threshold in a plurality of implementations. The following describes two implementations.

First Implementation

The wearable device determines a fusion registration signal based on the bone conduction registration signal, and determines the confidence threshold and the plurality of template vectors based on the fusion registration signal and the phoneme sequence corresponding to the wakeup word.

First, an implementation in which the wearable device determines the fusion registration signal based on the bone conduction registration signal is described. It should be noted that there are a plurality of manners in which the wearable device determines the fusion registration signal based on the bone conduction registration signal. The following describes four manners.

Manner 1 of determining the fusion registration signal based on the bone conduction registration signal: Before the fusion registration signal is determined based on the bone conduction registration signal, an air conduction registration signal is obtained. The wearable device fuses a start part of the bone conduction registration signal and the air conduction registration signal, to obtain the fusion registration signal. The start part of the bone conduction registration signal is determined based on a detection delay of the speech detection. Optionally, signal fusion is performed through signal concatenation in this embodiment of this disclosure.

It should be noted that the implementation in which the wearable device fuses the start part of the bone conduction registration signal and the air conduction registration signal is similar to a principle of the manner 1 of determining the fusion signal based on the bone conduction signal in the foregoing embodiment. Details are not described herein again. In addition, the wearable device may also perform speech segment detection on the bone conduction registration signal and the air conduction registration signal, to capture a speech segment, and perform signal concatenation based on the captured speech segment, to reduce a data processing amount. The bone conduction registration signal and the air conduction registration signal may further be preprocessed, for example, downsampling and/or gain adjustment are/is performed on the bone conduction registration signal, and speech enhancement is performed on the air conduction signal. A specific implementation is similar to a principle of related content of the foregoing embodiment. Refer to the foregoing embodiment. Details are not described herein again.

Manner 2 of determining the fusion registration signal based on the bone conduction registration signal: Before the fusion registration signal is determined based on the bone conduction registration signal, an air conduction registration signal is obtained. The wearable device generates an enhancement start registration signal based on a start part of the bone conduction registration signal, and fuses the enhancement start registration signal and the air conduction registration signal, to obtain the fusion registration signal. The start part of the bone conduction registration signal is determined based on a detection delay of the speech detection.

It should be noted that, a difference between the manner 1 of determining the fusion registration signal based on the bone conduction registration signal and the manner 2 is that in the manner 2, the wearable device generates the enhancement start registration signal based on the start part of the bone conduction registration signal, and instead of fusing the start part of the bone conduction registration signal and the air conduction signal, fuses the enhancement start registration signal and the air conduction registration signal. In addition, in the manner 2, the wearable device may also perform speech segment detection on the bone conduction registration signal and the air conduction registration signal, to capture speech segments, and perform signal fusion based on the captured speech segments, to reduce a data processing amount. The wearable device may further preprocess the bone conduction registration signal and the air conduction registration signal, for example, perform downsampling and/or gain adjustment on the bone conduction registration signal, and perform speech enhancement on the air conduction signal. A specific implementation is similar to a principle of related content of the foregoing embodiment. Refer to the foregoing embodiment. Details are not described herein again.

In this embodiment of this disclosure, the wearable device may input the start part of the bone conduction registration signal to a generation network model, to obtain the enhancement start registration signal output by the generation network model. The generation network model may be the same as the generation network model described above, or may be another generation network model. This is not limited in this embodiment of this disclosure. A network structure, a training manner, a training device, and the like of the generation network model are not limited in this embodiment of this disclosure.

Manner 3 of determining the fusion registration signal based on the bone conduction registration signal: Before the fusion registration signal is determined based on the bone conduction registration signal, an air conduction registration signal is obtained. The wearable device directly fuses the bone conduction registration signal and the air conduction registration signal, to obtain the fusion registration signal.

It should be noted that, a difference between the manner 1 of determining the fusion registration signal based on the bone conduction registration signal and the manner 3 is that in the manner 3, the wearable device fuses the bone conduction registration signal and the air conduction registration signal, to obtain the fusion registration signal. In addition, in the manner 3, the wearable device may also perform speech segment detection on the bone conduction registration signal and the air conduction registration signal, to capture speech segments, and perform signal fusion based on the captured speech segments, to reduce a data processing amount. The wearable device may further preprocess the bone conduction registration signal and the air conduction registration signal, for example, perform downsampling and/or gain adjustment on the bone conduction registration signal, and perform speech enhancement on the air conduction signal. A specific implementation is similar to a principle of related content of the foregoing embodiment. Refer to the foregoing embodiment. Details are not described herein again.

Manner 4 of determining the fusion registration signal based on the bone conduction registration signal: The wearable device determines the bone conduction registration signal as the fusion registration signal.

It should be noted that, a difference between the manner 1 of determining the fusion registration signal based on the bone conduction registration signal and the manner 4 is that in the manner 4, the wearable device directly uses the bone conduction registration signal as the fusion registration signal. In addition, in the manner 4, the wearable device may also perform speech segment detection on the bone conduction registration signal, to capture a speech segment, and perform subsequent processing based on the captured speech segment, to reduce a data processing amount. The wearable device may further preprocess the bone conduction registration signal, for example, perform downsampling and/or gain adjustment on the bone conduction registration signal. A specific implementation is similar to a principle of related content of the foregoing embodiment. Refer to the foregoing embodiment. Details are not described herein again.

The following describes an implementation in which the wearable device determines the confidence threshold and the plurality of template vectors based on the fusion registration signal and the phoneme sequence corresponding to the wakeup word.

Optionally, the wearable device inputs a plurality of registration audio frames included in the fusion registration signal to the first acoustic model, to obtain a plurality of registration posterior probability vectors output by the first acoustic model. The plurality of registration posterior probability vectors one-to-one correspond to the plurality of registration audio frames, and a first registration posterior probability vector in the plurality of registration posterior probability vectors indicates a probability that a phoneme of a first registration audio frame in the plurality of registration audio frames belongs to a plurality of specified phonemes. In other words, each of the plurality of registration posterior probability vectors corresponds to one registration audio frame included in the fusion registration signal, and one registration posterior probability vector indicates a probability that a phoneme of one corresponding registration audio frame belongs to the plurality of specified phonemes. The wearable device determines the plurality of registration posterior probability vectors as the plurality of template vectors. The wearable device determines the confidence threshold based on the plurality of registration posterior probability vectors and the phoneme sequence corresponding to the wakeup word. In other words, the wearable device processes the fusion registration signal by using the first acoustic model, to obtain the information about the phoneme included in the fusion signal, that is, obtain the registration posterior probability vectors, uses the registration posterior probability vectors as the template vectors, and stores the template vectors. The wearable device further decodes the registration posterior probability vector based on the pho-neme sequence (namely, the decoding path) corresponding to the wakeup word, to determine a path score, uses the path score as the confidence threshold, and stores the confidence threshold. For related descriptions of the first acoustic model, refer to the foregoing embodiment. Details are not described herein again.

The foregoing describes the first implementation in which the wearable device determines the confidence threshold based on the bone conduction registration signal and the phoneme sequence corresponding to the wakeup word. In the first implementation, the wearable device first deter-mines the fusion registration signal based on the bone conduction registration signal (including four manners), and then processes the fusion registration signal by using the acoustic model, to obtain the registration posterior probabil-ity vectors. Then, the wearable device decodes the obtained registration posterior probability vectors based on the decod-ing path corresponding to the wakeup word, to obtain the confidence threshold. Optionally, the wearable device stores the obtained registration posterior probability vectors as the template vectors. The following describes a second imple-mentation in which the wearable device determines the confidence threshold based on the bone conduction regis-tration signal and the phoneme sequence corresponding to the wakeup word.

Second Implementation

In this embodiment of this disclosure, before determining a confidence threshold based on the bone conduction regis-tration signal and the phoneme sequence corresponding to the wakeup word, the wearable device obtains an air con-duction registration signal. The wearable device determines a plurality of registration posterior probability vectors based on the bone conduction registration signal and the air conduction registration signal. The plurality of registration posterior probability vectors one-to-one correspond to a plurality of registration audio frames included in the bone conduction registration signal and the air conduction regis-tration signal, and a first registration posterior probability vector in the plurality of registration posterior probability vectors indicates a probability that a phoneme of a first registration audio frame in the plurality of registration audio frames belongs to a plurality of specified phonemes. It should be noted that the plurality of registration audio frames include a registration audio frame included in the bone conduction registration signal and a registration audio frame included in the air conduction registration signal. In other words, each of the plurality of registration posterior probability vectors corresponds to one registration audio frame included in the bone conduction registration signal or the air conduction registration signal, and one registration posterior probability vector indicates a probability that a phoneme of one corresponding registration audio frame belongs to the plurality of specified phonemes. The wearable device determines the confidence threshold based on the plurality of registration posterior probability vectors and the phoneme sequence corresponding to the wakeup word. Optionally, the wearable device determines the plurality of registration posterior probability vectors as the plurality of template vectors.

It should be noted that, for related descriptions of the bone conduction registration signal and the air conduction regis-tration signal, refer to content in the first implementation that includes generation principles of the bone conduction reg-istration signal and the air conduction registration signal, preprocessing of the bone conduction registration signal and the air conduction registration signal, and the like. Details are not described herein again.

First, the following describes an implementation in which the wearable device determines the plurality of registration posterior probability vectors based on the bone conduction registration signal and the air conduction registration signal. It should be noted that there are a plurality of manners in which the wearable device determines the plurality of reg-istration posterior probability vectors based on the bone conduction registration signal and the air conduction regis-tration signal. The following describes three manners.

Manner 1 of determining the plurality of registration posterior probability vectors based on the bone conduction registration signal and the air conduction registration signal: The wearable device inputs a start part of the bone conduc-tion registration signal and the air conduction registration signal to the second acoustic model, to obtain a third quantity of bone conduction registration posterior probabil-ity vectors and a fourth quantity of air conduction registra-tion posterior probability vectors that are output by the second acoustic model. The wearable device fuses a first bone conduction registration posterior probability vector and a first air conduction registration posterior probability vector, to obtain a second registration posterior probability vector. The start part of the bone conduction registration signal is determined based on a detection delay of the speech detection, the third quantity of bone conduction registration posterior probability vectors one-to-one corresponds to a registration audio frame included in the start part of the bone conduction registration signal, and the fourth quantity of air conduction registration posterior probability vectors one-to-one corresponds to a registration audio frame included in the air conduction registration signal. In other words, one bone conduction registration posterior probability vector corre-sponds to one registration audio frame included in the start part of the bone conduction registration signal, and one air conduction registration posterior probability vector corresponds to one registration audio frame included in the air conduction registration signal. The first bone conduction registration posterior probability vector corresponds to a last registration audio frame of the start part of the bone conduction registration signal, duration of the last registration audio frame is less than the frame duration, the first air conduction posterior probability vector corresponds to a $1^{st}$ registration audio frame of the air conduction registration signal, and duration of the $1^{st}$ registration audio frame is less than the frame duration. The plurality of registration posterior probability vectors that are finally determined by the wearable device include the second registration posterior probability vector, a vector in the third quantity of bone conduction registration posterior probability vectors other than the first bone conduction registration posterior probability vector, and a vector in the fourth quantity of air conduction registration posterior probability vectors other than the first air conduction registration posterior probability vector. The third quantity and the fourth quantity may be the same or different, the third quantity and the first quantity may be the same or different, and the fourth quantity and the second quantity may be the same or different.

Optionally, the wearable device adds the first bone conduction registration posterior probability vector and the first air conduction registration posterior probability vector, to obtain the second registration posterior probability vector.

It should be noted that, for related descriptions of the start part of the bone conduction registration signal, refer to content in the first implementation. Details are not described herein again. In addition, for related descriptions of the second acoustic model, refer to related content of the foregoing embodiment. Details are not described herein again. A principle in which the wearable device obtains the third quantity of bone conduction registration posterior probability vectors and the fourth quantity of air conduction registration posterior probability vectors by using the second acoustic model is consistent with the principle of obtaining the first quantity of bone conduction posterior probability vectors and the second quantity of air conduction posterior probability vectors by using the second acoustic model in the foregoing embodiment. Details are not described herein again.

Manner 2 of determining the plurality of registration posterior probability vectors based on the bone conduction registration signal and the air conduction registration signal: The wearable device inputs a start part of the bone conduction registration signal and the air conduction registration signal to the third acoustic model, to obtain a plurality of registration posterior probability vectors output by the third acoustic model. The start part of the bone conduction registration signal is determined based on a detection delay of the speech detection.

It should be noted that, for related descriptions of the start part of the bone conduction registration signal, refer to content in the first implementation. Details are not described herein again. In addition, for related descriptions of the third acoustic model, refer to related content of the foregoing embodiment. Details are not described herein again. A principle in which the wearable device obtains the plurality of registration posterior probability vectors by using the third acoustic model is consistent with the principle of obtaining the plurality of posterior probability vectors by using the third acoustic model in the foregoing embodiment. Details are not described herein again.

Manner 3 of determining the plurality of registration posterior probability vectors based on the bone conduction registration signal and the air conduction registration signal:

The wearable device inputs the bone conduction registration signal and the air conduction registration signal to the third acoustic model, to obtain a plurality of registration posterior probability vectors output by the third acoustic model. In other words, the wearable device directly inputs the bone conduction registration signal and the air conduction registration signal to the third acoustic model at the same time, and outputs a group of registration posterior probability vectors by using the third acoustic model, so that the plurality of obtained registration posterior probability vectors include the complete information of the wakeup word input by the sound source.

In this embodiment of this disclosure, after determining the plurality of registration posterior probability vectors, the wearable device determines the confidence threshold based on the plurality of registration posterior probability vectors and the phoneme sequence corresponding to the wakeup word. A principle is similar to the foregoing principle in which the wearable device determines the confidence based on the plurality of posterior probability vectors and the phoneme sequence of the wakeup word. For a specific implementation, refer to the foregoing related descriptions. Details are not described herein again.

FIG. 19 to FIG. 24 are flowcharts of six wakeup word registration methods according to embodiments of this disclosure. The following describes a process of registering a wakeup word again with reference to FIG. 19 to FIG. 24.

Figure 19:
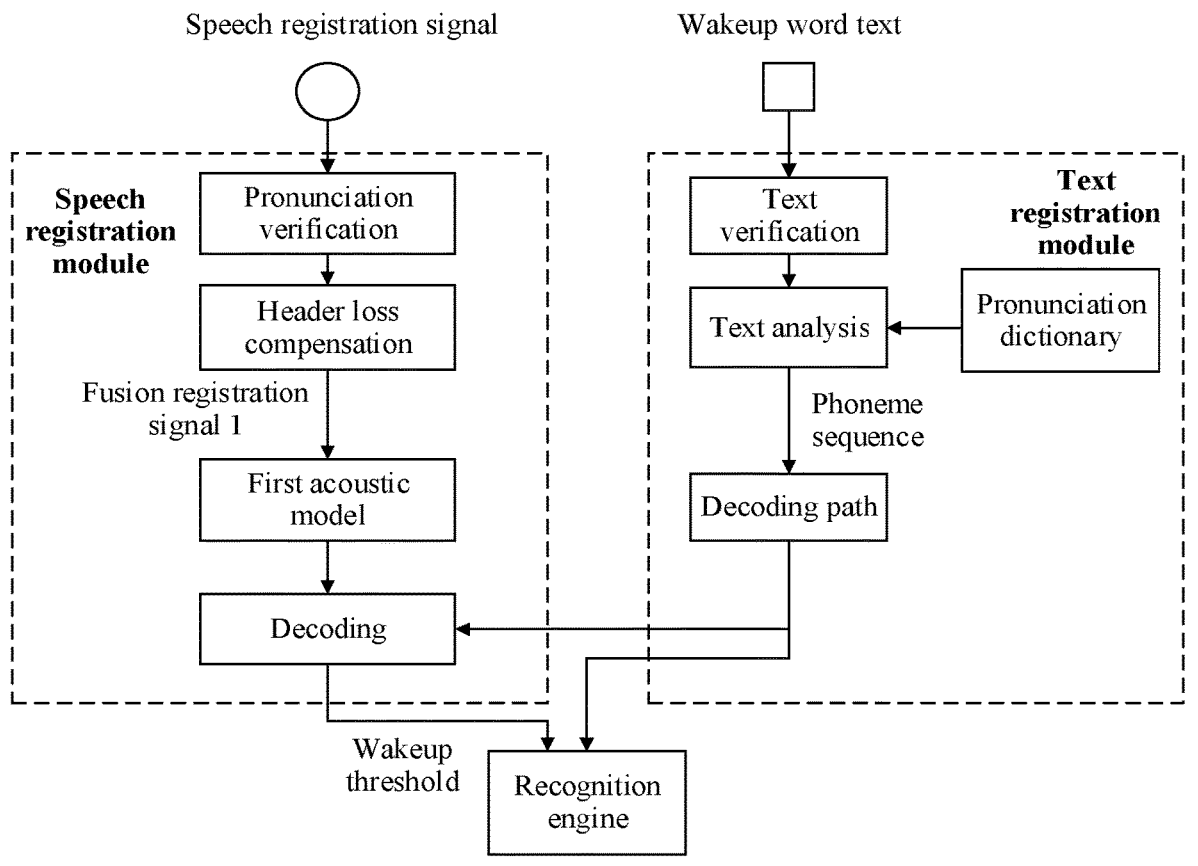
FIG. 19 is a flowchart of a wakeup word registration method according to an embodiment of this disclosure.

FIG. 19 corresponds to the manner 1 in the first implementation of wakeup word registration. The process of registering a wakeup word includes text registration and speech registration. For example, a wearable device registers a wakeup word by using a plurality of modules, and the wearable device first performs text registration. A text registration module of the wearable device obtains a wakeup word text input by a user, performs text verification and text analysis on the input wakeup word text, determines, according to a pronunciation dictionary, a phoneme sequence corresponding to the wakeup word text that meets a text registration requirement, determines the phoneme sequence as a decoding path, and sends the decoding path to a recognition engine. The recognition engine stores the decoding path. Then, the wearable device performs speech registration. A speech registration module of the wearable device obtains a speech registration signal, including a bone conduction registration signal and an air conduction registration signal. Optionally, the wearable device obtains the bone conduction registration signal and the air conduction registration signal through VAD, and may further preprocess the obtained bone conduction registration signal and air conduction registration signal. Then, the speech registration module performs pronunciation verification on the bone conduction registration signal and the air conduction registration signal. A fusion module fuses a bone conduction registration signal and an air conduction registration signal that are obtained through verification and that meet the speech registration requirement, to obtain a fusion registration signal. To distinguish between FIG. 19 and FIG. 22, the fusion registration signal in FIG. 19 is referred to as a fusion registration signal 1. The speech registration module processes the fusion registration signal 1 by using a first acoustic model, to obtain a plurality of registration posterior probability vectors, decodes the plurality of registration posterior probability vectors, to determine a path score, and sends the path score as a wakeup threshold (namely, a confidence threshold) to the recognition engine. The recognition engine stores the wakeup threshold, where the wakeup threshold is used to suppress a level-1 false wakeup in subsequent speech wakeup. Optionally, the speech registration module sends the obtained plurality of registration posterior probability vectors as a plurality of template vectors to the recognition engine. The recognition engine stores the plurality of template vectors, where the plurality of template vectors are used to suppress level-2 false wakeup in subsequent speech wakeup.

Figure 20:
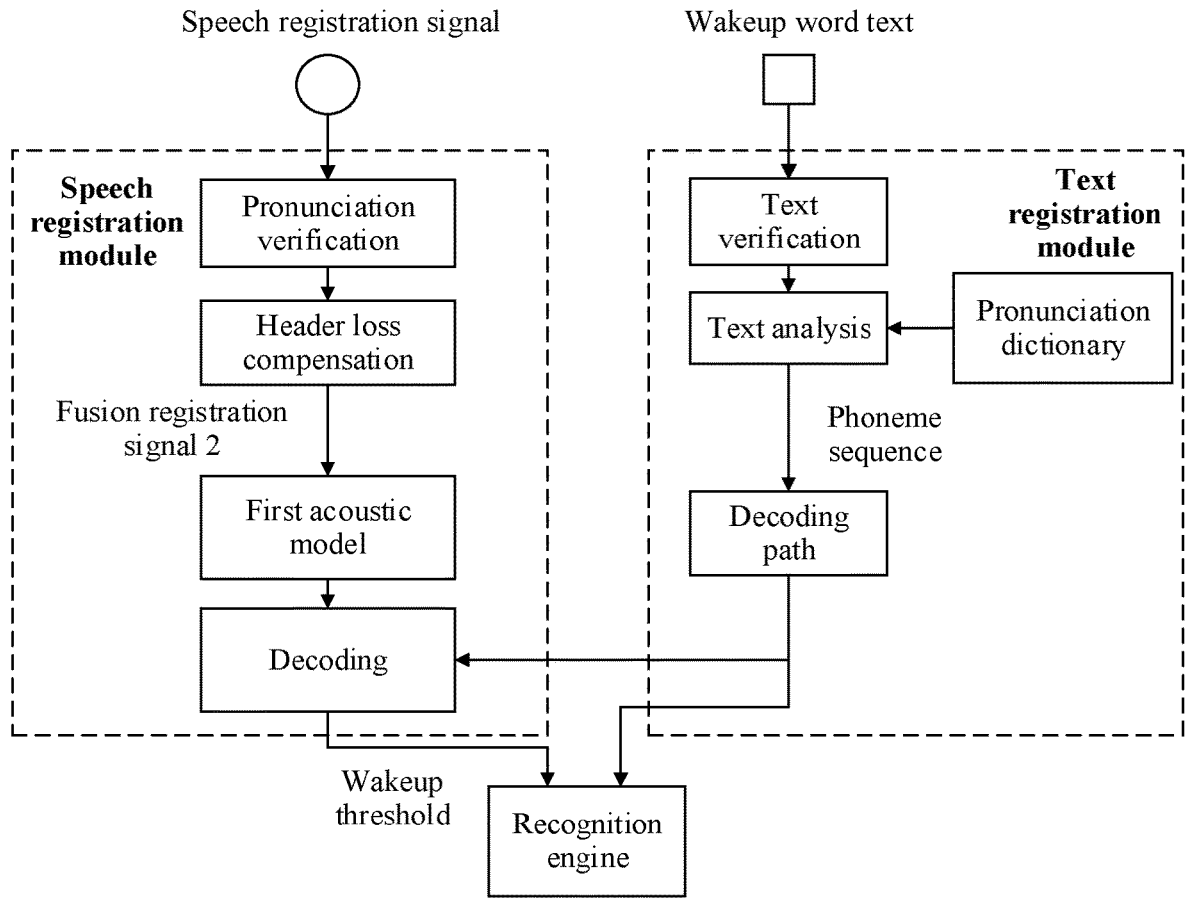
FIG. 20 is a flowchart of another wakeup word registration method according to an embodiment of this disclosure.
Figure 21:
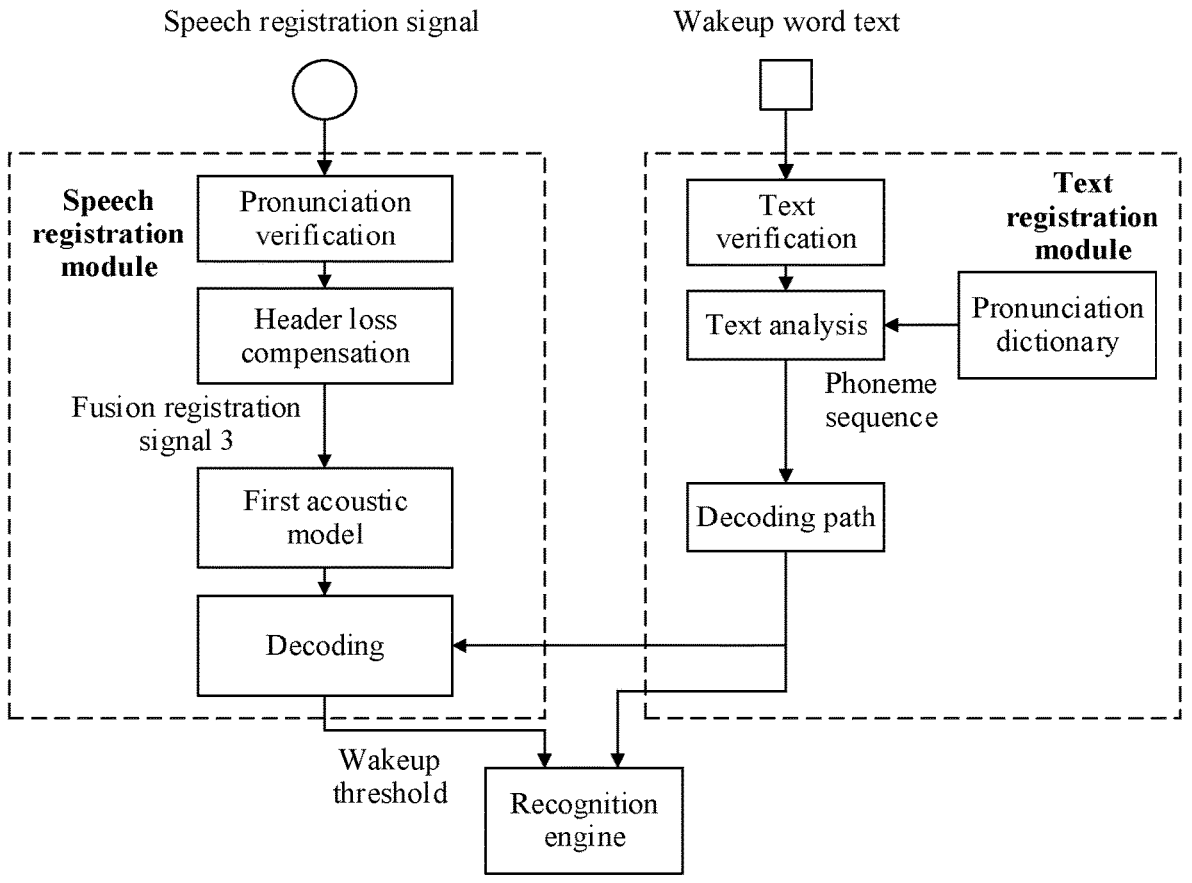
FIG. 21 is a flowchart of still another wakeup word registration method according to an embodiment of this disclosure.
Figure 22:
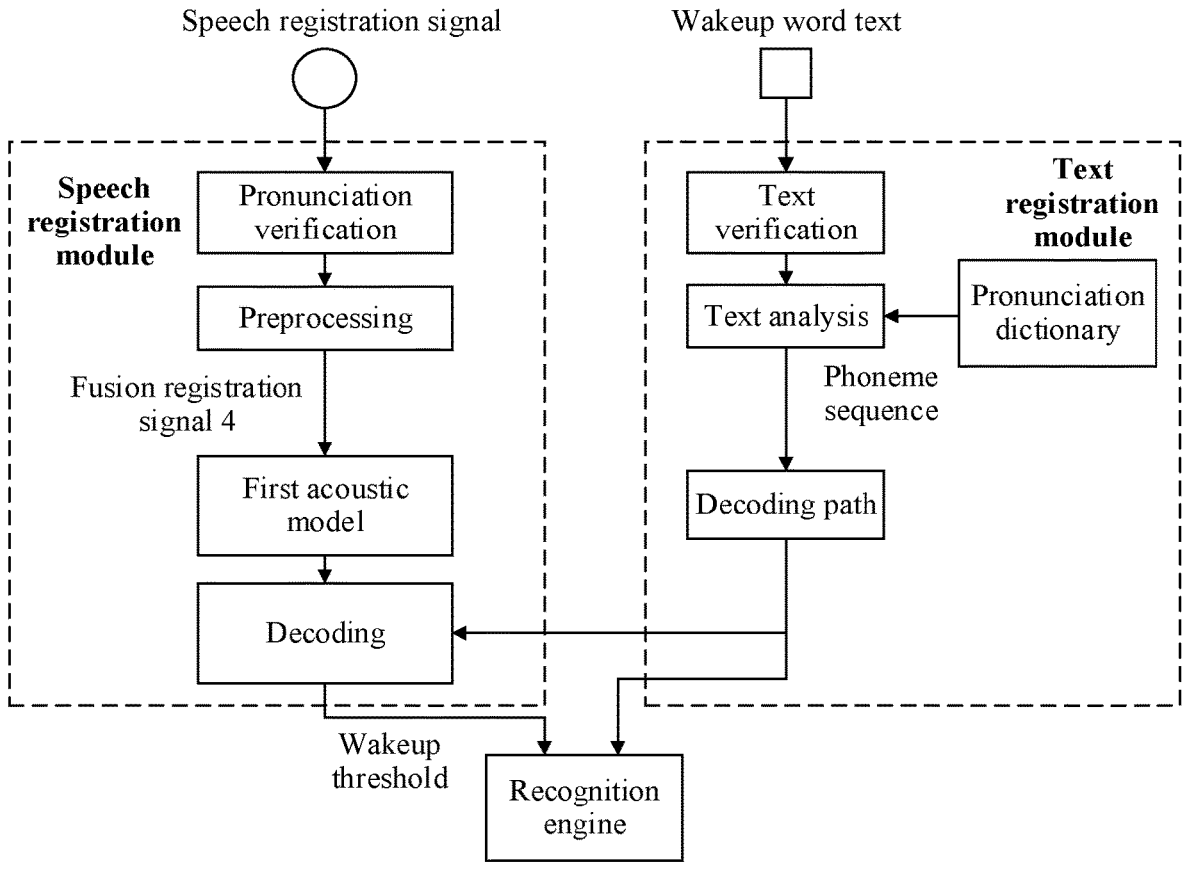
FIG. 22 is a flowchart of still another wakeup word registration method according to an embodiment of this disclosure.

FIG. 20 to FIG. 22 correspond to the manner 2, the manner 3, and the manner 4 in the first implementation of wakeup word registration. A difference between FIG. 19 and FIG. 20 lies in that in the method shown in FIG. 20, a speech registration module of a wearable device generates an enhancement start registration signal based on a start part of a bone conduction registration signal, and fuses the enhancement start registration signal and an air conduction registration signal, to obtain a fusion registration signal. The fusion registration signal in FIG. 20 is referred to as a fusion registration signal 2. In the method shown in FIG. 21, a speech registration module directly fuses a bone conduction registration signal and an air conduction registration signal, to obtain a fusion registration signal. The fusion registration signal in FIG. 21 is referred to as a fusion registration signal 3. In the method shown in FIG. 22, a speech registration module may directly determine a bone conduction registration signal as a fusion registration signal without obtaining an air conduction registration signal. The fusion registration signal in FIG. 22 is referred to as a fusion registration signal 4.

Figure 23:
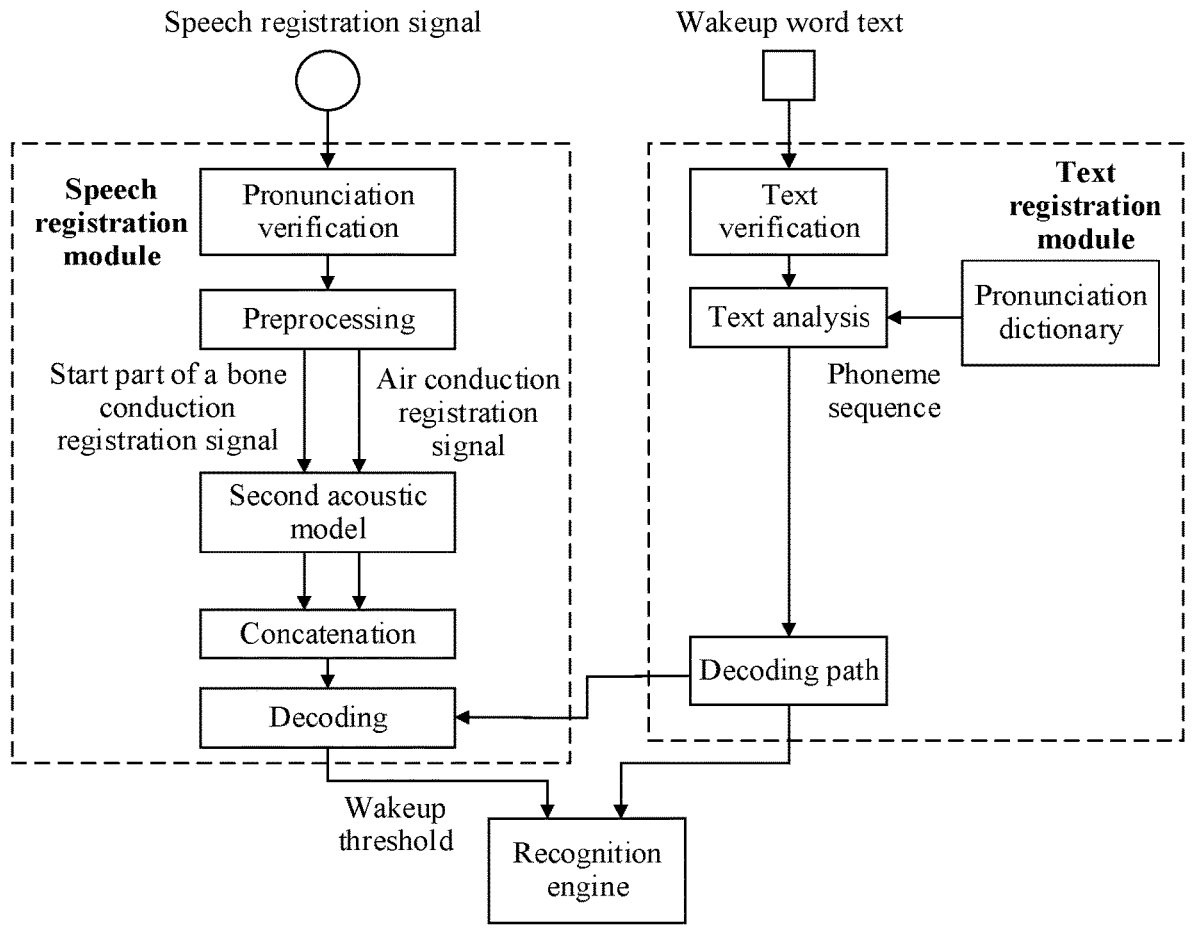
FIG. 23 is a flowchart of still another wakeup word registration method according to an embodiment of this disclosure.

FIG. 23 corresponds to the manner 1 in the second implementation of wakeup word registration. A difference between FIG. 19 and FIG. 23 lies in that in the method shown in FIG. 23, a speech registration module of a wearable device separately inputs a start part of a bone conduction registration signal and an air conduction registration signal to a second acoustic model, to obtain a third quantity of bone conduction registration posterior probability vectors and a fourth quantity of air conduction registration posterior probability vectors that are separately output by the second acoustic model. The speech registration module fuses the third quantity of bone conduction registration posterior probability vectors and the fourth quantity of air conduction registration posterior probability vectors, to obtain a plurality of registration posterior probability vectors.

Figure 24:
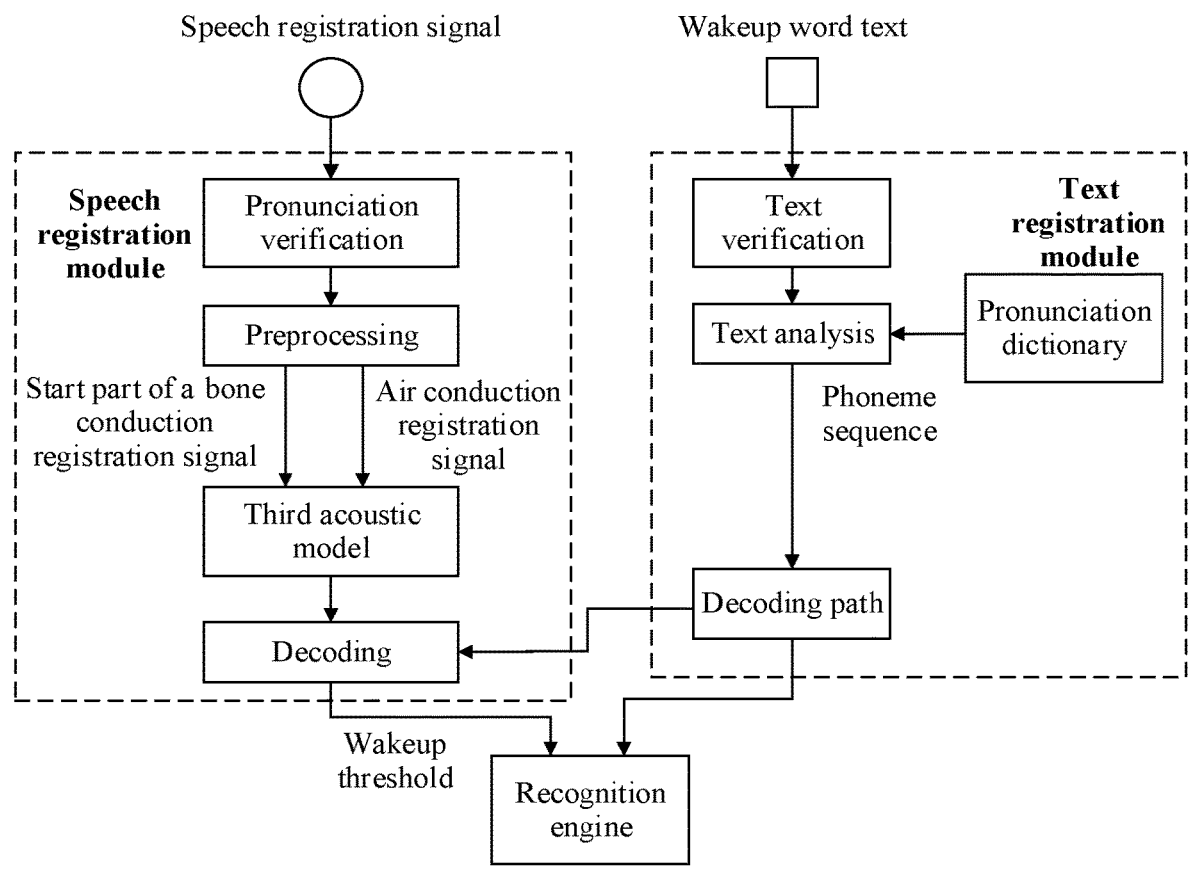
FIG. 24 is a flowchart of still another wakeup word registration method according to an embodiment of this disclosure.

FIG. 24 corresponds to the manner 2 and the manner 3 in the second implementation of wakeup word registration. A difference between FIG. 23 and FIG. 24 lies in that, in the method shown in FIG. 24, a speech registration module of a wearable device separately inputs a start part of a bone conduction registration signal and an air conduction registration signal to a third acoustic model, or inputs a bone conduction registration signal and an air conduction registration signal to a third acoustic model, to obtain a plurality of registration posterior probability vectors output by the third acoustic model.

It can be learned from the foregoing that, a procedure of processing the bone conduction registration signal and the air conduction registration signal during wakeup word registration is similar to a procedure of processing the bone conduction signal and the air conduction signal during speech wakeup. However, the procedure during wakeup word registration is for obtaining a wakeup threshold and a template vector, and the procedure during speech wakeup is for detecting a wakeup word. The template vector can be used to improve accuracy and robustness of this solution. In this solution, header loss compensation is directly or implicitly performed on the air conduction signal based on the bone conduction signal, or the wakeup word is directly detected based on the bone conduction signal. Because the bone conduction signal includes the information about the command word input by the sound source, that is, the bone conduction signal does not lose a header, recognition accuracy of the wakeup word is high, and accuracy of speech wakeup is high.

The foregoing embodiments describe the speech wakeup process and the wakeup word registration process. It can be learned from the foregoing that the acoustic model in this embodiment of this disclosure needs to be obtained through pre-training. For example, the first acoustic model, the second acoustic model, and the third acoustic model all need to be obtained through pre-training. The following describes a training process of the acoustic model by using an example in which the computer device trains the acoustic model.

In this embodiment of this disclosure, the computer device first obtains a second training data set. The second training data set includes a plurality of second sample signal pairs, one second sample signal pair includes one bone conduction sample signal and one air conduction sample signal, and one second sample signal pair corresponds to one command word. Optionally, the second training data set includes directly collected speech data, public speech data, and/or speech data purchased from a third party. Optionally, before training, the computer device may preprocess the obtained second training data set, to obtain a preprocessed second training data set. The preprocessed second training data set can be used to simulate distribution of real speech data, so that the speech data is closer to speech in a real scenario. This increases diversity of training samples. For example, the second training data set is backed up, that is, an additional piece of data is added, and backup data is preprocessed. Optionally, the backup data is divided into a plurality of pieces, and preprocessing is performed on each piece of data. Preprocessing performed on each piece of data may be different. This can double total training data, ensure data integrity, achieve a balance between performance and training overheads, and improve accuracy and robustness of speech recognition to some extent. A method for preprocessing each piece of data may include one or more of noise addition, volume enhancement, reverberation addition, time shifting, pitch shifting, time stretching, and the like.

For example, the first acoustic model is obtained through training. The computer device determines a plurality of fusion sample signals based on the second training data set in four manners. It should be noted that the four manners one-to-one correspond to the four manners in which the wearable device determines the fusion signal based on the bone conduction signal in a recognition process (namely, the speech wakeup process) in the foregoing embodiment. In other words, if the wearable device fuses the start part of the bone conduction signal and the air conduction signal in the recognition process, to obtain the fusion signal, in the training process, the computer device fuses the start part of the bone conduction sample signal and the air conduction sample signal that are included in each of the plurality of second sample signal pairs, to obtain the plurality of fusion sample signals. If the wearable device generates the enhancement start signal based on the start part of the bone conduction signal in the recognition process, and fuse the enhancement start signal and the air conduction signal, to obtain the fusion signal, in the training process, the computer device generates an enhancement start sample signal based on the start part of the bone conduction sample signal included in each of the plurality of second sample signal pairs, and fuses each enhancement start sample signal and a corresponding air conduction sample signal, to obtain the plurality of fusion sample signals. If the computer device directly fuses the bone conduction signal and the air conduction signal in the recognition process, to obtain the fusion signal, in the training process, the computer device directly fuses the bone conduction sample signal and the air conduction sample signal that are included in each of the plurality of second sample signal pairs, to obtain the plurality of fusion sample signals. If the wearable device determines the bone conduction signal as the fusion signal in the recognition process, in the training process, the computer device determines bone conduction sample signals included in the plurality of second sample signal pairs, to obtain the plurality of fusion sample signals. The start part of the bone conduction sample signal is determined based on a detection delay of the speech detection or experience. Then, the computer device trains a first initial acoustic model based on the plurality of fusion sample signals, to obtain the first acoustic model in this embodiment of this disclosure. A network structure of the first initial acoustic model is the same as a network structure of the first acoustic model.

Optionally, before determining the plurality of fusion sample signals based on the second training data set, the computer device preprocesses the bone conduction sample signal and the air conduction sample signal that are included in the second training data set, for example, performs front-end enhancement on the air conduction sample signal, and performs downsampling and gain adjustment on the bone conduction sample signal. Optionally, the computer device inputs the start part of the bone conduction sample signal included in each of the plurality of second sample signal pairs to a generation network model, to obtain an enhancement start sample signal output by the generation network model. The generation network model and the generation network model in the foregoing embodiment may be a same model or may be different models. This is not limited in this embodiment of this disclosure.

Figure 25:
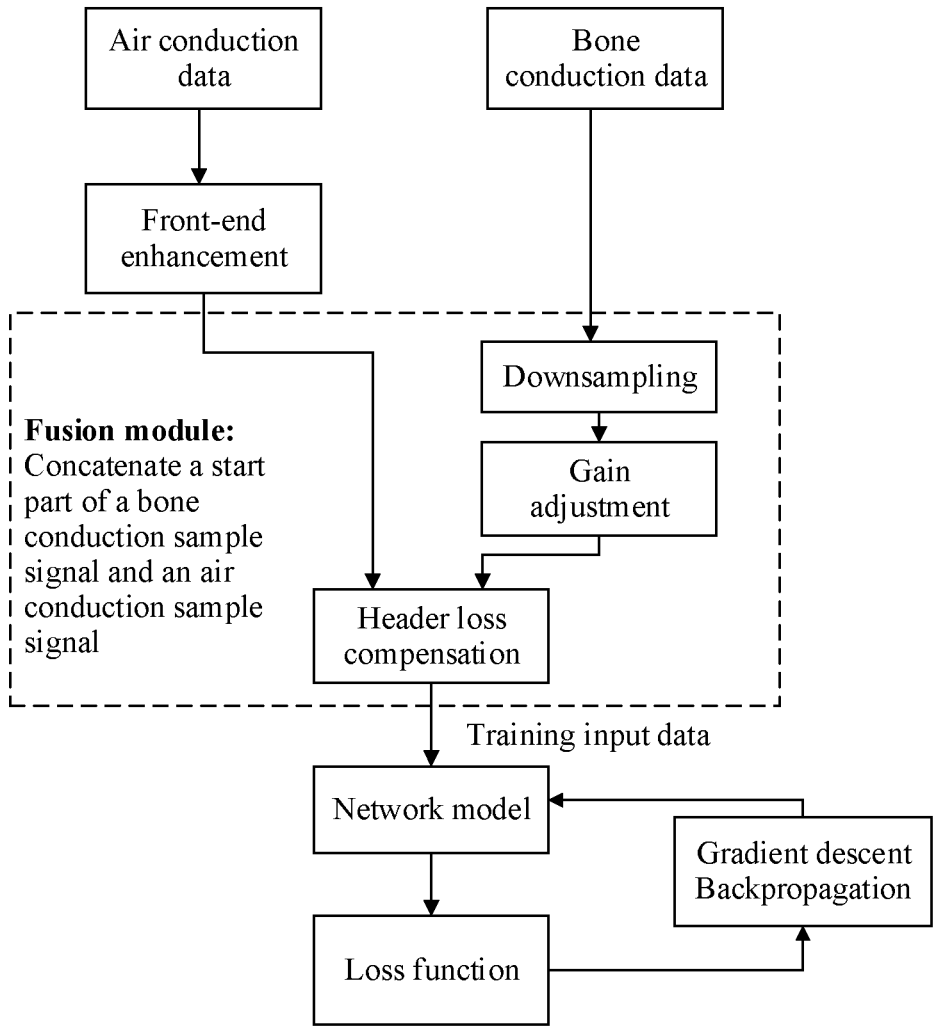
FIG. 25 is a schematic diagram of a first acoustic model training method according to an embodiment of this disclosure.
Figure 26:
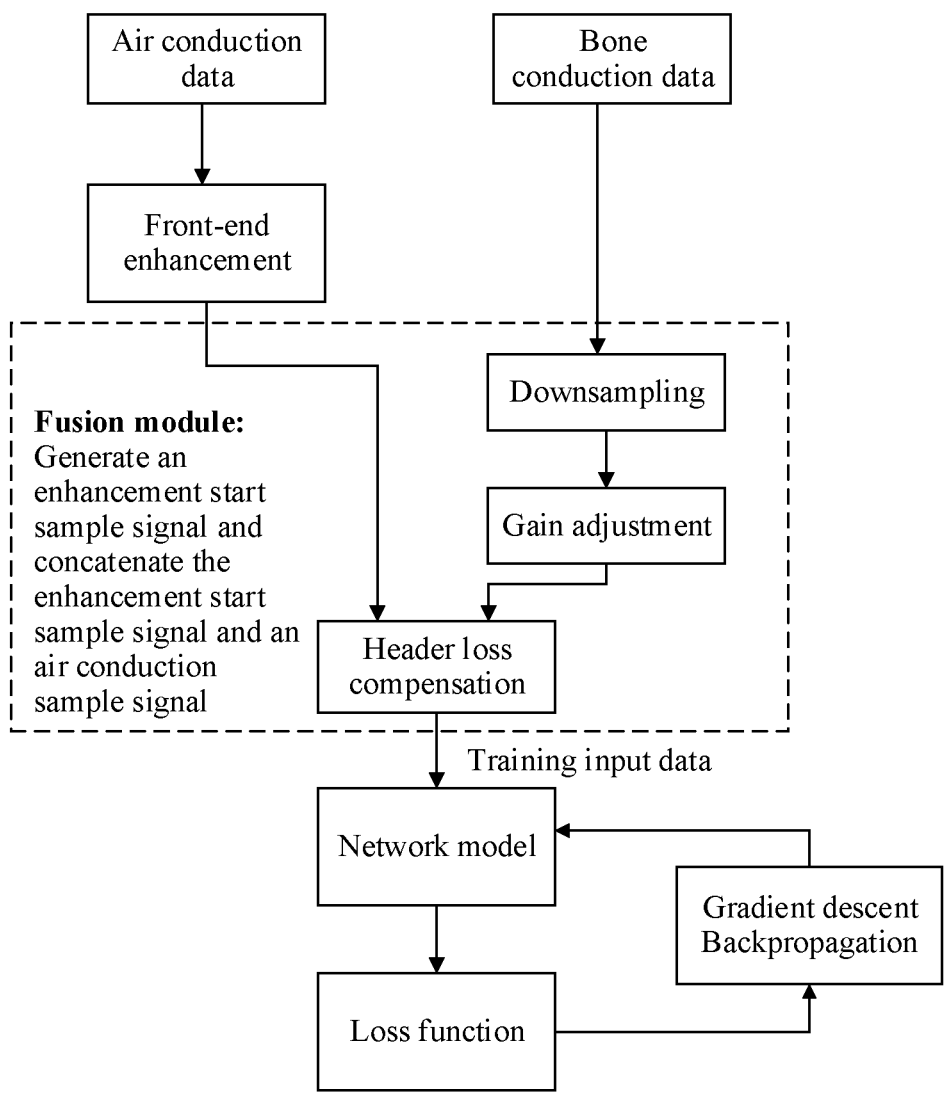
FIG. 26 is a schematic diagram of another first acoustic model training method according to an embodiment of this disclosure.
Figure 27:
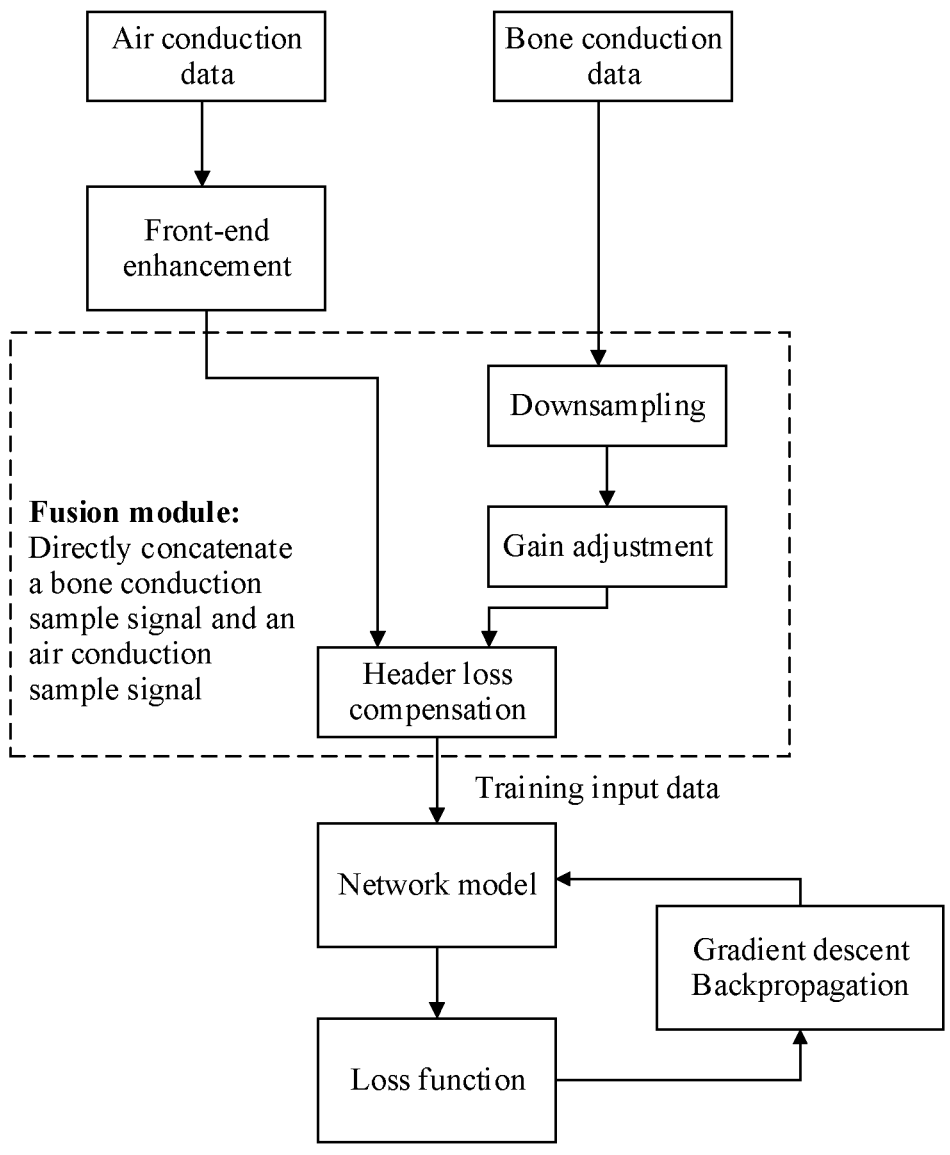
FIG. 27 is a schematic diagram of still another first acoustic model training method according to an embodiment of this disclosure.
Figure 28:
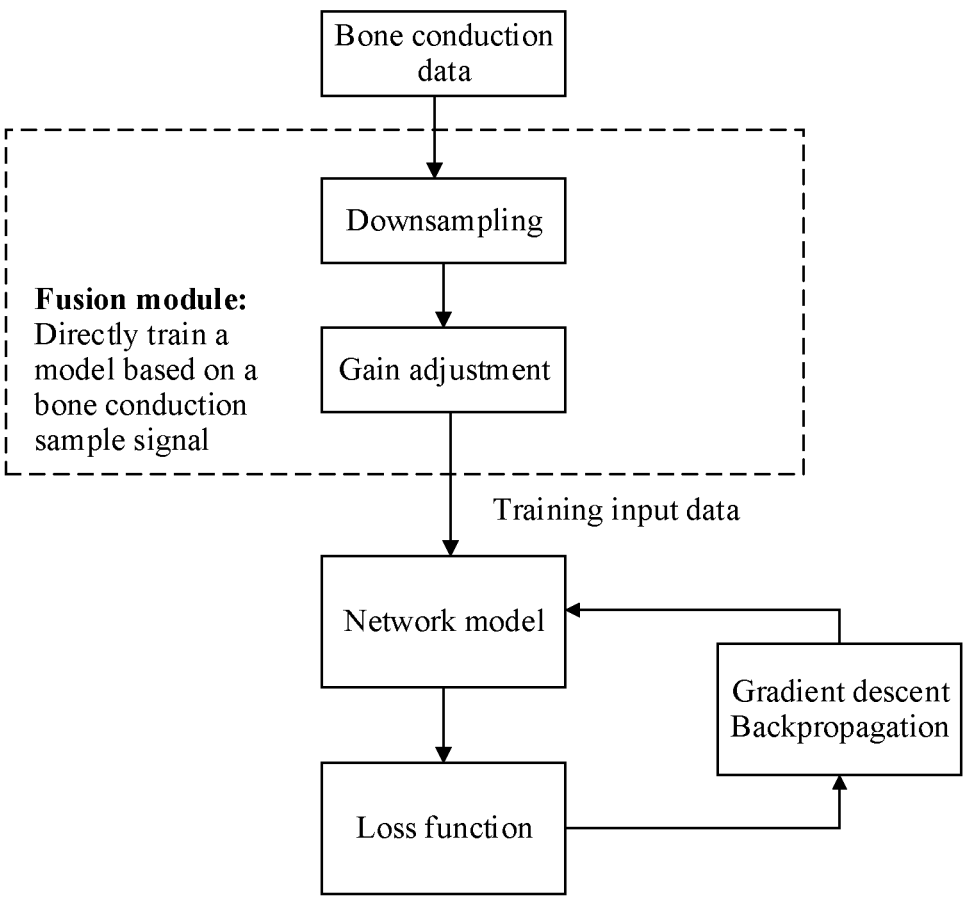
FIG. 28 is a schematic diagram of still another first acoustic model training method according to an embodiment of this disclosure.

For example, FIG. 25 to FIG. 28 are four schematic diagrams of separately obtaining a first acoustic model in the foregoing four manners according to embodiments of this disclosure. Refer to FIG. 25 to FIG. 28. The second training data set obtained by the computer device includes bone conduction data (bone conduction sample signal) and air conduction data (air conduction sample signal). The computer device performs downsampling and/or gain adjustment on the bone conduction data by using the fusion module, and performs front-end enhancement on the air conduction data by using the front-end enhancement module. FIG. 25 to FIG. 27 correspond to the first three manners of the four manners. The fusion module separately performs header loss compensation on the air conduction signal based on the bone conduction data in a corresponding manner, to obtain training input data. FIG. 28 corresponds to the fourth manner of the four manners. The fusion module directly uses the bone conduction data as the training input data without obtaining the air conduction data. Then, the computer device trains the network model (namely, the first initial acoustic model) based on the training input data, and adjusts the network model by using a loss function, a gradient descent algorithm, and error backpropagation, to obtain a trained first acoustic model.

For example, the second acoustic model is trained. A training process corresponds to the manner 1 in which the wearable device determines the plurality of posterior probability vectors based on the bone conduction signal and the air conduction signal during speech wakeup. In the training process, the computer device uses the start part of the bone conduction sample signal and the air conduction sample signal that are included in each of the plurality of second sample signal pairs as inputs of a second initial acoustic model, to train the second initial acoustic model, so as to obtain the second acoustic model. A network structure of the second initial acoustic model is the same as a network structure of the second acoustic model. In other words, the second initial acoustic model also includes two input layers, one shared network layer, and two output layers.

Figure 29:
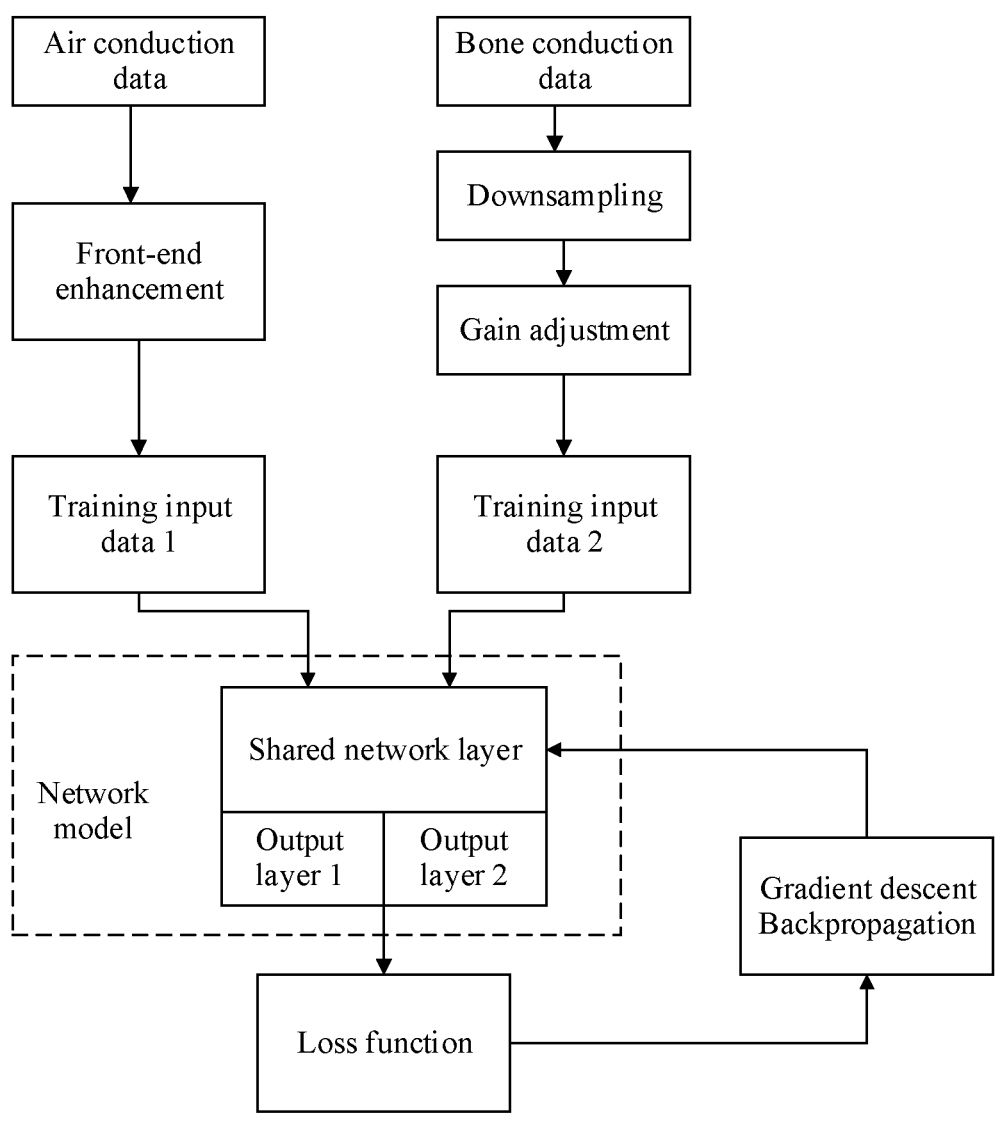
FIG. 29 is a schematic diagram of a second acoustic model training method according to an embodiment of this disclosure.

FIG. 29 is a schematic diagram of obtaining a second acoustic model through training according to an embodiment of this disclosure. Refer to FIG. 29. The second training data set obtained by the computer device includes bone conduction data (bone conduction sample signal) and air conduction data (air conduction sample signal). The computer device performs downsampling and/or gain adjustment on the bone conduction data, and performs front-end enhancement on the air conduction data. The computer device uses the bone conduction data as training input data 1, and uses the air conduction data as training input data 2. The computer device trains the network model (namely, the second initial acoustic model) based on the training input data 1 and the training input data 2, and adjusts the network model by using a loss function, a gradient descent algorithm, and error backpropagation, to obtain a trained second acoustic model. The training input data 1 and the training input data 2 may correspond to a same loss function or different loss functions. This is not limited in this embodiment of this disclosure.

For example, the third acoustic model is trained. A training process corresponds to the manner 2 in which the wearable device determines the plurality of posterior probability vectors based on the bone conduction signal and the air conduction signal during speech wakeup. In the training process, the computer device uses the start part of the bone conduction sample signal and the air conduction sample signal that are included in each of the plurality of second sample signal pairs as inputs of a third initial acoustic model, to train the third initial acoustic model, so as to obtain the third acoustic model. Alternatively, a training process corresponds to the manner 3 in which the wearable device determines the plurality of posterior probability vectors based on the bone conduction signal and the air conduction signal during speech wakeup. In the training process, the computer device uses the bone conduction sample signal and the air conduction sample signal that are included in each of the plurality of second sample signal pairs as inputs of a third initial acoustic model, to train the third initial acoustic model, so as to obtain the third acoustic model. A network structure of the third initial acoustic model is the same as a network structure of the third acoustic model. In other words, the third initial acoustic model also includes two input layers, one concatenation layer, one network parameter layer, and one output layer.

Figure 30:
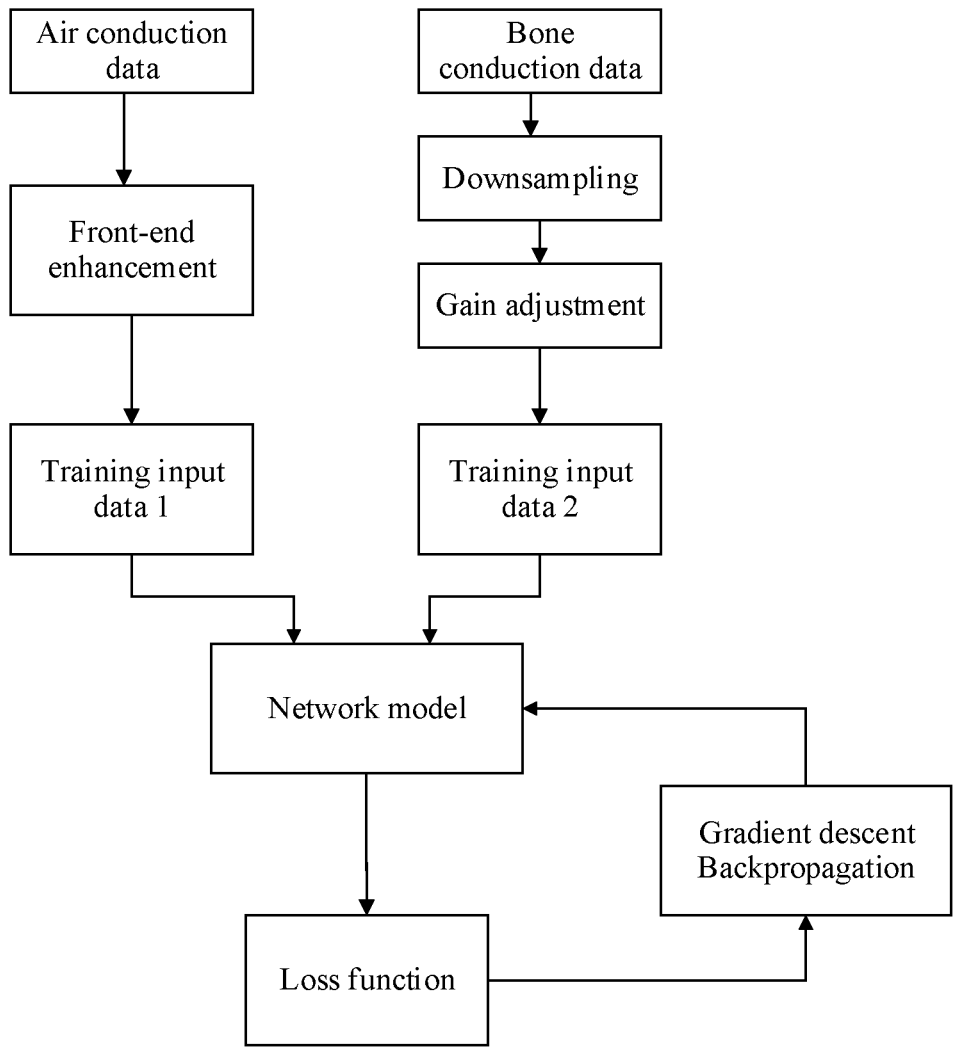
FIG. 30 is a schematic diagram of a third acoustic model training method according to an embodiment of this disclosure.

For example, FIG. 30 is a schematic diagram of obtaining a third acoustic model through training according to an embodiment of this disclosure. Refer to FIG. 30. The second training data set obtained by the computer device includes bone conduction data (bone conduction sample signal) and air conduction data (air conduction sample signal). The computer device performs downsampling and/or gain adjustment on the bone conduction data, and performs front-end enhancement on the air conduction data. The computer device uses the bone conduction data or a start part of the bone conduction data as training input data 1, and uses the air conduction data as training input data 2. The computer device trains the network model (namely, the third initial acoustic model) based on the training input data 1 and the training input data 2, and adjusts the network model by using a loss function, a gradient descent algorithm, and error backpropagation, to obtain a trained third acoustic model.

In conclusion, in this embodiment of this disclosure, in the training process, header loss compensation is also directly or implicitly performed on the air conduction registration signal based on the bone conduction sample signal, to construct the training input data to train the initial acoustic model, so as to obtain the trained acoustic model. During speech wakeup, header loss compensation is directly or implicitly performed on the air conduction signal based on the bone conduction signal. Because the bone conduction signal includes the information about the command word input by the sound source, that is, the bone conduction signal does not lose a header, in this solution, recognition accuracy of detecting the wakeup word based on the bone conduction signal is high, accuracy of speech wakeup is high, and robustness is also improved.

Figure 31:
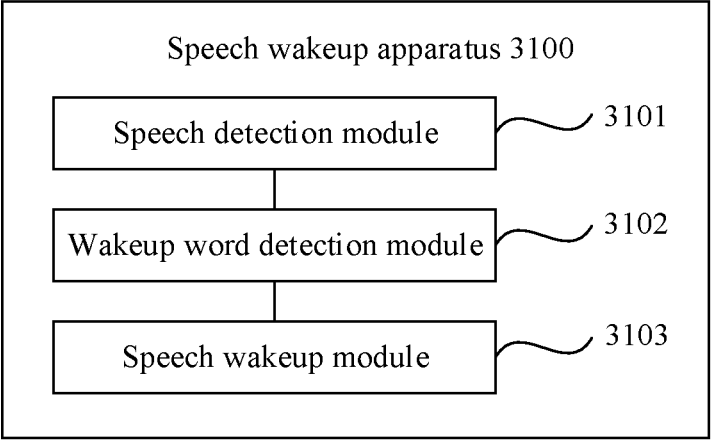
FIG. 31 is a schematic diagram of a structure of a speech wakeup apparatus according to an embodiment of this disclosure.

FIG. 31 is a schematic diagram of a structure of a speech wakeup apparatus 3100 according to an embodiment of this disclosure. The speech wakeup apparatus 3100 may be implemented as a part or the entire of an electronic device by using software, hardware, or a combination thereof. The electronic device may be the wearable device shown in FIG. 2. Refer to FIG. 31. The apparatus 3100 includes a speech detection module 3101, a wakeup word detection module 3102, and a speech wakeup module 3103.

The speech detection module 3101 is configured to perform speech detection based on a bone conduction signal collected by a bone conduction microphone, where the bone conduction signal includes information about a command word input by a sound source.

The wakeup word detection module 3102 is configured to: when a speech input is detected, detect a wakeup word based on the bone conduction signal.

The speech wakeup module 3103 is configured to: when it is detected that the command word includes the wakeup word, perform speech wakeup on a to-be-woken-up device.

Optionally, the wakeup word detection module 3102 includes: a first determining submodule, configured to determine a fusion signal based on the bone conduction signal; and a wakeup word detection submodule, configured to perform wakeup word detection on the fusion signal.

Optionally, the apparatus 3100 further includes: a processing module, configured to turn on an air microphone, and collect an air conduction signal by using the air microphone.

The first determining submodule is configured to: fuse a start part of the bone conduction signal and the air conduction signal, to obtain the fusion signal, where the start part of the bone conduction signal is determined based on a detection delay of the speech detection; generate an enhancement start signal based on a start part of the bone conduction signal, and fuse the enhancement start signal and the air conduction signal, to obtain the fusion signal, where the start part of the bone conduction signal is determined based on a detection delay of the speech detection; or directly fuse the bone conduction signal and the air conduction signal, to obtain the fusion signal.

Optionally, the wakeup word detection submodule is configured to: input a plurality of audio frames included in the fusion signal to a first acoustic model, to obtain a plurality of posterior probability vectors output by the first acoustic model, where the plurality of posterior probability vectors one-to-one correspond to the plurality of audio frames, and a first posterior probability vector in the plurality of posterior probability vectors indicates a probability that a phoneme of a first audio frame in the plurality of audio frames belongs to a plurality of specified phonemes; and detect the wakeup word based on the plurality of posterior probability vectors.

Optionally, the apparatus 3100 further includes: a processing module, configured to turn on an air microphone, and collect an air conduction signal by using the air microphone.

The wakeup word detection module 3102 includes: a second determining submodule, configured to determine a plurality of posterior probability vectors based on the bone conduction signal and the air conduction signal, where the plurality of posterior probability vectors one-to-one correspond to a plurality of audio frames included in the bone conduction signal and the air conduction signal, and a first posterior probability vector in the plurality of posterior probability vectors indicates a probability that a phoneme of a first audio frame in the plurality of audio frames belongs to a plurality of specified phonemes; and a wakeup word detection submodule, configured to detect the wakeup word based on the plurality of posterior probability vectors.

Optionally, the second determining submodule is configured to: input a start part of the bone conduction signal and the air conduction signal to a second acoustic model, to obtain a first quantity of bone conduction posterior probability vectors and a second quantity of air conduction posterior probability vectors that are output by the second acoustic model, where the start part of the bone conduction signal is determined based on a detection delay of the speech detection, the first quantity of bone conduction posterior probability vectors one-to-one corresponds to an audio frame included in the start part of the bone conduction signal, and the second quantity of air conduction posterior probability vectors one-to-one corresponds to an audio frame included in the air conduction signal; and fuse a first bone conduction posterior probability vector and a first air conduction posterior probability vector, to obtain a second posterior probability vector, where the first bone conduction posterior probability vector corresponds to a last audio frame of the start part of the bone conduction signal, duration of the last audio frame is less than frame duration, the first air conduction posterior probability vector corresponds to a $1^{st}$ audio frame of the air conduction signal, duration of the $1^{st}$ audio frame is less than the frame duration, and the plurality of posterior probability vectors include the second posterior probability vector, a vector in the first quantity of bone conduction posterior probability vectors other than the first bone conduction posterior probability vector, and a vector in the second quantity of air conduction posterior probability vectors other than the first air conduction posterior probability vector.

Optionally, the second determining submodule is configured to: input a start part of the bone conduction signal and the air conduction signal to a third acoustic model, to obtain the plurality of posterior probability vectors output by the third acoustic model, where the start part of the bone conduction signal is determined based on a detection delay of the speech detection; or input the bone conduction signal and the air conduction signal to a third acoustic model, to obtain the plurality of posterior probability vectors output by the third acoustic model.

Optionally, the wakeup word detection submodule is configured to: determine, based on the plurality of posterior probability vectors and a phoneme sequence corresponding to the wakeup word, a confidence that a phoneme sequence corresponding to the command word includes the phoneme sequence corresponding to the wakeup word; and when the confidence exceeds a confidence threshold, determine that it is detected that the command word includes the wakeup word.

Optionally, the wakeup word detection submodule is configured to: determine, based on the plurality of posterior probability vectors and a phoneme sequence corresponding to the wakeup word, a confidence that a phoneme sequence corresponding to the command word includes the phoneme sequence corresponding to the wakeup word; and when the confidence exceeds a confidence threshold, and the plurality of posterior probability vectors and a plurality of template vectors meet a distance condition, determine that it is detected that the command word includes the wakeup word, where the plurality of template vectors indicate a probability that a phoneme of a speech signal including complete information of the wakeup word belongs to the plurality of specified phonemes.

Optionally, when the plurality of posterior probability vectors one-to-one correspond to the plurality of template vectors, the distance condition includes: a mean of distances between the plurality of posterior probability vectors and the corresponding template vectors is less than a distance threshold.

Optionally, the apparatus 3100 further includes: an obtaining module, configured to obtain a bone conduction registration signal, where the bone conduction registration signal includes the complete information of the wakeup word; and a determining module, configured to determine the confidence threshold and the plurality of template vectors based on the bone conduction registration signal and the phoneme sequence corresponding to the wakeup word.

Optionally, the determining module includes: a third determining submodule, configured to determine a fusion registration signal based on the bone conduction registration signal; and a fourth determining submodule, configured to determine the confidence threshold and the plurality of template vectors based on the fusion registration signal and the phoneme sequence corresponding to the wakeup word.

Optionally, the fourth determining submodule is configured to: input a plurality of registration audio frames included in the fusion registration signal to the first acoustic model, to obtain a plurality of registration posterior probability vectors output by the first acoustic model, where the plurality of registration posterior probability vectors one-to-one correspond to the plurality of registration audio frames, and a first registration posterior probability vector in the plurality of registration posterior probability vectors indicates a probability that a phoneme of a first registration audio frame in the plurality of registration audio frames belongs to the plurality of specified phonemes; determine the plurality of registration posterior probability vectors as the plurality of template vectors; and determine the confidence threshold based on the plurality of registration posterior probability vectors and the phoneme sequence corresponding to the wakeup word.

Optionally, the apparatus 3100 further includes: an obtaining module, configured to obtain an air conduction registration signal.

The determining module includes: a fifth determining submodule, configured to determine a plurality of registration posterior probability vectors based on the bone conduction registration signal and the air conduction registration signal, where the plurality of registration posterior probability vectors one-to-one correspond to a plurality of registration audio frames included in the bone conduction registration signal and the air conduction registration signal, and a first registration posterior probability vector in the plurality of registration posterior probability vectors indicates a probability that a phoneme of a first registration audio frame in the plurality of registration audio frames belongs to the plurality of specified phonemes; and a sixth determining submodule, configured to determine the confidence threshold based on the plurality of registration posterior probability vectors and the phoneme sequence corresponding to the wakeup word.

In embodiments of this disclosure, the bone conduction microphone collects the bone conduction signal for speech detection, to ensure low power consumption. In addition, it is considered that a delay of speech detection may cause losing of a header of a collected air conduction signal, and consequently, complete information of the command word input by the sound source is not included. However, the bone conduction signal collected by the bone conduction microphone includes the information about the command word input by the sound source, that is, the bone conduction signal does not lose a header. Therefore, this solution detects the wakeup word based on the bone conduction signal. In this way, recognition accuracy of the wakeup word is high, and accuracy of speech wakeup is high.

It should be noted that when the speech wakeup apparatus provided in the foregoing embodiment performs speech wakeup, division of the foregoing functional modules is merely used as an example for description. During actual application, the foregoing functions may be allocated to different functional modules for implementation based on a requirement. That is, an internal structure of the device is divided into different functional modules to implement all or some of the functions described above. In addition, the speech wakeup apparatus provided in the foregoing embodiment belongs to a same concept as the embodiments of the speech wakeup method. For a specific implementation process of the speech wakeup apparatus, refer to the method embodiments, and details are not described herein again.

All or a part of the foregoing embodiments may be implemented by software, hardware, firmware, or any combination thereof. When software is used for implementation, all or some of the embodiments may be implemented in a form of a computer program product. The computer program product includes one or more computer instructions. When the computer instructions are loaded and executed on the computer, the procedure or functions according to the embodiments of this disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like. It should be noted that, the computer-readable storage medium mentioned in this embodiment of this disclosure may be a non-volatile storage medium, or in other words, may be a non-transitory storage medium.

It should be understood that "at least one" mentioned in this specification means one or more and "a plurality of" means two or more. In descriptions of embodiments of this disclosure, unless otherwise specified, "/" means "or". For example, A/B may represent A or B. In this specification, "and/or" describes only an association relationship between associated objects and represents that three relationships may exist. For example, A and/or B may represent the following three cases: Only A exists, both A and B exist, and only B exists. In addition, to clearly describe the technical solutions in the embodiments of this disclosure, terms such as "first" and "second" are used in embodiments of this disclosure to distinguish between same items or similar items that have basically same functions and purposes. A person skilled in the art may understand that the terms such as "first" and "second" do not limit a quantity or an execution sequence, and the terms such as "first" and "second" do not indicate a definite difference.

It should be noted that, information (including but not limited to user equipment information and user personal information), data (including but not limited to data used for analysis, stored data, and displayed data), and signals involved in embodiments of this disclosure are authorized by the user or fully authorized by all parties, and collection, use, and processing of related data need to comply with related laws, regulations, and standards of related countries and regions. For example, speech signals involved in embodiment of this disclosure are obtained in a case of full authorization.

The foregoing descriptions are embodiments provided in this disclosure, but are not intended to limit this disclosure. Any modification, equivalent replacement, or improvement made without departing from the spirit and principle of this disclosure shall fall within the protection scope of this disclosure.

What is claimed is:

1. A method comprising:
   collecting, using a bone conduction microphone, a bone conduction signal from a sound source, wherein the bone conduction signal comprises information about a command word;
   performing speech detection based on the bone conduction signal to attempt to detect a speech input;
   detecting a start part of the bone conduction signal based on a detection delay of the speech detection;
   fusing, when the speech input is detected, the start part and an air conduction signal to obtain a fusion signal;
   detecting whether the command word comprises a wakeup word based on the fusion signal; and
   performing, when the command word comprises the wakeup word, speech wakeup on a to-be-woken-up device.

2. The method according to claim 1, wherein the method further comprises:
   generating an enhancement start signal based on the start part; and
   fusing the enhancement start signal and the air conduction signal to obtain the fusion signal.

3. The method according to claim 1, wherein detecting the wakeup word comprises:
   inputting a plurality of audio frames from the fusion signal into an acoustic model;
   obtaining a plurality of posterior probability vectors by the acoustic model, wherein the posterior probability vectors are in a one-to-one correspondence with the audio frames, and wherein a first posterior probability vector from the posterior probability vectors indicates a probability that a first phoneme of a first audio frame from the audio frames belongs to a plurality of pre-indicated phonemes; and
   detecting the wakeup word based on the posterior probability vectors.

4. The method according to claim 3, wherein detecting the wakeup word comprises:
   determining, based on the posterior probability vectors and a first phoneme sequence corresponding to the wakeup word, a confidence level that a second phoneme sequence corresponding to the command word comprises the first phoneme sequence; and
   detecting, when the confidence level exceeds a confidence threshold, that the command word comprises the wakeup word.

5. The method according to claim 3, wherein detecting the wakeup word comprises:
   determining, based on the posterior probability vectors and a first phoneme sequence corresponding to the wakeup word, a confidence level that the first phoneme sequence corresponding to the command word comprises the first phoneme sequence; and
   detecting, when the confidence level exceeds a confidence threshold and when the posterior probability vectors and a plurality of template vectors meet a distance condition, that the command word comprises the wakeup word, wherein the template vectors indicate a first probability that a second phoneme of a speech signal comprising first information of the wakeup word belongs to the pre-indicated phonemes.

6. The method according to claim 5, wherein when the posterior probability vectors are in a first one-to-one correspondence with the template vectors, the distance condition comprises that a mean of distances between the posterior probability vectors and the template vectors is less than a distance threshold.

7. The method according to claim 5, wherein the method further comprises:
   obtaining a bone conduction registration signal, wherein the bone conduction registration signal comprises the information of the wakeup word; and
   determining the confidence threshold and the template vectors based on the bone conduction registration signal and the first phoneme sequence.

8. The method according to claim 7, wherein determining the confidence threshold and the plurality of template vectors comprises:
   obtaining a fusion registration signal based on the bone conduction registration signal; and
   determining the confidence threshold and the plurality of template vectors based on the fusion registration signal and the first phoneme sequence.

9. The method according to claim 8, wherein determining the confidence threshold and the plurality of template vectors further comprises:
   inputting a plurality of registration audio frames from the fusion registration signal into the acoustic model; and
   obtaining a plurality of registration posterior probability vectors by the acoustic model, wherein the registration posterior probability vectors are in a first one-to-one correspondence with the registration audio frames, and wherein a first registration posterior probability vector from the registration posterior probability vectors indicates a second probability that a third phoneme of a first registration audio frame from the registration audio frames belongs to the pre-indicated phonemes;

using the registration posterior probability vectors as the template vectors; and determining the confidence threshold based on the registration posterior probability vectors and the first phoneme sequence.

10. The method according to claim 7, wherein before determining the confidence threshold, the method further comprises obtaining an air conduction registration signal, and wherein determining the confidence threshold comprises:

determining a plurality of registration posterior probability vectors based on the bone conduction registration signal and the air conduction registration signal, wherein the registration posterior probability vectors are in a first one-to-one correspondence with a plurality of registration audio frames from the bone conduction registration signal and the air conduction registration signal, and wherein a first registration posterior probability vector from the registration posterior probability vectors indicates a second probability that a second third phoneme of a first registration audio frame from the registration audio frames belongs to the pre-indicated phonemes; and determining the confidence threshold based on the registration posterior probability vectors and the first phoneme sequence.

11. The method according to claim 1, wherein before detecting the wakeup word, the method further comprises:

turning on an air microphone; and collecting the air conduction signal using the air microphone, and wherein detecting the wakeup word comprises:

obtaining a plurality of posterior probability vectors based on the bone conduction signal and the air conduction signal, wherein the posterior probability vectors are in a one-to-one correspondence with a plurality of audio frames from the bone conduction signal and the air conduction signal, and wherein a first posterior probability vector from the posterior probability vectors indicates a probability that a first phoneme of a first audio frame from the audio frames belongs to a plurality of pre-indicated phonemes; and detecting the wakeup word based on the posterior probability vectors.

12. The method according to claim 11, wherein obtaining the posterior probability vectors comprises:

inputting the bone conduction signal and the air conduction signal to an acoustic model; and obtaining the posterior probability vectors by the acoustic model.

13. The method according to claim 11, wherein the posterior probability vectors comprises:

detecting the start part of the bone conduction signal based on the detection delay when performing the speech detection;

inputting the start part of the bone conduction signal and the air conduction signal to an acoustic model;

obtaining a plurality of bone conduction posterior probability vectors and a plurality of air conduction posterior probability vectors by the acoustic model, wherein the bone conduction posterior probability vectors are in a first one-to-one correspondence with a plurality of first audio frames from the start part of the bone conduction signal, and wherein the air conduction posterior probability vectors are in a second one-to-one correspondence with a plurality of second audio frames from the air conduction signal; and fusing a first bone conduction posterior probability vector and a first air conduction posterior probability vector to obtain a second posterior probability vector, wherein the first bone conduction posterior probability vector corresponds to a last audio frame from the start part of the bone conduction signal, and wherein the last audio frame has a second duration less than a frame duration.

14. The method according to claim 13, wherein the first air conduction posterior probability vector corresponds to a third audio frame of the air conduction signal, wherein the third audio frame has a first duration less than the frame duration, and wherein the posterior probability vectors comprise the second posterior probability vector, a first vector from the bone conduction posterior probability vectors other than the first bone conduction posterior probability vector, and a second vector from the air conduction posterior probability vectors other than the first air conduction posterior probability vector.

15. The method according to claim 11, wherein obtaining the posterior probability vectors comprises:

detecting the start part of the bone conduction signal based on the detection delay when performing the speech detection;

inputting the start part of the bone conduction signal and the air conduction signal to an acoustic model; and obtaining the posterior probability vectors by the acoustic model.

16. An electronic device, wherein the electronic device comprises:

a memory configured to store a computer program; and at least one processor coupled to the memory and configured to execute the computer program to cause the electronic device to:

collect, using a bone conduction microphone, a bone conduction signal from a sound source, wherein the bone conduction signal comprises information about a command word;

perform speech detection based on the bone conduction signal to attempt to detect a speech input;

detect a start part of the bone conduction signal based on a detection delay of the speech detection;

fuse, when the speech input is detected, the start part and an air conduction signal to obtain a fusion signal;

detect whether the command word comprises a wakeup word based on the fusion signal; and perform, when the command word comprises the wakeup word, speech wakeup on a to-be-woken-up device.

17. The electronic device according to claim 16, wherein the at least one processor is further configured to execute the computer program to cause the electronic device to:

generate an enhancement start signal based on the start part; and fuse the enhancement start signal and the air conduction signal to obtain the fusion signal.

18. The electronic device according to claim 16, wherein the at least one processor is further configured to execute the computer program to cause the electronic device to:

input, a plurality of audio frames from the fusion signal into an acoustic model;

obtain a plurality of posterior probability vectors using the acoustic model, wherein the posterior probability vectors are in a one-to-one correspondence with the audio frames, and wherein a posterior probability vector from the posterior probability vectors indicates a probability that a phoneme of an audio frame from the audio frames belongs to a plurality of pre-indicated phonemes; and detect the wakeup word based on the posterior probability vectors.

19. The electronic device according to claim 18, wherein the at least one processor is further configured to execute the computer program to cause the electronic device to:

turn on an air microphone coupled to the electronic device or the at least one processor; and collect the air conduction signal using the air microphone, and wherein the at least one processor is further configured to execute the computer program to cause the electronic device to:

obtain a plurality of first posterior probability vectors based on the bone conduction signal and the air conduction signal, wherein the posterior probability vectors are in a first one-to-one correspondence with a plurality of first audio frames from the bone conduction signal and the air conduction signal, and wherein a first posterior probability vector from the first posterior probability vectors indicates a probability that a first phoneme of a first audio frame from the first audio frames belongs to a plurality of first pre-indicated phonemes; and detect the wakeup word based on the posterior probability vectors.

20. A computer program comprising computer instructions, that are stored on a non-transitory computer-readable storage medium and that, when executed by at least one processor, cause an electronic device to:

collect, using a bone conduction microphone, a bone conduction signal from a sound source, wherein the bone conduction signal comprises information about a command word;

perform speech detection based on the bone conduction signal to attempt to detect a speech input;

detect a start part of the bone conduction signal based on a detection delay of the speech detection;

fuse, when the speech input is detected, the start part and an air conduction signal to obtain a fusion signal;

detect whether the command word comprises a wakeup word based on the fusion signal; and perform, when the command word comprises the wakeup word, speech wakeup on a to-be-woken-up device.

* * * * *